(12) United States Patent
Heyhoe et al.

(10) Patent No.: US 8,365,140 B2
(45) Date of Patent: Jan. 29, 2013

(54) AUTOMATED METHODS AND SYSTEMS FOR DEVELOPING AND DEPLOYING PROJECTS IN PARALLEL

(75) Inventors: Marc Heyhoe, Middletown, NJ (US); Dan Avidan, Aventura, FL (US); Daron Finn, Flemington, NJ (US); Daniel Lees, Clifton, NJ (US)

(73) Assignee: HSBC Technologies Inc., Jersey City, NJ (US)

( * ) Notice: Subject to any disclaimer, the term of this patent is extended or adjusted under 35 U.S.C. 154(b) by 915 days.

(21) Appl. No.: 12/336,982

(22) Filed: Dec. 17, 2008

(65) Prior Publication Data

US 2009/0300580 A1 Dec. 3, 2009

Related U.S. Application Data

(60) Provisional application No. 61/015,617, filed on Dec. 20, 2007.

(51) Int. Cl.
G06F 9/44 (2006.01)
G06F 17/30 (2006.01)

(52) U.S. Cl. ......... 717/106; 717/101; 707/202; 707/203

(58) Field of Classification Search .................. 717/106, 717/111, 122, 124
See application file for complete search history.

(56) References Cited

U.S. PATENT DOCUMENTS

| | | | |
|---|---|---|---|
| 5,649,200 A | 7/1997 | Leblang et al. | |
| 6,385,768 B1 | 5/2002 | Ziebell | |
| 6,393,437 B1 * | 5/2002 | Zinda et al. | 717/124 |
| 7,007,266 B1 * | 2/2006 | Isaacson | 717/100 |
| 7,146,608 B1 | 12/2006 | Newman et al. | |
| 7,251,669 B1 * | 7/2007 | Arora | 707/695 |
| 7,277,901 B2 * | 10/2007 | Parker et al. | 1/1 |
| 7,290,251 B2 * | 10/2007 | Livshits | 717/143 |
| 7,680,932 B2 * | 3/2010 | Defaix et al. | 709/225 |
| 7,970,821 B2 * | 6/2011 | Baentsch et al. | 709/203 |
| 8,042,097 B2 * | 10/2011 | Aridor et al. | 717/122 |
| 2003/0028579 A1 * | 2/2003 | Kulkarni et al. | 709/100 |
| 2003/0097286 A1 * | 5/2003 | Skeen | 705/7 |
| 2003/0163329 A1 * | 8/2003 | Bolene | 705/1 |
| 2004/0255263 A1 * | 12/2004 | Ando | 717/100 |
| 2004/0261053 A1 * | 12/2004 | Dougherty et al. | 717/101 |
| 2005/0096937 A1 * | 5/2005 | Subash et al. | 705/1 |
| 2005/0262483 A1 * | 11/2005 | Laird | 717/120 |
| 2006/0155768 A1 * | 7/2006 | Weil et al. | 707/104.1 |
| 2008/0059940 A1 * | 3/2008 | Matic | 717/100 |
| 2010/0153919 A1 * | 6/2010 | Kramer et al. | 717/122 |

OTHER PUBLICATIONS

European Search Report and Examiner's Amendment from European application No. EP08865352, issued Aug. 27, 2012.

* cited by examiner

*Primary Examiner* — Don Wong
*Assistant Examiner* — Mohammad Kabir
(74) *Attorney, Agent, or Firm* — Stroock & Stroock & Lavan LLP

(57) ABSTRACT

Embodiments of the invention are directed to system and method for managing parallel development of projects. One embodiment of the invention is a method of automatically managing processes in the parallel development of an application through a graphical user interface. The graphical user interface manages the automated processes, which are able to complete their tasks without further user interaction. The automated processes managed by the graphical user interface include, provisioning a first development environment and second development environment. The processes also includes deploying a second release of an application to the second development environment, and merging modifications to the second source code and the second content of the second release into a first source code and a first content of the first release. After the releases have been merged together, the process automatically deploys the third release of the application to a production environment for use by users.

53 Claims, 57 Drawing Sheets

| DATE | TASK | USER | DETAILS |
|---|---|---|---|
| WED DEC 20 20:51:24 2006 | 90879 | IWUI | UPDATE LOCK FILE COMPLETED SUCCESSFULLY. |
| WED DEC 20 20:51:25 2006 | 90882 | CMUK08 | LOCK WORKAREA AND WORKBENCH COMPLETED SUCCESSFULLY |
| WED DEC 20 20:51:27 2006 | 90883 | IWUI | COMPLETED EMAIL NOTIFICATION |
| WED DEC 20 20:51:29 2006 | 90884 | WASADM | ERROR OCCURRED WHILE TRYING TO EXECUTE ACTION. FAILURE OCCURED, TRANSITIONING TO EXCEPTION HANDLING TASK. |
| WED DEC 20 20:51:31 2006 | 90910 | IWUI | EXCEPTION HANDLER TASK SET TRANSITION TO RETRY. TAKE BACKUP |
| WED DEC 20 20:52:33 2006 | 90911 | CACED833 | COMPLETED EMAIL NOTIFICATION |
| WED DEC 20 20:52:34 2006 | 90912 | IWUI | END JOB: 90878 TRANSITION: 0 |
| WED DEC 20 20:52:36 2006 | 90913 | CACED833 | COMPLETED EMAIL NOTIFICATION |
| WED DEC 20 20:52:38 2006 | 90914 | CMUK08 | UNLOCK TARGET COMPLETED SUCCESSFULLY. |
| WED DEC 20 20:52:39 2006 | 90908 | IWUI | UNLOCK WORKFLOW LOCK COMPLETED SUCCESSFULLY |
| WED DEC 20 20:52:41 2006 | 90909 | IWUI | COMPLETED EMAIL NOTIFICATION |

| CONTENTCENTER PROFESSIONAL POWERED BY INTERWOVEN | | | LOGOUT \| ABOUT \| HELP |
|---|---|---|---|
| CONTENT \| WORKFLOW \| HSBC ADMIN \| HELP AND SUPPORT | | | |
| JOBS TASKS | | | NEW JOB |
| VIEWS: MY OPEN TASKS ▼ | FILTER: TASK DESCRIPTION ▼ INTERNATIONAL | | GO \| ADVANCED |
| ! TASKS ▲ | TASK DESCRIPTION | REQUESTED BY | OWNER | DUE DATE | ACTIONS |

| ! | TASKS ▲ | TASK DESCRIPTION | REQUESTED BY | OWNER | DUE DATE | ACTIONS |
|---|---|---|---|---|---|---|
| | ☐ 34270 | ☐ INTERNATIONAL PROD CODE DEPLOYMENT | IWUI | USVBM249 | | COMPLETE |
| | ☐ 34289 | ☐ INTERNATIONAL SDE39 CODE DEPLOYMENT | IWUI | USVBM249 | | COMPLETE |

4604   4608   4602   4606

2 ITEMS                                                                SHOW: 10 ALL

DESCRIPTION AND COMMENTS:

(JOB DESCRIPTION: CODE INTERNATIONAL PROD)

LAST COMMENT: WORKFLOW LOCKED. DIR: /TEAMSITE/IW-
HOME/OPENDEPLOYNG/LOG/LOCKS/2G/WORKFLOW/ICODE/INTERNATIONAL/PROD/LOCK [IWUI: 10/19/06 11:56 AM]

TASK DESCRIPTION: INTERNATIONAL PROD CODE DEPLOYMENT

ATTACHED FILES     ✦ NEW FILES   ✦ NEW FORM   ⇐ IMPORT   ☐ EXISTING FILES   ☐ MODIFIED FILES

NO FILES FOUND.

COMPLETE TASK

[                                    ]  4610
                                        START INPUT TASK

🔒 LOCAL INTRANET

| @ DEPLOYMENT OPTIONS - MICROSOFT INTERNET EXPLORER PROVIDED BY HSBC | | | | | | _ □ X |
|---|---|---|---|---|---|---|
| HSBC ⊠ | | 2G CODE WORKFLOW TASK | | REFRESH | | CLOSE WINDOW |
| PREVIOUS REQUEST TO PROD | [?] INVENTORY | [?] REVIEW WORKFLOW FLOWCHART | [?] VIEW DEPLOYMENT LOGS | | [?] VIEW DEPLOYMENT HISTORY | |
| WHO DEPLOYED | WEBSITE ENTITY | ENVIRONMENT | BUILD TICKET | CONFIG LABEL | MKS PROJECT | START TIME | END TIME |
| USVBM240 | INTERNATIONAL | PROD | 21235 | NOLABEL | P2G_JERSEYOFFSHORE_HBOS | TUE OCT 17 16:37:46 2006 | BUILD:22013 GETZIP COMPLETED DEPLOYZIP COMPLETED |

CURRENT INSTALLATION REQUEST RUN AS: ● FOREGROUND ○ BACKGROUND [?]

| INSTALL TASK | [SUBMIT] CLICK "SUBMIT" BUTTON |
|---|---|
| PROCESS DESCRIPTION | [?] 1. DEACTIVATE WEBINSTANCE (GR1) [?] 2. CODE INSTALLATION (GR1) |
| BUILD TICKET | 22013 |
| CONFIG LABEL | NOLABEL |
| TARGET ENVIRONMENT | PROD [?] (GR1, GR2) |
| TARGET RDH SERVERS | COMSRV7 |

5102

| WORKFLOW ADMINISTRATOR OPTIONS | AVAILABLE OPTIONS |
|---|---|
| ADMIN TASK | |
| ACTWEB AND DEACTWEB PROCESSES | [ENABLED ▼] SELECT [DISABLED] TO BYPASS - ONLY WHEN REQUIRED |

NOTE: USER'S DESKTOP/LAPTOP IE BROWSER INTERNET OPTIONS SETTINGS MUST BE SET TO EVERY VISIT TO THE WEBPAGE

| | VERSION 1.1 (PRODUCTION) | VERSION 2.0 (PARALLEL) | ADD | DELETE | IGNORE | MERGE | OVER-WRITE |
|---|---|---|---|---|---|---|---|
| PAGES | HOME PAGE<br>CREDIT CARD HOME PAGE<br>CREDIT CARD PRODUCT INFO<br>BUSINESS CREDIT CARD<br>PREMIER CREDIT CARD<br>CREDIT CARD CONTACTS | HOME PAGE<br>CREDIT CARD HOME PAGE<br>CREDIT CARD PRODUCT INFO<br>BUSINESS CREDIT CARD<br>PREMIER CREDIT CARD<br>CREDIT CARD CONTACTS | ○ ○ ● ● ○ ○ | ○ ○ ○ ○ ● ○ | ● ● ○ ○ ○ ○ | ○ ○ ○ ○ ○ ● | ○ ○ ○ ○ ○ ○ |
| CONTENT DEPENDENCIES: | HOMEPAGE1.JSP<br>HOMEPAGE2.JSP<br>CREDITCARD.JSP<br>CREDITINFO.JSP<br>PREMIER.JSP<br>BUSINESSCARDS.JSP<br>CONTACTUS.JSP | HOMEPAGE1.JSP<br>HOMEPAGE2.JSP<br>CREDITCARD.JSP<br>CREDITINFO.JSP<br>PREMIER.JSP<br>BUSINESSCARDS.JSP<br>CONTACTUS.JSP | ○ ○ ○ ○ ● ○ ○ | ○ ○ ○ ○ ○ ○ ○ | ○ ● ● ● ● ● ● | ● ○ ○ ○ ○ ○ ○ | ○ ○ ● ○ ○ ○ ● |
| APPLICATIONS: | ES_CC_BALANCE_WEB<br>UK_PREM_REWARDS_WEB | ES_CC_BALANCE_WEB<br>UK_PREM_REWARDS_WEB | | | | | |

V1.2 → V2.2 REMOVED IN PRODUCTION

[ OK ]  [ CANCEL ]

FIG. 54

USER JON SMITH SYNCHRONISED VERSION 2.1 FROM PRODUCTION-BRANCH TO PARALLEL-BRANCH ON 5TH MAY 2006
PERFORMING THE FOLLOWING OPERATIONS:

| VERSION 1.1 (PRODUCTION) | VERSION 2.0 (PARALLEL) | |
|---|---|---|
| PAGES: ~5608 | | ~5606 |
| HOME PAGE | HOME PAGE | EDITION 2.0 CHANGES KEPT |
| CREDIT CARD HOME PAGE | CREDIT CARD HOME PAGE | CHANGE MERGED |
| CREDIT CARD PRODUCT INFO | CREDIT CARD PRODUCT INFO | PAGE ADDED TO EDITION 2.0 |
| BUSINESS CREDIT CARD | BUSINESS CREDIT CARD | PAGE ADDED TO EDITION 2.0 |
| PREMIER CREDIT CARD | PREMIER CREDIT CARD | PAGE REMOVED FROM EDITION 2.0 |
| CREDIT CARD CONTACTS | CREDIT CARD CONTACTS | CHANGE MERGED |
| CONTENT DEPENDENCIES: ~5610 | | |
| HOMEPAGE1.JSP | HOMEPAGE1.JSP | CHANGES MERGED |
| HOMEPAGE2.JSP | HOMEPAGE2.JSP | CONTENT ADDED TO EDITION 2.0 |
| CREDITCARD.JSP | CREDITCARD.JSP | CHANGES MERGED |
| CREDITINFO.JSP | CREDITINFO.JSP | CONTENT ADDED TO EDITION 2.0 |
| PREMIER.JSP | PREMIER.JSP | CONTENT REMOVED FROM EDITION 2.0 |
| BUSINESSCARDS.JSP | BUSINESSCARDS.JSP | CONTENT ADDED TO EDITION 2.0 |
| CONTACTUS.JSP | CONTACTUS.JSP | CHANGES MERGED |
| APPLICATIONS: ~5612 | | |
| ES_CC_BALANCE_WEB | ES_CC_BALANCE_WEB | V2.3 DEPLOYED |
| UK_PREM_REWARDS_WEB | UK_PREM_REWARDS_WEB | UK_PREM_REWARDS_WEB REMOVED |

AUTOMATED METHODS AND SYSTEMS FOR DEVELOPING AND DEPLOYING PROJECTS IN PARALLEL

CROSS-REFERENCE TO RELATED APPLICATIONS

This application claims the benefit under 35 U.S.C. 119(e) of U.S. Provisional Patent Application No. 61/015,617 filed on Dec. 20, 2007 entitled "METHODS AND SYSTEMS FOR MANAGING PROJECTS IN PARALLEL IN AN AUTOMATED MANNER", which is hereby incorporated by reference herein in its entirety.

BACKGROUND OF THE INVENTION

1. Field of the Invention

The invention relates generally to the parallel development of applications, and more specifically to automating the parallel development process throughout the development, testing, and deployment processes.

2. Description of the Related Art

Developing and deploying applications in a robust manner to be accessed by users, especially web applications, requires a number of processes. For a web application, these processes include managing source code, testing code, and deploying the code along with content to a production system where it can be accessed by users. These processes can take a substantial amount of time (and be prone to error), meaning that some changes cannot be tested or implemented until other changes have been tested and implemented. This need to wait slows down the overall development of an application.

IT developers perform parallel development tasks using source control tools for example MKS source code control system. MKS provides support for parallel development by allowing multiple development paths, or multiple versions of the same file, to exist in the same location. However, managing of source code in parallel is only one part of the process of developing, testing, and deploying robust applications, especially web applications. Aside from source code, througout a web application's lifecycle, a change to a web application's underlying page definitions, URLs, metadata, content, graphics, documents, and resources may need to be worked on or tested in parallel.

By using a parallel development process, multiple changes and additions to an application can be implemented at substantially the same time. In general, the problem of parallel development and managing resources in parallel can basically be described as modifying the same resource or a collection of artifacts at the same time. This can be complicated by the fact that a resource may be indirectly changed if there are cross or inter-resource dependencies and references. The basic ability to manage business and IT resources in parallel (pages, content and portlet applications, or business functions) is further complicated by the underlying technology that supports the platform. For example, IBM Portal Server does not provide an automated framework which enables development of resources in parallel.

In general, parallel development requires the ability to develop, virtualize, test and deploy the same resource or collection or resources at the same time; making modifications in parallel, with changes to one resource not having any affect on the other versions of that resource.

Methods to extend parallel development throughout the entire application development process have to this point been ad-hoc, manual or user-intensive, and prone to error. What is needed is an overall system and process, preferably automated, to perform parallel development of an application.

SUMMARY OF THE INVENTION

Embodiments of the invention relate to a system for automating the parallel development process throughout the development, testing, and deployment processes. The invention provides non-technical users with an automated framework to initialize parallel streams; promote resources from a parallel stream to a production stream; get the latest resources from a production stream to a parallel stream as well as compare between streams. In order to support parallel development of resources, embodiments of the invention provide the ability for users to create a main trunk, call the production stream, and branches, called parallel streams while successfully maintaining a parallel development environment. Embodiments of the invention can be installed on one or more servers, including distinct servers specifically for supporting an application platform, a source code control system, or a content management system. Alternative embodiments of the invention utilize a separate build and deployment server for building executable source code and deploying it to the one or more servers making up a development environment.

Alternative embodiments of the invention utilize a branching system to allow parallel development of applications, including source code and content. Users can work with a main trunk, called the production stream, and branches, called parallel streams. By using a branching strategy, multiple versions of the same resource (e.g. a source code file or an image for a web page) can be modified and managed in isolation of other versions of the resource. Embodiments of the invention apply this branching strategy across components of the development process, including testing environments, staging servers, production servers, application platforms, and content management systems. These systems are generally referred to as the business development environment (i.e. BDE or eBDE). Regardless of the number of parallel streams, there is preferably one 'live' version of a resource that can be deployed to a production environment, and that is viewed by the end-user or customer. This means that all the parallel streams eventually have to be merged or consolidated, as necessary, into the production stream so that the resource can be released into the production environment. While technically more challenging, the embodiment of the invention ensures that at any one time and on a permanent basis, the 'production' stream corresponds to 'Live' which operationally takes the guess work of which stream corresponds to 'Live' as well as ensuring any resource conflicts are found in "design time" as opposed to "run-time."

Alternative embodiments of the invention manage deployment of resources to a production environment, including merging of parallel streams of development into a production stream in an automated manner. These resources include one or more of content fragments managed within TeamSite, Portal resources (e.g. page definitions, URL mappings, and portlet applications), Customer Authentication Module (CAM) resources assigned to portlet applications, and shared application components installed within the portal server environment. Embodiments of the invention provide a way to create new streams, and to move resources between streams to enable parallel development of single or collection of resources, which can then be moved into a production stream to be deployed into a production 'Live' environment. Embodiments of the invention provide a way to create new streams, and to move resources between streams to enable parallel development of single or a collection of resources, which can then be moved into a production stream to be deployed into a production environment. Other automated operations can include initializing new parallel streams, getting the latest stream to begin work from, comparing differences between streams (and individual resources within the streams), managing testing and users of streams, and performing a rollback of merged in changes.

Alternative embodiments of the invention include a web based system connected to the development, testing, pre-production, and production environments. The management of an application through these systems can be done using a web interface. The web interface also includes the ability for collaborative decision making, and the ability for multiple individuals to participate, including the approving or disapproving of certain actions and addition/modification/deletion of resources. The web interface also provides the ability to visually manage the merging process in detail by individually reviewing resources before they are deployed to the next phase of development. This can include merging changes from parallel versions of a resource.

Using this automated system, development can advantageously be performed in parallel on multiple features from a common staring point, and these features can then be combined together into a final production stream. Alternatively, one branch can go to production first, and changes are later incorporated into that production branch. Deployment of one of the parallel streams to a production environment can also be advantageously managed and performed automatically at a non-technical, non-IT user's direction.

More Specifically, some embodiments of the invention are directed to systems and methods for managing parallel development of projects. One embodiment of the invention is a method of automatically managing processes in the parallel development of an application using a graphical user interface. The graphical user interface manages the automated processes, which are able to complete their tasks without further user interaction. The automated processes managed by the graphical user interface include, provisioning a first development environment including at least a first application platform, a source code control system, and a content management system. The processes also include generating, from a first release of the application having first source code and first content using the first development environment, a second release of the application, wherein the second release includes second source code and second content of the application. The processes also include provisioning a second development environment, including at least a second application platform, a source code control system, and a content management system. The processes also includes deploying the second release to the second development environment, and merging modifications to the second source code and the second content of the second release into the first source code and the first content of the first release to generate a third release of the application including third source code and third content. The processes also include, after the releases have been merged together, deploying the third release of the application to a production environment for use by users of the application. The deployment includes installing executable versions of the third source code and the third content, to another application platform for the production environment.

Alternative embodiments of the invention also include where merging the modifications to the second source code and the second content of the second release into the first source code and the first content of the first release to generate a third release of the application including third source code and third content is performed by a non-technical business user through the graphical user interface. Embodiments of the invention also include where provisioning the second application platform includes running one or more scripts to install source code and content on the second application platform. Embodiments of the invention also include deploying the third release of the application to a pre-production environment, and testing the third release in the pre-production environment, before deploying the third release to a production environment. In addition, this can include generating a baseline based on the second development environment, where the baseline includes the status of source code and content files within the second development environment, comparing the second release of the application to the baseline, and deploying the second release of the application to the second development environment responsive to the comparison.

Alternative embodiments of the invention also include a graphical comparison for merging changes to the source code and content between the first release and the second release. Embodiments of the invention also include comparing rendered displays of content files. Embodiments of the invention also include where the rendered displays of the content files are selectively highlighted for visual comparison.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 23 is a user interface to the MPP showing a log of tasks completed and other system messages.

FIG. 45 is a user interface of the MPP showing configuration settings for the deployment process.

FIG. 46 is a user interface of the MPP showing part of the get latest process.

FIG. 47 is a user interface of the MPP showing part of the deployment process.

FIG. 49 is a user interface of the MPP showing deploying code to production

FIG. 50 is a user interface of the MPP showing further details of deploying code to production.

FIG. 51 is a user interface of the MPP showing further details of deploying code to production.

FIG. 53 is a user interface of the MPP showing how a production and a parallel version of a project are compared.

FIG. 54 is a user interface of the MPP showing how a production and a parallel version of a web page layout are compared.

FIG. 56 is a user interface of the MPP showing a summary of the merging process.

FIG. 57 is a user interface of the MPP showing how a production and parallel version of the code are compared.

DETAILED DESCRIPTION OF EMBODIMENTS OF THE INVENTION

Figure 1:
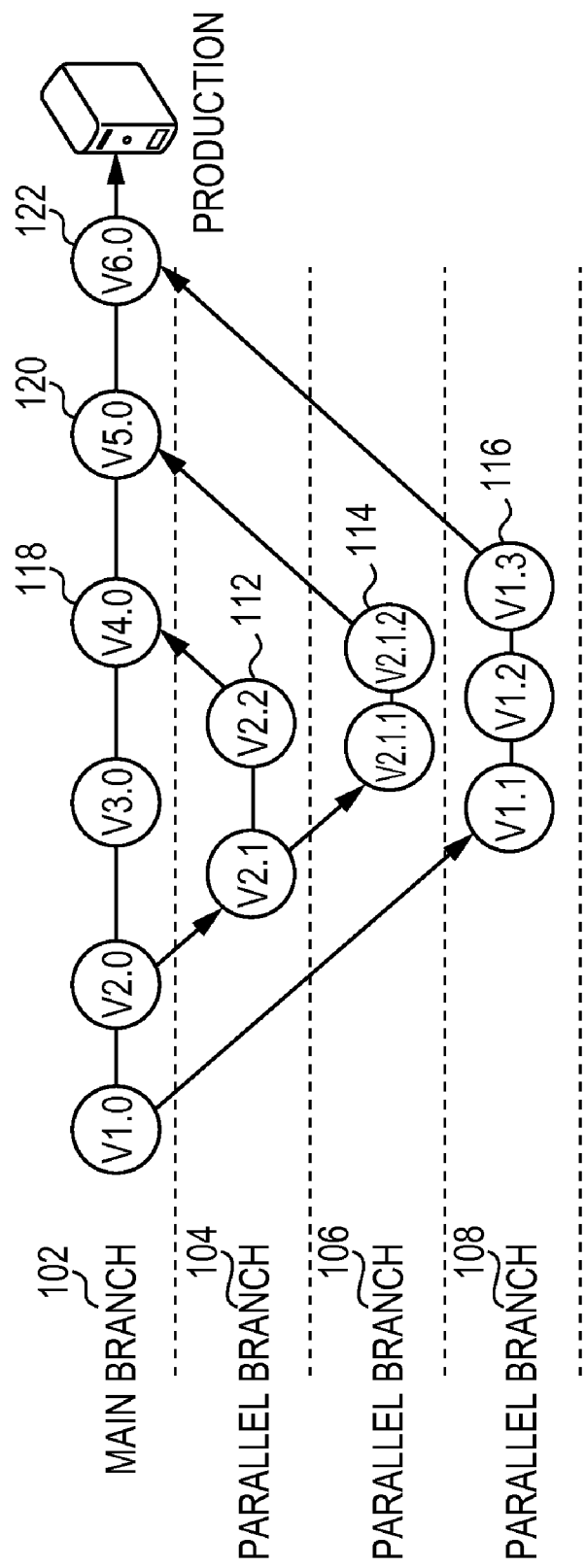
FIG. 1 is a diagram showing one way how different parallel branches of a development process can be deployed to a production system.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention relate to a system for automating the parallel development process throughout the development, testing, and deployment processes. The invention provides non-technical users with an automated framework to initialize parallel streams; promote resources from a parallel stream to a production stream; get the latest resources from a production stream to a parallel stream as well as compare between streams. In order to support parallel development of resources, embodiments of the invention provide the ability for users to create a main trunk, call the production stream, and branches, called parallel streams while successfully maintaining a parallel development environment.

Embodiments of the invention utilize a branching system to allow parallel development of applications, including source code and content. Users can work with a main trunk, called the production stream, and branches, called parallel streams. By using a branching strategy, multiple versions of the same resource (e.g. a source code file or an image for a web page) can be modified and managed in isolation of other versions of the resource. Embodiments of the invention apply this branching strategy across components of the development process, including testing environments, staging servers, production servers, application platforms, and content management systems. These systems are generally referred to as the business development environment (i.e. BDE or eBDE). Regardless of the number of parallel streams, there is preferably one 'live' version of a resource that can be deployed to a production environment, and that is viewed by the end-user or customer. This means that all the parallel streams eventually have to be merged or consolidated, as necessary, into the production stream so that the resource can be released into the production environment. While technically more challenging, the embodiment of the invention ensures that at any one time and on a permanent basis, the 'production' stream corresponds to 'Live' which operationally takes the guess work of which stream corresponds to 'Live' as well as ensuring any resource conflicts are found in "design time" as opposed to "run-time."

Embodiments of the invention manage deployment of resources to a production environment, including merging of parallel streams of development into a production stream in an automated manner. These resources include one or more of content fragments managed within TeamSite, Portal resources (e.g. page definitions, URL mappings, and portlet applications), Customer Authentication Module (CAM) resources assigned to portlet applications, and shared application components installed within the portal server environment. Embodiments of the invention provide a way to create new streams, and to move resources between streams to enable parallel development of single or collection of resources, which can then be moved into a production stream to be deployed into a production 'Live' environment. Embodiments of the invention provide a way to create new streams, and to move resources between streams to enable parallel development of single or a collection of resources, which can then be moved into a production stream to be deployed into a production environment. Other automated operations can include initializing new parallel streams, getting the latest stream to begin work from, comparing differences between streams (and individual resources within the streams), managing testing and users of streams, and performing a rollback of merged in changes.

Embodiments of the invention include a web based system connected to the development, testing, pre-production, and production environments. The management of an application through these systems can be done using a web interface. The web interface also includes the ability for collaborative decision making, and the ability for multiple individuals to participate, including the approving or disapproving of certain actions and addition/modification/deletion of resources. The web interface also provides the ability to visually manage the merging process in detail by individually reviewing resources before they are deployed to the next phase of development. This can include merging changes from parallel versions of a resource.

Using this automated system, development can advantageously be performed in parallel on multiple features from a common staring point, and these features can then be combined together into a final production stream. Alternatively, one branch can go to production first, and changes are later incorporated into that production branch. Deployment of one of the parallel streams to a production environment can also be advantageously managed and performed automatically at a non-technical, non-IT user's direction.

Embodiments of the invention include a layer of hardware and software interfacing with components of the development system, including the content management system (e.g. Interwoven's TeamSite), source code management system, and the application platform. The hardware and software layer includes a graphical user interface (that may include non-graphical interface elements) that can be used to control its operations. A parallel BDE is created that has its own set of synchronized strategic development environments (SDEs) on which code is deployed, and in which various testing can take place such as SAT, UAT, and Pre-Prod Testing.

In at least one embodiment of the invention, managing a project in parallel includes an initialization process, a get latest process, and a promotion process. The process of using a parallel development stream begins with initializing a parallel stream. This is the process whereby the BDE environment of the parallel stream is configured, setup, and installed with the contents of the production stream BDE. Once a parallel stream BDE has been initialized, it is basically a complete clone of, or substantially similar to, the production stream. This allows management of the code, content, and configuration in parallel from the last current version.

In order to manage existing portal resources in parallel, they are preferably identical, and this means that the internal unique identifiers for those resources needs to be the same across different parallel streams. However, it is also important that when creating new resources within a parallel or production stream, they are given new unique identifiers that will not conflict with resources that have been created on other streams. This can be done through a localization script. The embodiment of the invention empowers non-technical users to initiate parallel streams and to work in parallel while preserving unique identifies of existing resources or creating new ones as necessary in an automated fashion without having actual visibility to what those unique IDs are.

To actually begin work on the parallel development stream, a get latest workflow is used to move resources from a production stream to a parallel stream, or from a parallel stream to another parallel stream. As part of the get latest workflow, a detailed comparison is made of the target environment/parallel stream workarea (which contains the content, including versioned portal resources) as a baseline. The baseline also preferably includes a list of installed applications on the environment and their associated versions. Once a comparison has been performed, the results are preferably displayed to a BDE Staff user (still within the context of the workflow), and the user can then make a decision on the resources that they wish to be synchronized. This allow all, or just part, of an application to be developed in parallel.

A promotion process is used to move resources from parallel streams into the production stream. The production stream is preferably in the environment that is used to deploy resources into the pre-production and production environments. The promotion process compares the changes that have been made in the parallel stream vs. the production stream (or other parallel stream) that it will be merged into. These changes are preferably displayed for a non-technical user through a graphical user interface, so that a BDE user can easily accept or reject changes that are to be merged into the new stream. After the merged stream has been created it can be optionally automatically deployed, along with the necessary resources, to a production environment for access by end users.

Other features of the parallel development system can include advanced logging features, disaster recovery protection, and integration with LDAP systems that are adapted to a development process including parallel streams.

Embodiments of the invention include being implemented on a computer system. The computer system includes a bus or other communication mechanism for communicating information, and a processor coupled with the bus for processing information. The computer system also includes a main memory, such as a random access memory (RAM) or other dynamic storage device, coupled to the bus for storing information and instructions to be executed by the processor. Main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to the bus for communicating information and command selections to the processor. Another type of user input device is cursor control, such as a mouse, a trackball, or cursor direction keys for communicating direction information and command selections to the processor and for controlling cursor movement on display. This input device typically has two degrees of freedom in two axes, a first axis (e.g., x) and a second axis (e.g., y), that allows the device to specify positions in a plane.

The invention is related to the use of the computer system for managing projects in parallel. According to one embodiment of the invention, the managing projects in parallel system is provided by the computer system in response to the processor executing one or more sequences of one or more instructions contained in the main memory. Such instructions may be read into the main memory from another computer-readable medium, such as a storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as a storage device. Volatile media includes dynamic memory, such as main memory. Transmission media includes coaxial cables, copper wire and fiber optics, including the wires that comprise the bus. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to the bus can receive the data carried in the infra-red signal and place the data on the bus. The bus carries the data to main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application provides for managing projects in parallel as described herein.

FIG. 1 is a diagram showing one way different parallel branches of a development process can be deployed to a production system. The diagram includes a main production branch 102, as well as three parallel branches (streams) of development 104, 106, and 108. Each stream includes multiple versions (e.g. 118, 120, and 122) that eventually reach the main production branch 102.

The MPP system uses a branching strategy to allow development of multiple streams simultaneously. The main production branch 102 is the live or production branch that is released to users. The other branches can be worked on simultaneously, but are merged with the main branch before going to the production environments to be used by end users.

Parallel development branches 104, 106, and 108 represent further development of the main branch. To organize these multiple branches, version numbers are assigned showing where they were derived from the main branch (or parent branch) and sub version numbers are assigned for versions within that branch. In the example diagram of FIG. 1, version 2.2 112 of parallel branch 104 is merged into production branch as version 4.0 118, while version 2.1.2 114 of parallel branch 106 is merged into version 5.0 120 of production branch, and version 1.3 of parallel branch 108 is merged into version 6.0 122 of production branch. This shows that parallel development branches can be derived from the initial version within a production branch, from a subsequent version in the production branch (parallel branch 104), and also from a version in a parallel branch (parallel branch 106).

Each of the production branches and parallel branches are a branched version of the entire project being developed. This includes a branched version of content fragments managed within a content management system (e.g. TeamSite), portal resources (e.g. page definitions, URL mappings), portlet applications (e.g. larger applications), CAM resources (assigned to portlet applications), and shared application components (installed within the portal server environment). This allows the MPP system to be used for an entire project in a cohesive and automatic manner, and not just for code, html, or content in isolation.

Figure 2:
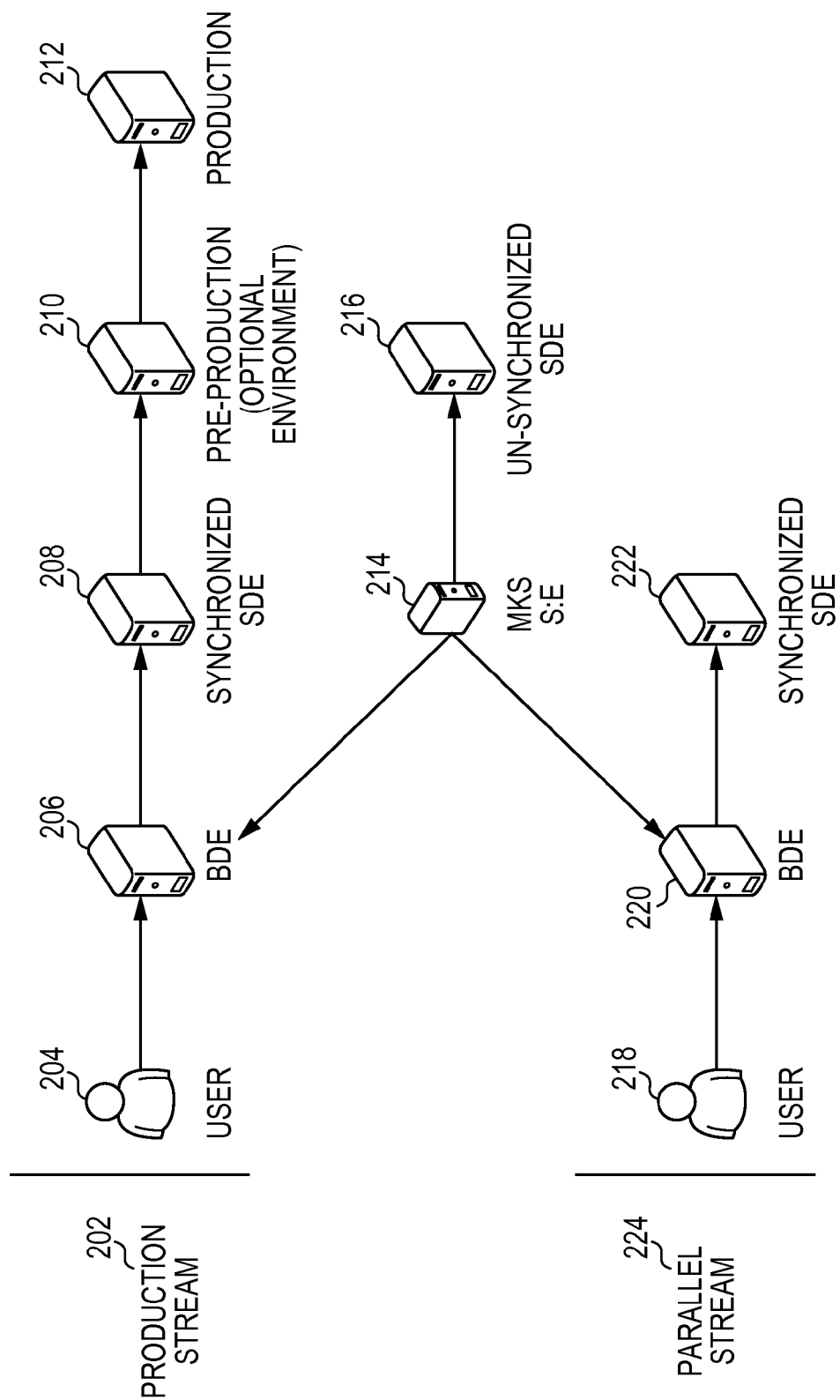
FIG. 2 is a system diagram showing the various systems and entities involved in the parallel development of a production stream and parallel stream.

FIG. 2 is a system diagram showing the various systems and entities involved in parallel development with a production stream and parallel stream. The diagram shows a production stream 202 with a business development environment (BDE) 206, a synchronized strategic development environment (SDE), a pre production environment 210, and a production environment 212. Similarly, there is a parallel stream 224 with a BDE 220 and synchronized SDE 222. These two environments are connected through MKS 214 and unsynchronized SDE 216. The platform components, such as the content repository, Interwoven TeamSite, and the IBM Portal Server assembly do not explicitly support branching of resources, each can only have one live version of resource at any one time. Therefore, embodiments of the invention use a hardware and environment based solution as opposed to one that is purely software based. In alternative embodiments, however, a software based solution may be implemented in accordance with the processes described herein.

In production stream 202, the BDE user works with BDE 206 to develop and manage content that can be deployed to synchronized SDE 208. BDE is used to refer to a combination of a content management system and portal server. BDE can consist of both TeamSite and Portal Server, and allows non-technical users to create portal pages and content fragments, and assemble the pages with functional IT artifacts. The synchronized SDE 208 is used for testing of both the content and code before being deployed to a production environment 212. The production environment is the one in which the final version of a resource resides, and the environment the customer or front end user will access. Additionally, the process may include deployment to a pre-production system 210 for more thoroughly testing the entire stream, including content, code, and html, before deployment to users. The pre-production environment is a synchronized SDE configured to mimic the configuration of the production environment. This can include host connectivity, firewall or security configuration or additional server setup. This is an optional environment that not all projects need, but that can be used to increase the level of confidence in testing. The synchronized SDE is directly connected to the BDE, allowing the ability to publish code and content that has been assembled by a user into an environment that can be used for various types of testing, i.e., UAT, OAT, etc. Multiple SDEs can be "connected" to a single BDE so that various types of testing can be performed in parallel.

Parallel stream 224 also has a user 218 using a separate BDE 220 with which a parallel stream is being developed. For testing of code and content on this stream, a separate synchronized SDE 222 is used. A parallel stream will also have its own set of synchronized SDE's in which various testing can take place. However, the same un-synchronized SDE's could be used for system testing the IT artifacts, although if this testing needs to be performed in parallel, then multiple un-synchronized SDE environments can be used. As a parallel stream cannot deploy to a production environment, a parallel stream does not require pre-production or actual production environments.

MKS is the source control system for IT artifacts, including themes, skins, and portlet applications. MKS does have built in parallel development support and tooling to allow developers to write and manage IT artifacts in parallel. The content and code within the system can be deployed to multiple parallel streams for further development. MKS 214 is connected to an unsynchronized SDE for testing of code and content without being synchronized to any particular BDE and development stream. An unsynchronized environment is a standalone portal server instance (not connected to the BDE of the TeamSite) that is used for deploying IT artifacts and performing system testing.

Figure 3:
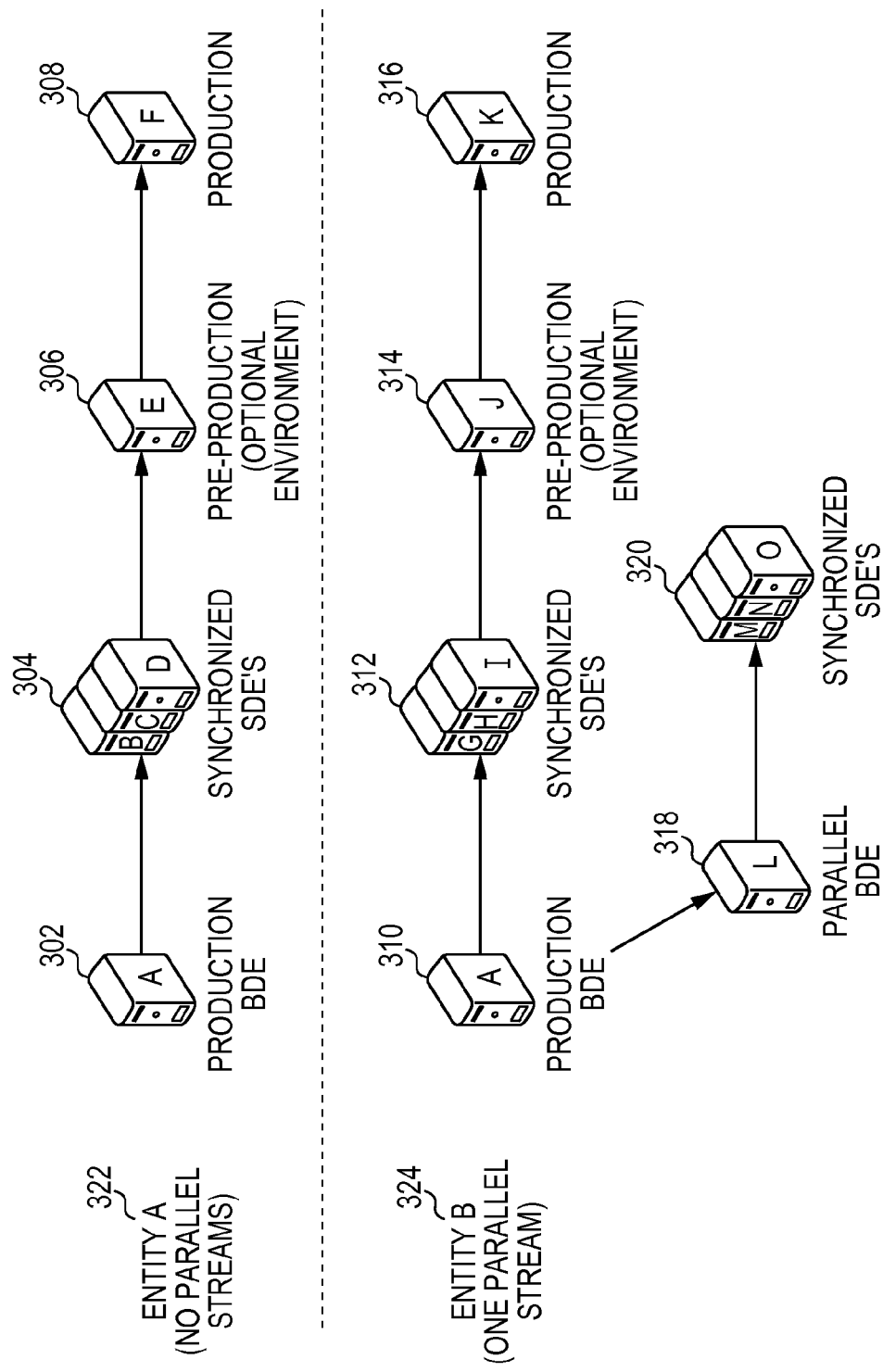
FIG. 3 is a system diagram showing the various system and entities involved in the parallel development process along with their unique artifact IDs.

FIG. 3 is a system diagram showing the various system and entities involved in the parallel development process and their unique portal IDs. Parallel environments on which parallel streams are developed can be done through provisioning or imaging. In imaging, an image of a harddisk is copied to another system to quickly generate an identical environment. In provisioning, using scripts or automated tools, a parallel environment is generated and configured in a way defined by the scripts.

A given resource that exist within parallel streams need to have the same object ID, ensuring that the same object is being modified in each parallel stream. FIG. 3 shows how the object ID environments within the parallel stream, such as, Entity A 322 and Entity B 324 can be different because of provisioning. The object IDs of synchronized SDE's 304, preproduction environment 306, and production environment 308 of Entity A are different than those of synchronized SDE 312, pre-production 314 and production 316 of Entity B. Similarly, a parallel stream based on Entity B 310 having parallel BDE 318 and synchronized SDE's 320 also has different object IDs. A script can be used to synchronize object IDs between production environments such as 302 and 310.

Figure 4:
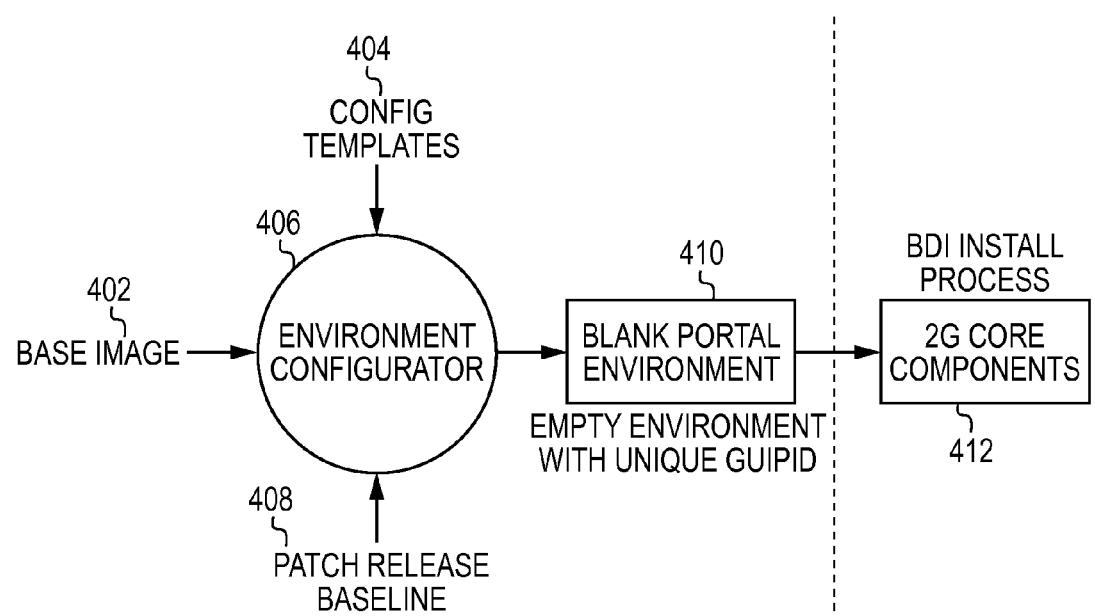
FIG. 4 is system diagram showing how an environment configurator can be used to provision new parallel BDE environments.

FIG. 4 is system diagram showing how an environment configurator 406 can be used to provision new parallel BDE and SDE environments on which parallel development can occur. The environment configurator uses a base image 402, along with configuration templates 404, and any patch 408 to create a portal environment 410. The BDI install process 412 then adds additional components to complete the provisioning.

Environment configurator 406 is software executing on a workstation or other computer, and which can be written in any number of programming or scripting languages. The Environment Configurator can use setup templates 404 or parameters that can be fed into the process to create different resulting configurations from a single base image 402. This allows quick changes to be made to the default environment configuration, without having to write complex scripts or use additional processes. The output of the process is a blank portal environment 410 that can be used as a BDE or SDE. This environment can then be adapted to a more specific function by installing other second generation (2G) components 412.

Figure 5:
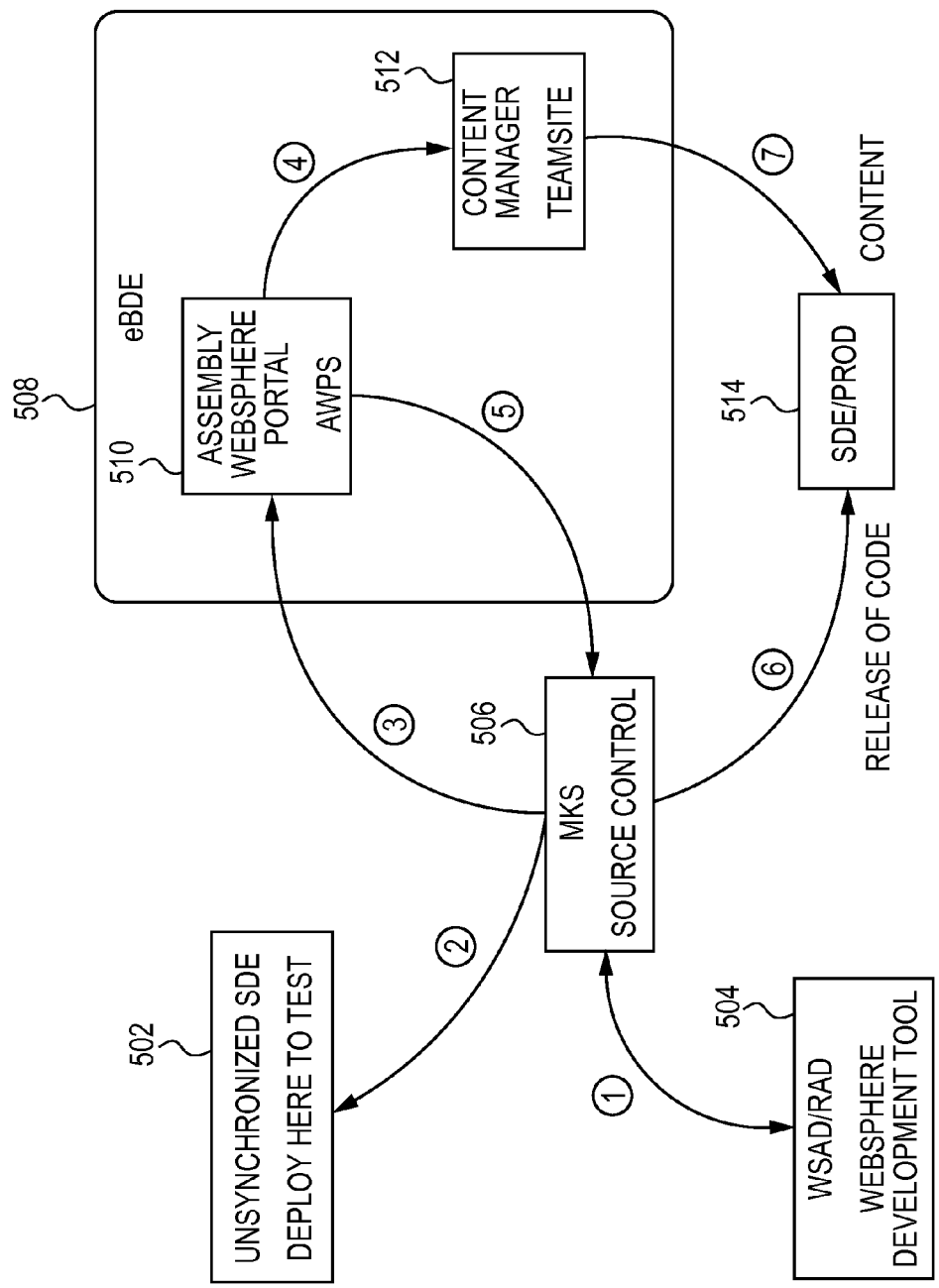
FIG. 5 is a system diagram showing the relationship between the systems involved in the parallel development process.

FIG. 5 is a system diagram showing the relationship between the systems involved in the parallel development process. The parallel development process includes application development system 504, a source code management system 506, and an unsynchronized SDE 502. After testing code and content, the application can be deployed to a parallel BDE 508 having a portal platform 510, and content management system 512, before being finally deployed to a production synchronized SDE 514 for use by end users.

Development system 504 is any source code or content development system, such as, Websphere Studio Application Developer. This system is used by engineers and designers to create the code or content that will eventually be deployed to production systems. MKS is a source code management system that stores the code being developed. As the code is being developed, it can be tested on unsynchronized SDE 502, which is not linked to any BDE. This provides a convenient way to test code.

BDE 508 is made up of portal platform 510, which is used to create and modify pages of the web application. This content is stored in content management system 512, for example, Interwoven TeamSite. Production system 514 executes this code and content once it is ready for end-users. Portal platform 510 and content management system 512 are connected through a network.

In operation, source code is developed for a specific application as part of a parallel development environment project using development system 504, and is checked into source code management system 506. When the developed source code is ready for release, a checkpoint within the source code management system 506 is created. The source code is then extracted and web application archives (WARs), EARS, etc. are built and deployed to unsynchronized SDE 502 for testing.

Next, source code, themes, skins, etc. are extracted from the source control management system 506 and content management system, and WARs, EARs, etc. are built. The resulting "build package" is deployed to the assembly portal platform 510. Pages, content fragments, etc. are created/modified in the eBDE 508 and stored in the content management system 512. When the content artifacts are ready for release, an edition is created, effectively versioning the non-technical business users' content release in a similar way to that done within the source code control system for the IT centric artifacts.

To finally release the code and content as a web application, a "release package" (with Websphere Portal object IDs for example) is exported from the assembly portal platform 510, and checked into source code management system 506. A "release package" is then extracted from source code management system and imported into SDE 514. Regarding page definitions, content fragments, and other content, they are 'extracted' from the content management system 512 and 'imported' into the SDE 514. In this way, the SDE has a versioned edition of both the code and content for the application that can now be used by end users.

Figure 6:
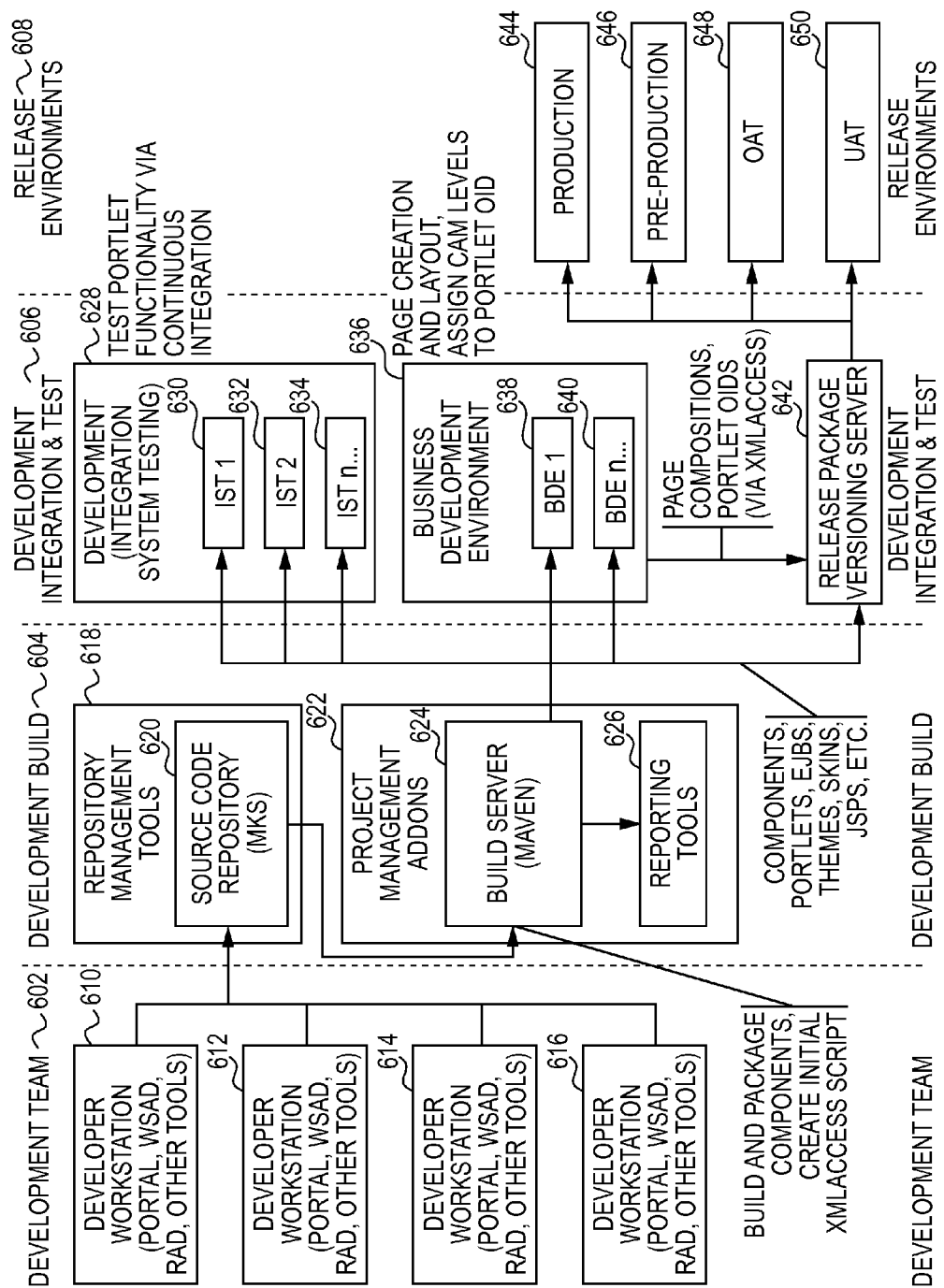
FIG. 6 is a more detailed system diagram showing the relationship between the systems involved in the parallel development process.

FIG. 6 is a more detailed system diagram showing the relationship between the systems involved in the parallel development process. The diagram shows the relationship between the development team 602, development build 604, development integration and test systems 606, and release environments 608.

The development systems include developer workstations 610-616 which are used to host development and testing tools and environments. The development environments provide source code to the systems used for building the code 604. These systems include repository management tools 618, which themselves include a SCM 620. SCM 620 provides source code from the repository to project management add ons 622. These add ons include a build server 624 for building source code, and reporting tools 626 for reporting on the build process.

After the source code has been built it is provided to integration testing system 606. This system 628, which contains one or more testing systems 630-634 and the BDE 636, which contains one or more BDEs 638-640, is used for testing of the built code.

After testing has been completed, the built code and content is supplied to release package versioning server 642. This server provides a location to store and manage testing of applications and content, it also provides a platform for deploying the application to preproduction system 646 for operations acceptance test (OAT) 648 and user acceptance test (UAT) 650. Once testing of the release is completed it can be deployed to production server 644.

Figure 7:
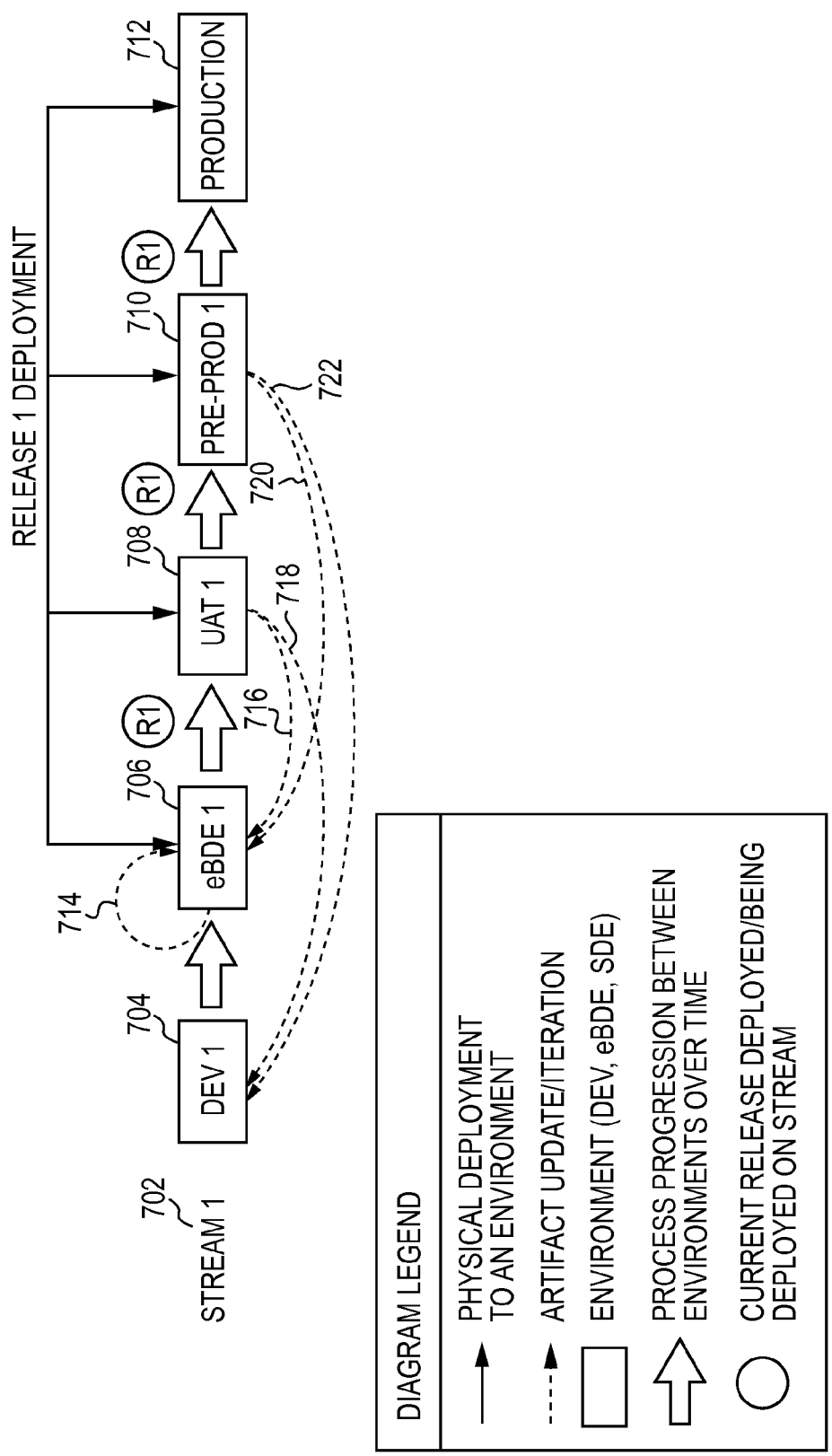
FIG. 7 is a system diagram showing the flow of information between environments in the parallel development process for a first release.

FIG. 7 is a system diagram showing the flow of information between environments in the parallel development process for a first release. A stream1 release 702 of code and content is shown moving from a development environment, through BDE environment 706, and testing environments 708 and 710, before being deployed on production systems 712.

Stream1 702 represents a set of code and content that is being developed. The code is developed on development systems 704, before moving to BDE 706 for testing along with content. After the code has been successfully tested on the BDE system, it can be deployed to another environment for user acceptance testing (UAT) 708. After user acceptance testing has been performed, the release can be deployed to a pre-production environment 710, that closely corresponds to the production environment 712, for final testing before being used by end users.

During the development and testing process, the code and content can be edited and fixed. These reverse flows are show by arrow 714, which shows the testing and editing cycles of code and content on the BDE 706. This is also shown by arrows 716 from UAT back to BDE 706 and by arrow 718 from UAT back to development system 704 for code that has failed user acceptance testing. Another path for revising code and content is also shown by arrow 720 from pre-production to BDE, and arrow 722 from pre-production to development 704.

Figure 8:
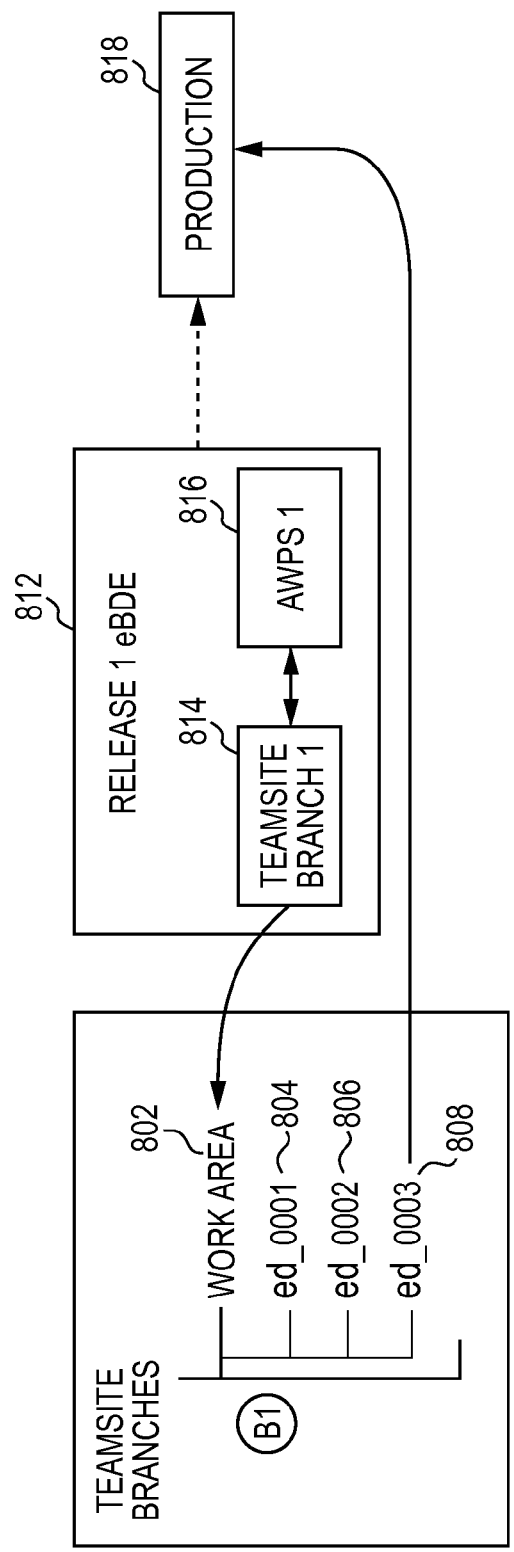
FIG. 8 is a system diagram showing the corresponding workareas within the environments.

FIG. 8 is a system diagram showing the corresponding workareas within the content management system as the code moves through the different development and testing environments. The content management system 814 has an internal branched storage structure 802 to store multiple editions of content. In accordance with the MPP, these internal editions are made to correspond to releases of content with accompanying code. The internal workarea 802 is shown with 3 editions of a single branch of code, 804, 806, and 808 in this example. These would correspond to the V1.0, V2.0, V3.0 shown in FIG. 1. Edition 808 is shown being deployed to production and corresponds to a fully tested parallel edition of the code. Other versions 804 and 806 may correspond to parallel versions of the code that were being developed and that were merged into the final version 808, or versions of content that did not pass testing and needed to be revised.

Figure 9:
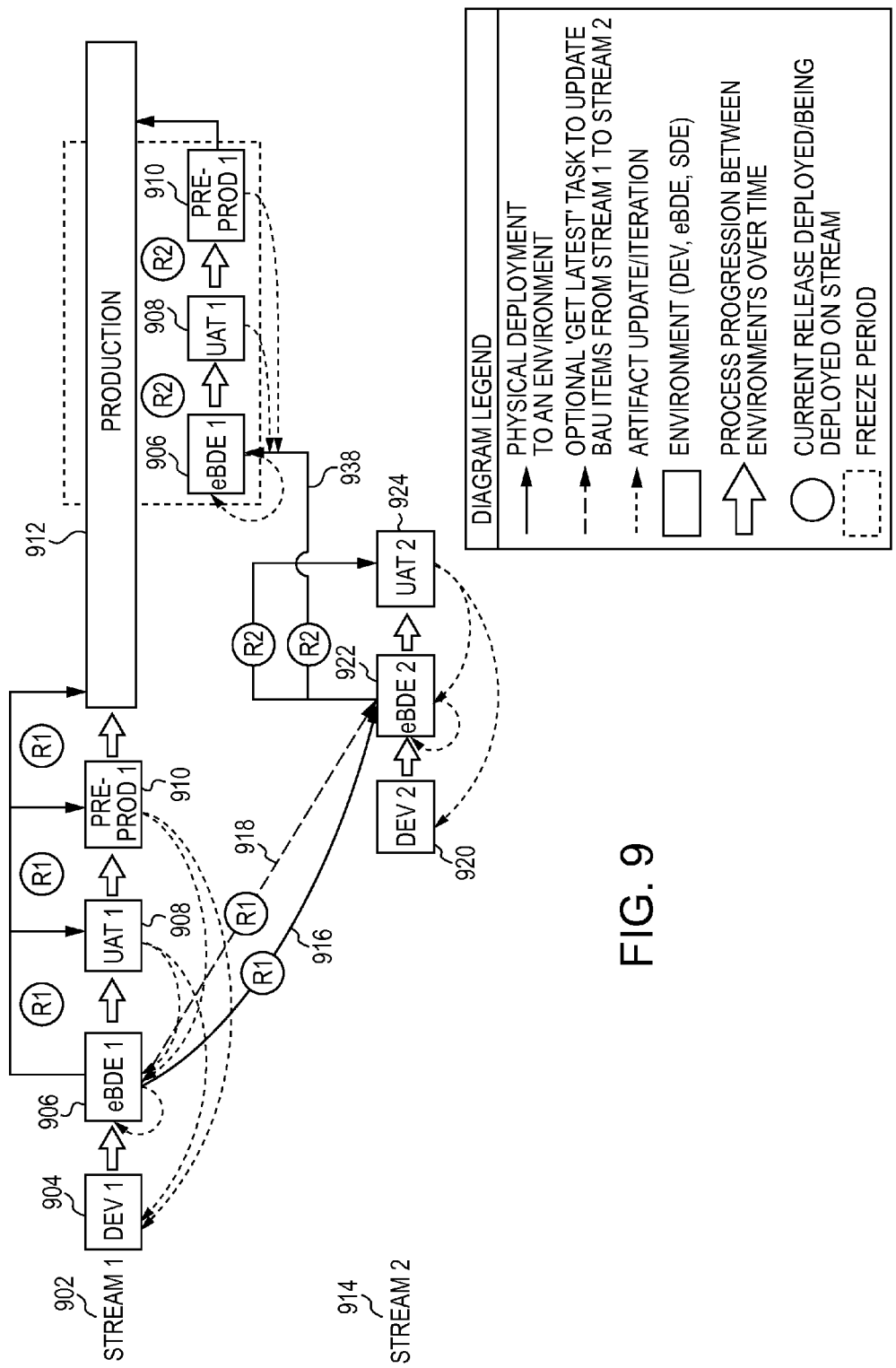
FIG. 9 is a system diagram showing the flow of information between environments in the parallel development process of a second release.

FIG. 9 is a system diagram showing the flow of information between environments in the parallel development process of a second release based on a first release. This diagram shows a stream1 902 and stream2 914, and the flow of code and content between them as deployments to production 912 are made.

Stream1 is similar to that shown in FIG. 8, and follows a path from development environment 904 to BDE 906, to UAT 908, to pre-production 910, and finally to production 912. Similar to FIG. 8, the code can be modified and moved back to through the deployment flow to be retested.

Stream2 represents a parallel development stream of an application to the production stream. The stream also has a development environment 920, a BDE environment 922, and a UAT testing environment 924. These development and testing environments are synchronized with the main path, allowing any changes to be merged in.

Stream2 914 follows a similar path to that shown for stream1 902, except it starts from a release of the main path, as shown by arrow 916. It then moves onto eBDE 922, and UAT 924 for testing. From testing it moves to the production environment and further testing by eBDE 906, UAT 908, and pre-production 910, before being merged into production 912. Before stream2 is being deployed to production 912, it is first merged into stream1. This way there is only one branch that is the production branch. Arrow 938 shows this promotion, or merge, between the BDE 922 of stream2 and the BDE 906.

Figure 10:
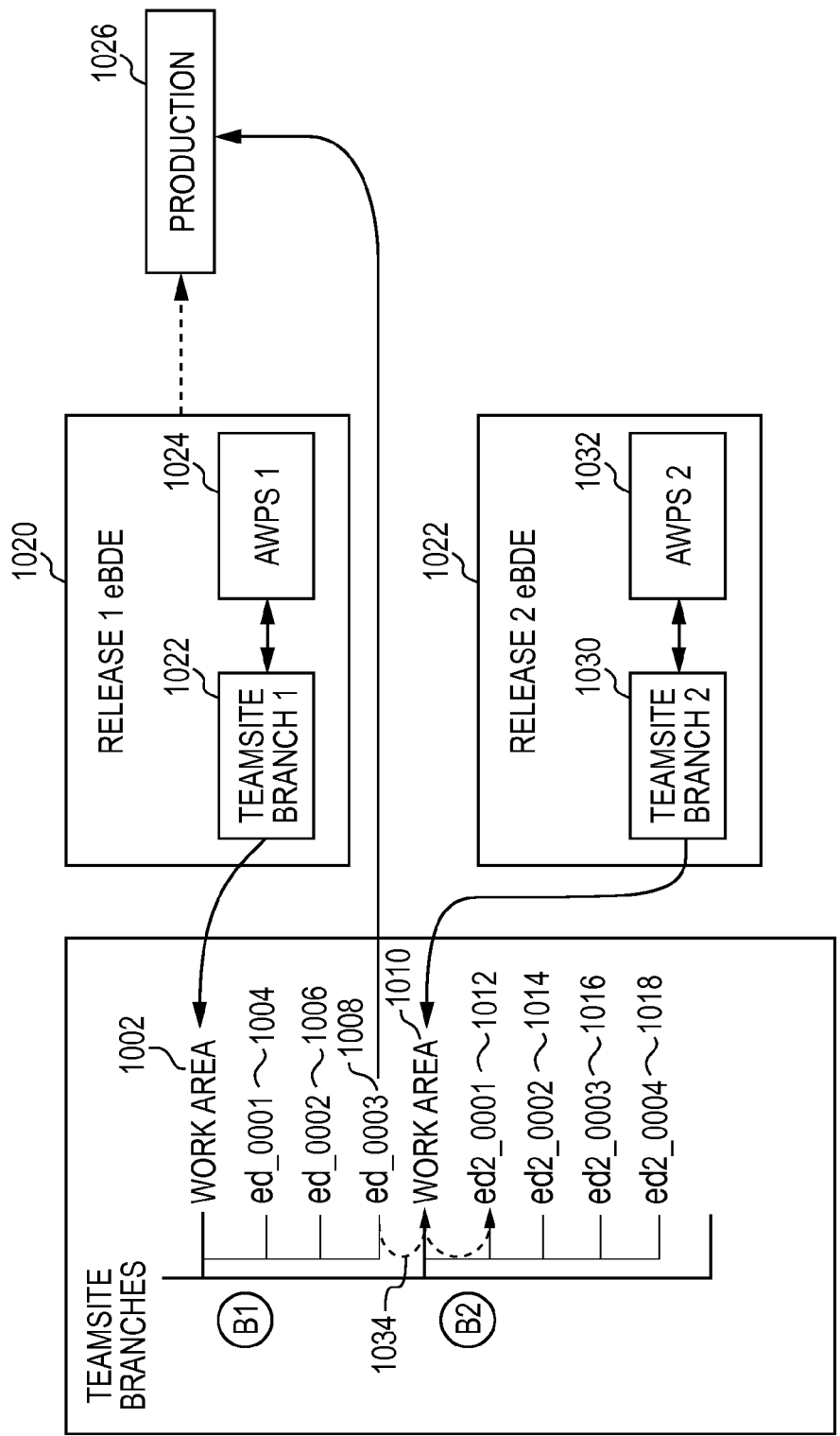
FIG. 10 is a system diagram showing the corresponding workareas within the environments.

FIG. 10 is a system diagram showing the corresponding workareas 1002 and 1034 within the content management system that corresponds to the released version of code and content. Similar to FIG. 8, this diagram shows the internal branched structure of the content management system.

The content management system 1022 is shown with a workarea 1002 that has three editions (versions) of a project 1004, 1006, and 1008. This code is tested on BDE 1020, which is shown installed with TeamSite branch1 1022 and Websphere platform 1024. Afterwards the code is deployed to production 1026.

Content management system also contains another workarea 1010 for the versions of content in parallel stream2. This work area 1010 contains multiple editions of a project as shown. This example shows four editions 1012, 1014, 1016, and 1018. Versions of code from this work area are deployed to BDE environment 1022, which is shown installed within TeamSite branch2 1030 and Websphere Portal platform 1032.

Arrow 1034 shows how a project from one parallel stream can be branched to another parallel stream for further development. In this case ed_003 1008 of stream1's workarea 1002, was branched to stream2's workarea 1010 as ed2_0001. From this, further editions that have been created (e.g. 1014, 1016, and 1018) are shown. Similarly, after development and testing of parallel versions has been done using BDE 1022, the code can be merged back into stream1. For example, the code can be merged into ed_0003 1008 of the first stream. The code can then be deployed to production 1026.

Figure 11:
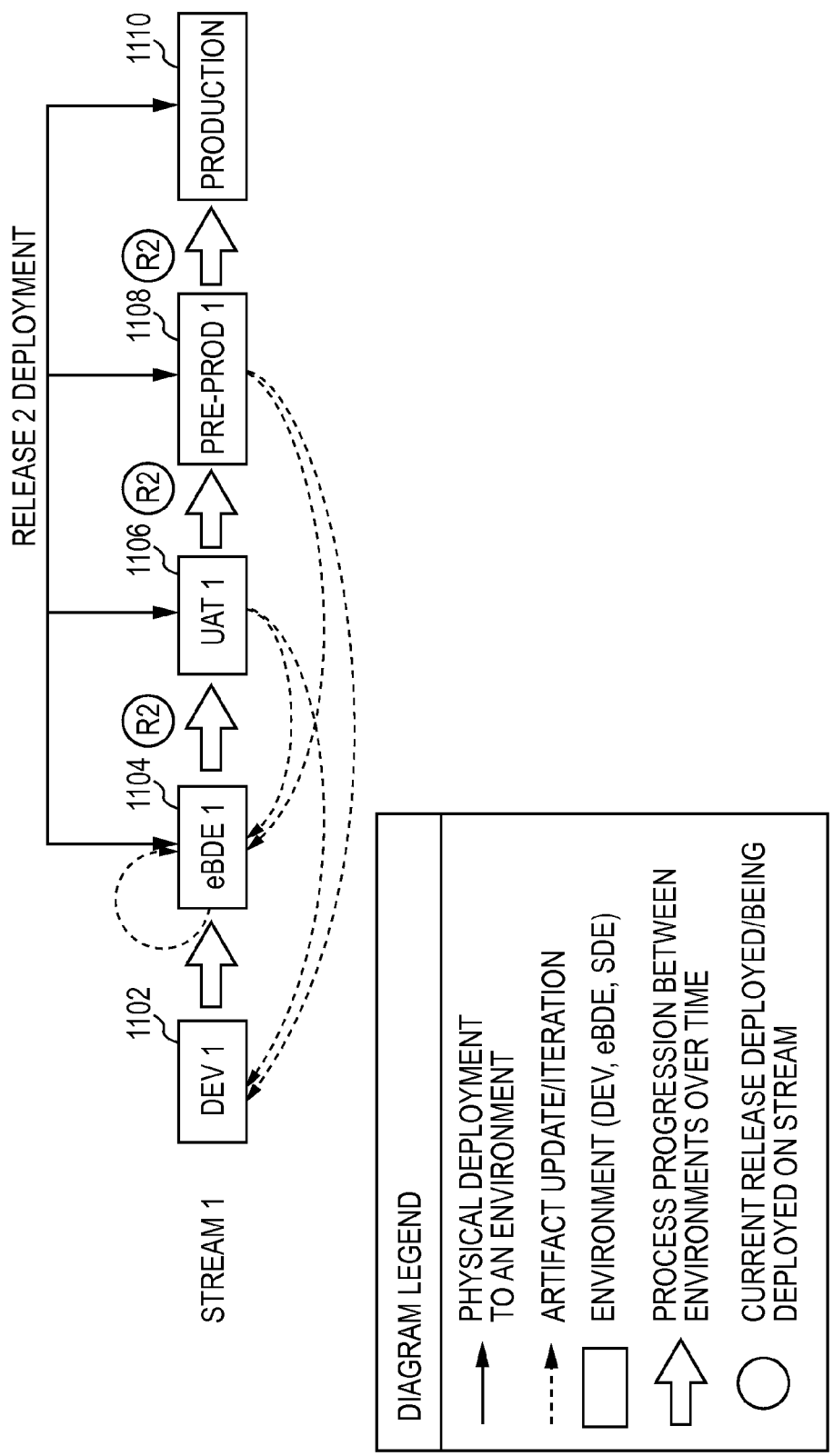
FIG. 11 is a system diagram showing the flow of information between environments in the parallel development process of a second release.

FIG. 11 is a system diagram showing the flow of information between environments in the parallel development process of a second release. This shows more clearly that a second release of the first stream (e.g. a non-parallel version 1.1) goes through the same environments as the first version of stream1 before being deployed to production. This includes a development environment 1101, BDE 1104, UAT 1106, pre-production 1108, and production 1110.

Figure 12:
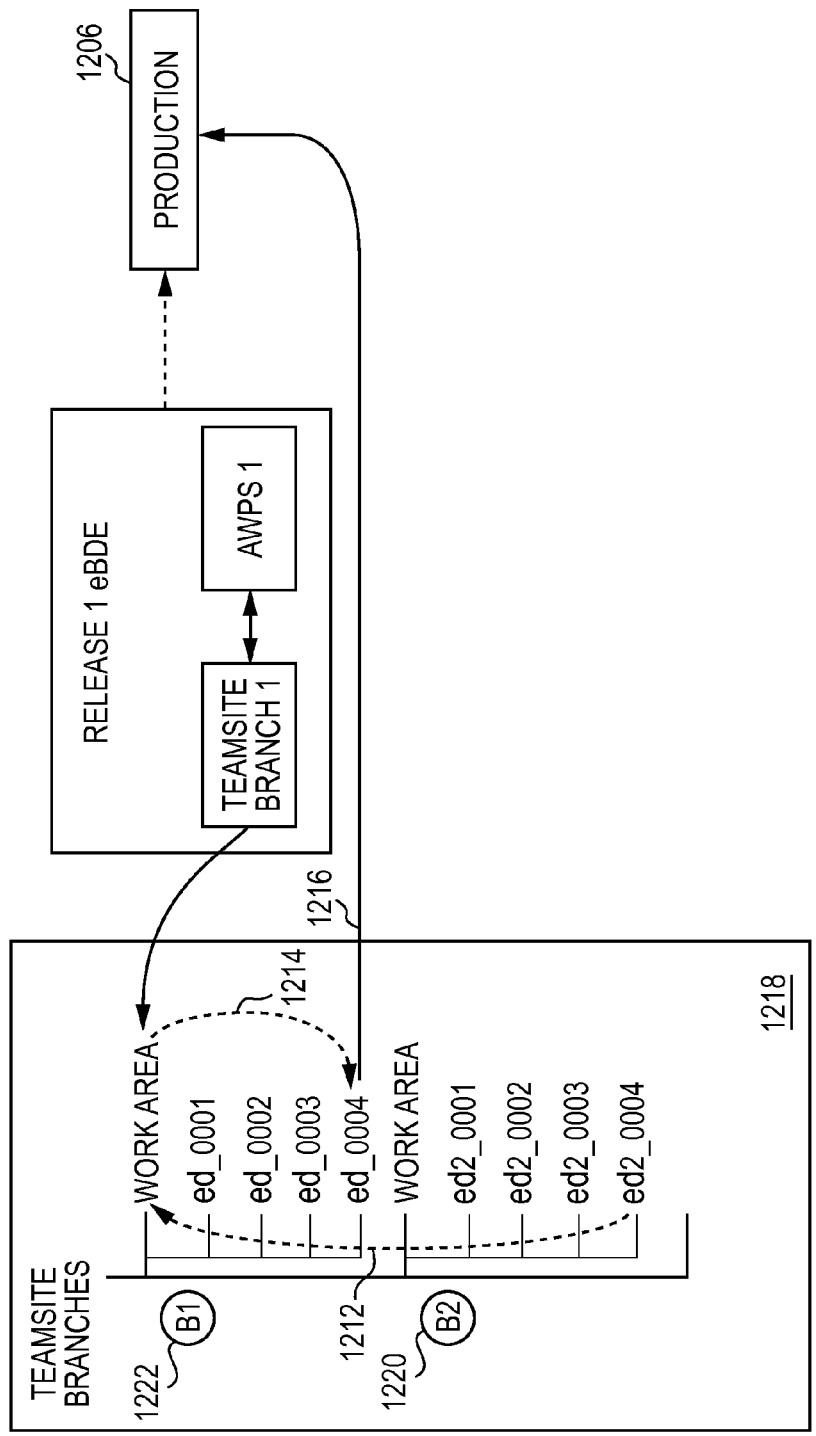
FIG. 12 is a system diagram showing the corresponding workareas within the environments.

FIG. 12 is a system diagram showing the corresponding workareas within the environments. FIG. 12 more directly shows that an edition of code 1218 can move from a parallel branch 1220 back to a production branch 1222 (e.g. from ed2_0004 to ed_0004 1216 using paths 1212 and 1214). This new edition 1216 can then be deployed to production 1206.

Figure 13:
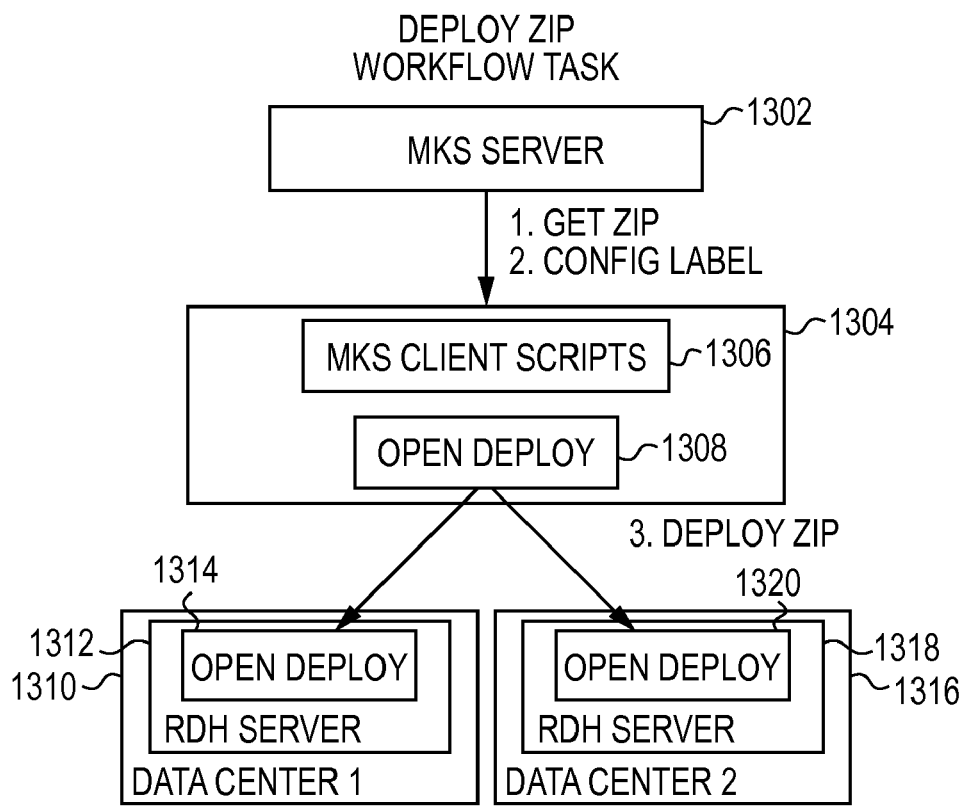
FIG. 13 is a system diagram showing the design of the deployment component of the MPP.

FIG. 13 is a system diagram showing the design of the deployment component of the MPP. The deployment component has a SCM server 1302, a set of scripts 1304, including SCM client scripts 1306, and deployment scripts 1308. Using these scripts, code and content is deployed to one or more data centers, for example, datacenter1 1310 and datacenter2 1316.

SCM server 1302 contains the code and content to be deployed to testing and production systems. The Getzip function is a function of the MPP system that connects the SCM server to the opendeploy component. The Getzip function retrieves a build ticket which is saved on the content management system server 1304 and uses the information in the build ticket to create a deployment package. The ConfigLabel function connects the content management system to the SCM server and saves retrieved labeled files on the content management server. The ConfigLabel function also merges the retrieved build ticket zip file. The last function in the deployment workflow is the DeployZip function, which uses the opendeploy scripts to deliver saved zip files to the destination Run-time Deployment Helper (RDH) in a particular data center.

Figure 14:
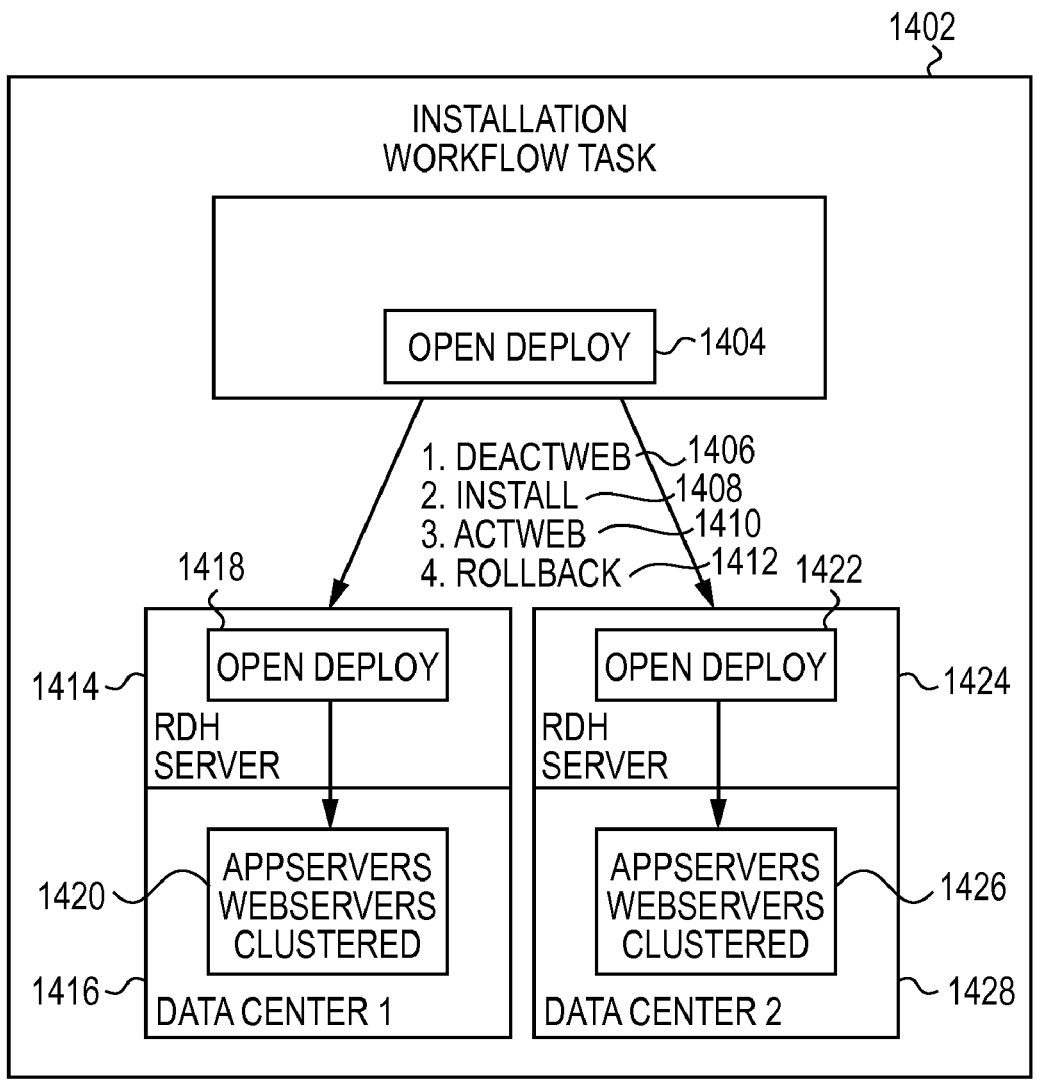
FIG. 14 is a system diagram showing the design of the installation component of the MPP.

FIG. 14 is a system diagram showing the design of the installation component of the MPP. The installation workflow installs the deployed build tickets. The open deploy component 1404 controls the process of deploying the build tickets from the RDH servers 1414 and 1424 to the Data centers 1416 and 1428. The opendeploy process includes the DeActWeb 1406, Install 1408, ActWeb 1410, and Rollback 1412 tasks.

The DeActWeb process uses open deploy services 1418 to trigger a script on the destination RDH server 1414 to deactivate webserver instances in preparation for installation of a new build. If there are no issues, the workflow reports the success of the process to the user, and automatically starts the next process that is part of the open deploy process.

The install process 1408 uses the opendeploy services 1418 to trigger a script on the destination RDH server 1414 to install the build ticket zip file that was created during the deploy zip task.

The ActWeb process 1410 uses open deploy services 1418 to trigger a script on the destination RDH server 1414 to activate the webserver instances. If there are no issues, the workflow reports a success of the current process to the user, and automatically starts the next part of the open deploy process.

The rollback process 1412 uses open deploy services 1418 to trigger a script on the destination RDH server 1414 to restore a backed up file system and portal database. A rollback can be necessary if the opendeploy services are down, or if the install script issued a failure during the open deploy process.

Figure 15:
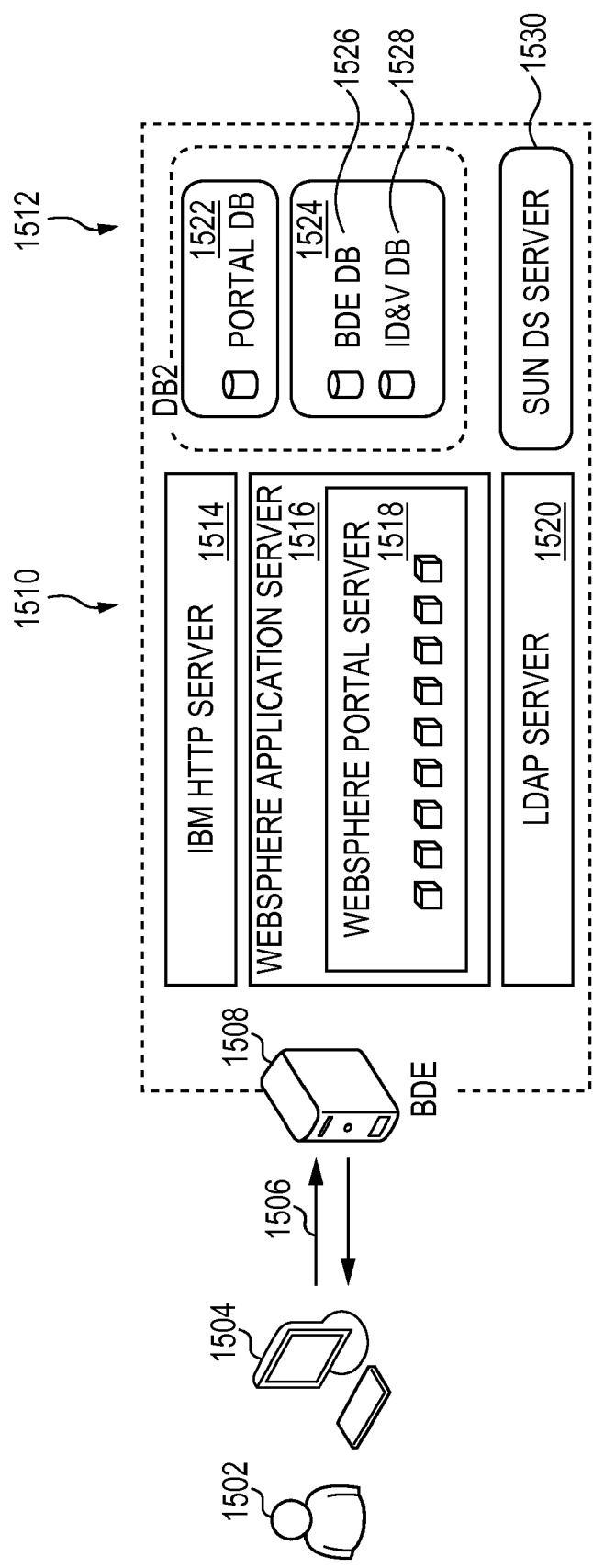
FIG. 15 is a system diagram showing the implementation of a BDE.

FIG. 15 is a system diagram showing the implementation of a BDE environment. The BDE environment includes a user 1502 connecting through a client 1504 (e.g. web interface) to a BDE environment 1508. The BDE environment 1508 includes a web server 1514 and supporting system 1510 as well as a database system 1512.

In accordance with at least one embodiment of the invention, resources within the portal server have a unique identifier that is spawned using the portal GUPID. If the portal GUPID is the same between two environments, there is the risk that two or more objects ID's between the streams could be the same. This would mean that two different resources with the same unique identifier are being managed. A parallel stream BDE behaves in a similar way to a synchronized SDE. Unlike an SDE however, a user can create new resources on a parallel BDE, thereby ensuring that the GUPID is unique between the environments. This way all newly created resources are guaranteed to have truly unique identifiers. In alternative embodiments, other identification mechanisms may be used to identify resources.

In detail, the user 1502 is any user, such as a software developer accessing the MPP system. This user uses a web interface through computer 1504 that is provide by BDE environment 1508 over network link 1506. This web interface is provided by a webserver 1510, for example, an IBM http server 1514 in combination with an application server 1516, a portal server 1518, and a LDAP server 1520. Application server 1516, such as Websphere, provides the ability to run web applications. In this way, the MPP system can be built using Java applications. The Websphere portal server 1518 provides a presentation layer for the application layer.

The BDE environment also includes a database layer 1512. This database layer includes a portal database 1522 for storing objects and pages used within the portal. The database layer also includes a BDE database 1526 for storing the projects being worked on, and an ID&V database 1528 for storing user profile information for identification and verification purposes.

Figure 16:
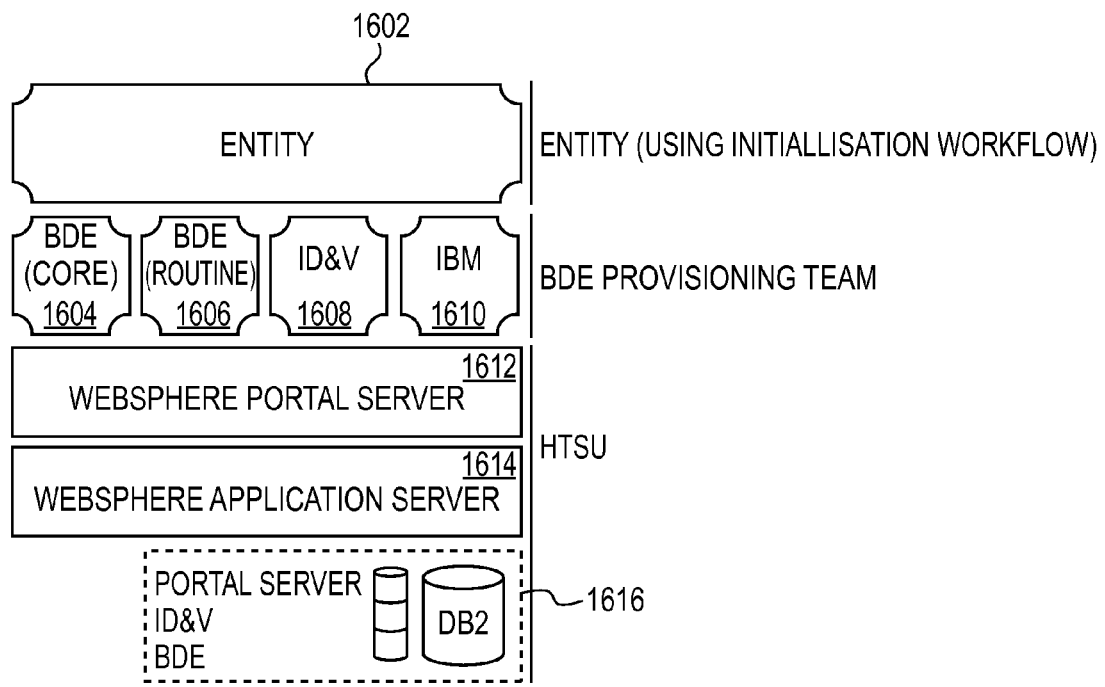
FIG. 16 is a system diagram showing further details of the BDE environment.

FIG. 16 is a system diagram showing further details of the BDE environment. The BDE environment includes a base infrastructure and configuration layer made up of a portal server, an identification and verification component, a database component 1616, an application server 1614, and a portal server 1612. The BDE environment also includes a base layer made up of the base BDE 1604, the BDE runtime 1606, the ID&V component 1608, and the code and content 1610 for the portal and application. The BDE environment also includes an entity layer 1602 with entity specific code and content that corresponds to the parallel project.

Figure 17:
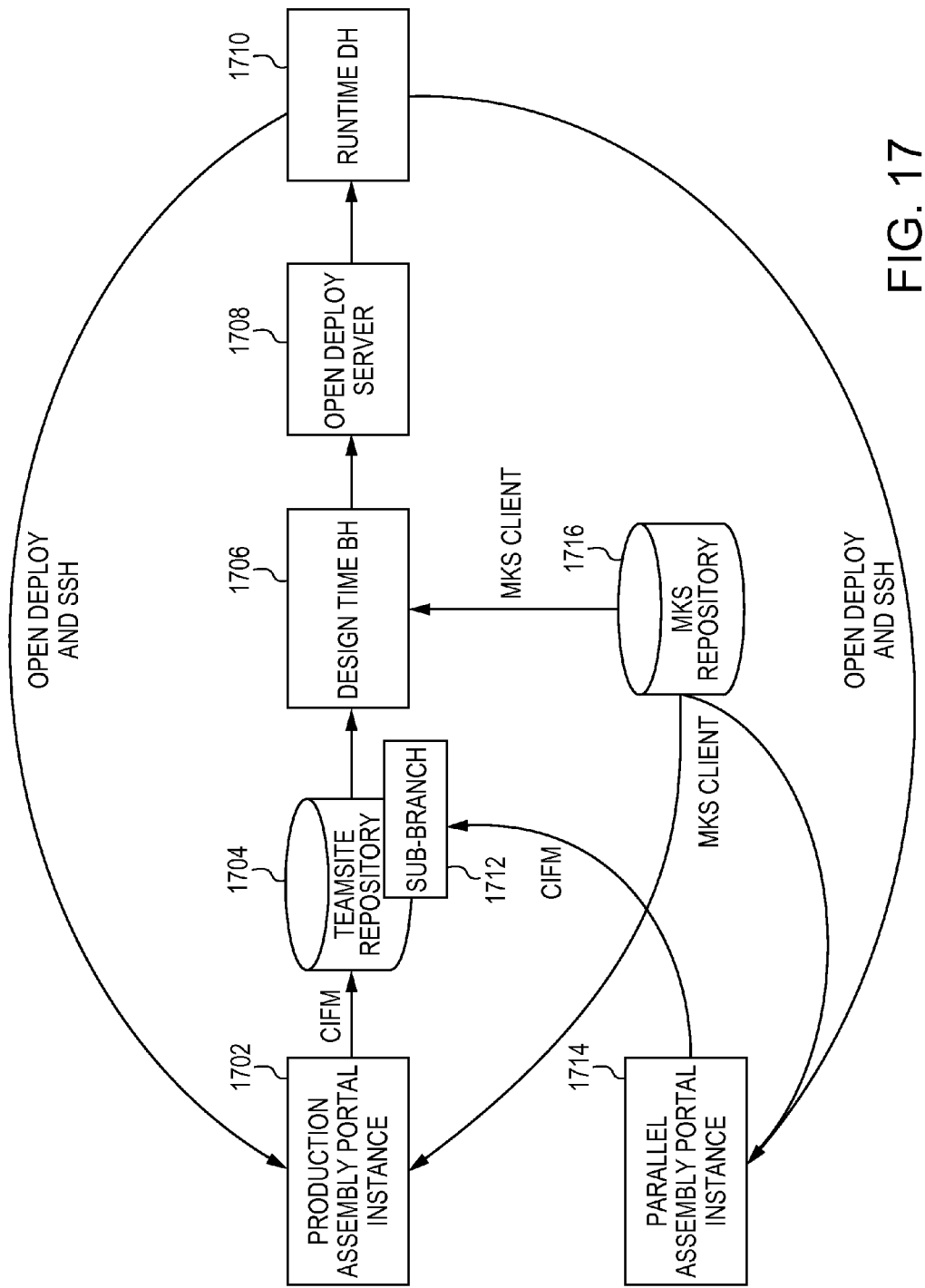
FIG. 17 is a system diagram showing the flow of information between systems in the MPP.

FIG. 17 is a system diagram showing the flow of information between components in MPP system. The system includes a production assembly portal instance 1702 and a parallel portal assembly instance 1714. The system also includes team site repository 1704 and MKS repository 1716. Other components of the MPP system includes design time build helper 1706, open deploy server 1708, and runtime deployment helper 1710.

The MPP system is made up of a production assembly portal 1702, which is the production application that has been tested and deployed. Before an application is deployed to the production system, it is developed in parallel on parallel assembly portal instance 1714. This parallel development environment can access a parallel branch of code in source code control system 1716. Access is through the source code control system's client interface. One example source code control system is MKS. The parallel development environment is also connected to a content management system 1704, such as TeamSite, which has a subbranch 1712 of content corresponding to the parallel branch of code being developed. The content which is stored in the content management system can be accessed on the application machine through a protocol like the CIFS protocol.

The content management system 1704 and the source code control 1716 system are connected to the design time build helper 1706 which and the open deploy server 1708 which contain the scripts and code for managing the deployment of the parallel stream as described above. Deployment is done first to the runtime DH 1710, and then through SSH to the production assembly portal instance 1702.

Figure 18:
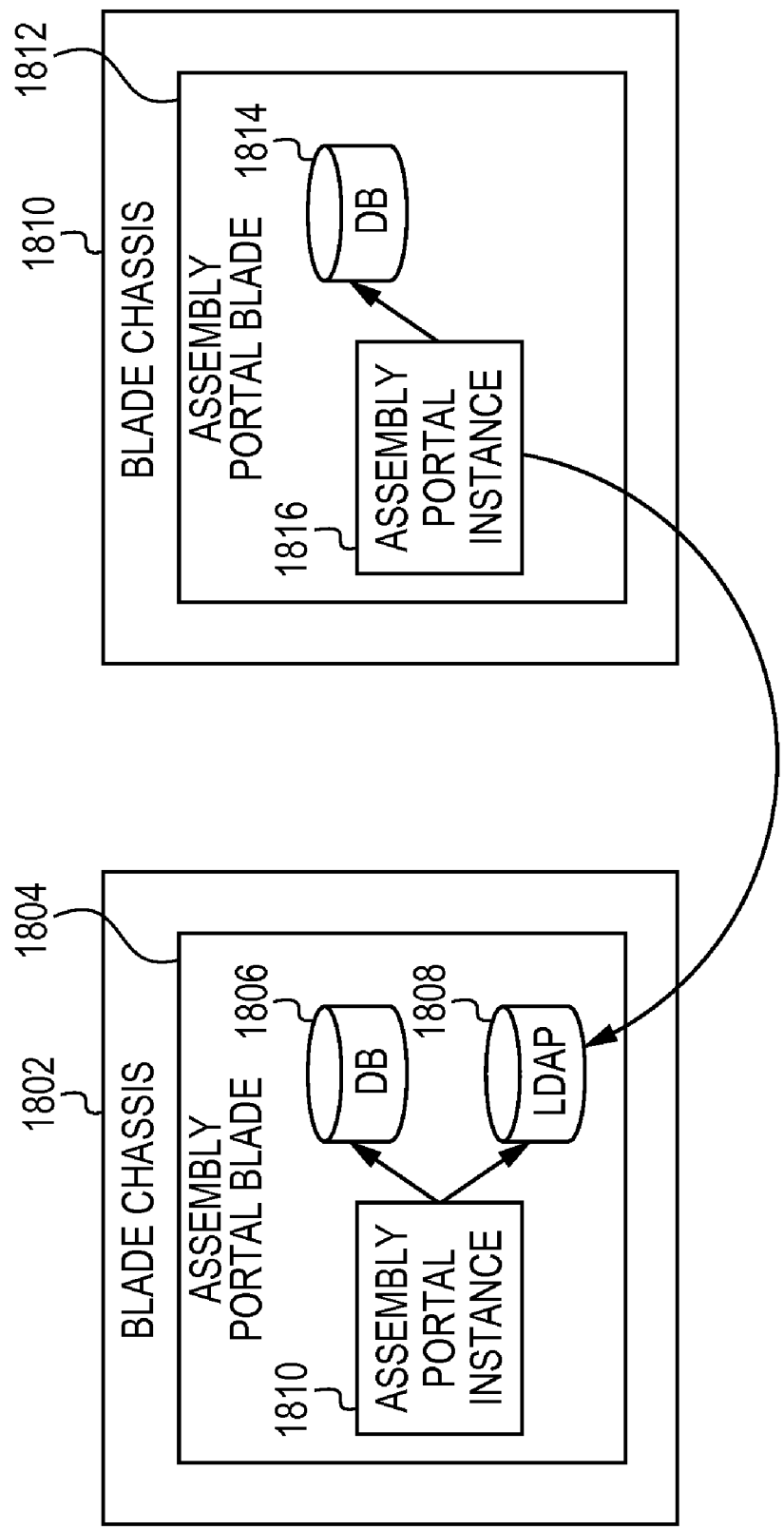
FIG. 18 is a system diagram showing the communication of directory information between systems.

FIG. 18 is a system diagram showing communication of directory information between systems. FIG. 18 shows a production BDE environment 1802 installed within a blade chassis 1802. The assembly portal blade 1806 includes a database 1806 for storing content related to the assembly portal interface 1810. The BDE environment also includes an LDAP directory server 1808 for authentication purposes.

Connected to production BDE environment 1802 is a parallel development environment 1810 that is also installed on a blade chassis 1812. The parallel development environment also includes a content database 1814 and assembly portal instance 1816. The parallel development environment, to simplify the architecture, can use the directory information from a production environment. Alternatively, both the production and parallel environments can have their own directory information which can be synchronized using replication. This also makes failover possible, increasing fault tolerance.

Figure 19:
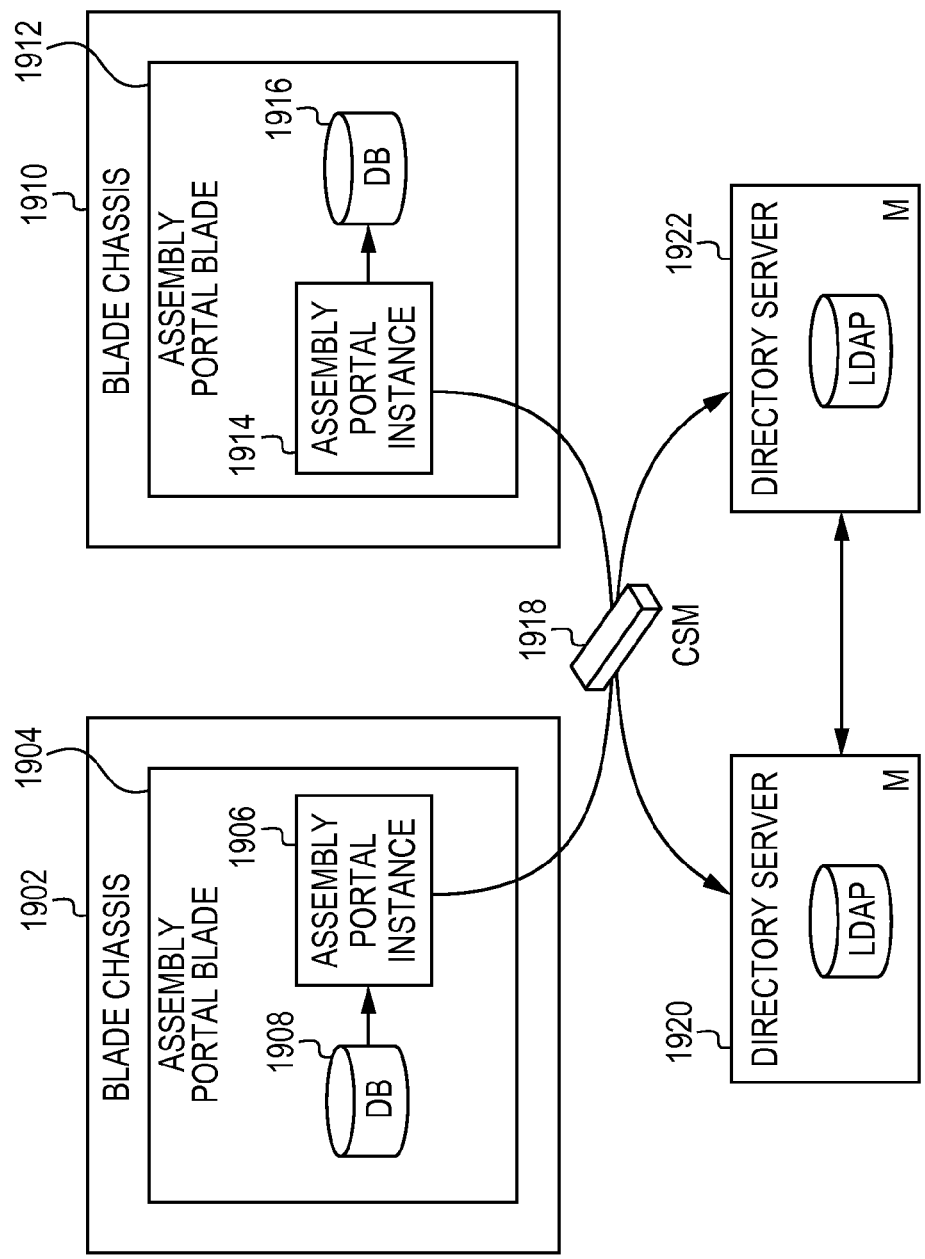
FIG. 19 is a system diagram showing further details of the communication between systems.

FIG. 19 is a system diagram showing a more advanced version of directory information sharing between the production assembly portal instance 1902 and a parallel development assembly portal instance 1910. The system is similar to that shown in FIG. 18, however, it uses centralized and redundant directory servers. The production assembly portal instance 1902 is connected through a content switch 1918 to a first directory server 1920. This first directory server 19020 is connected to a second directory server 1922. These two directory servers can replicate information between themselves, and provide failover support for each other. In this way, the parallel assembly portal instance can connect to the same centralized directory servers 1920 and 1922 as the production assembly portal instance.

Figure 20:
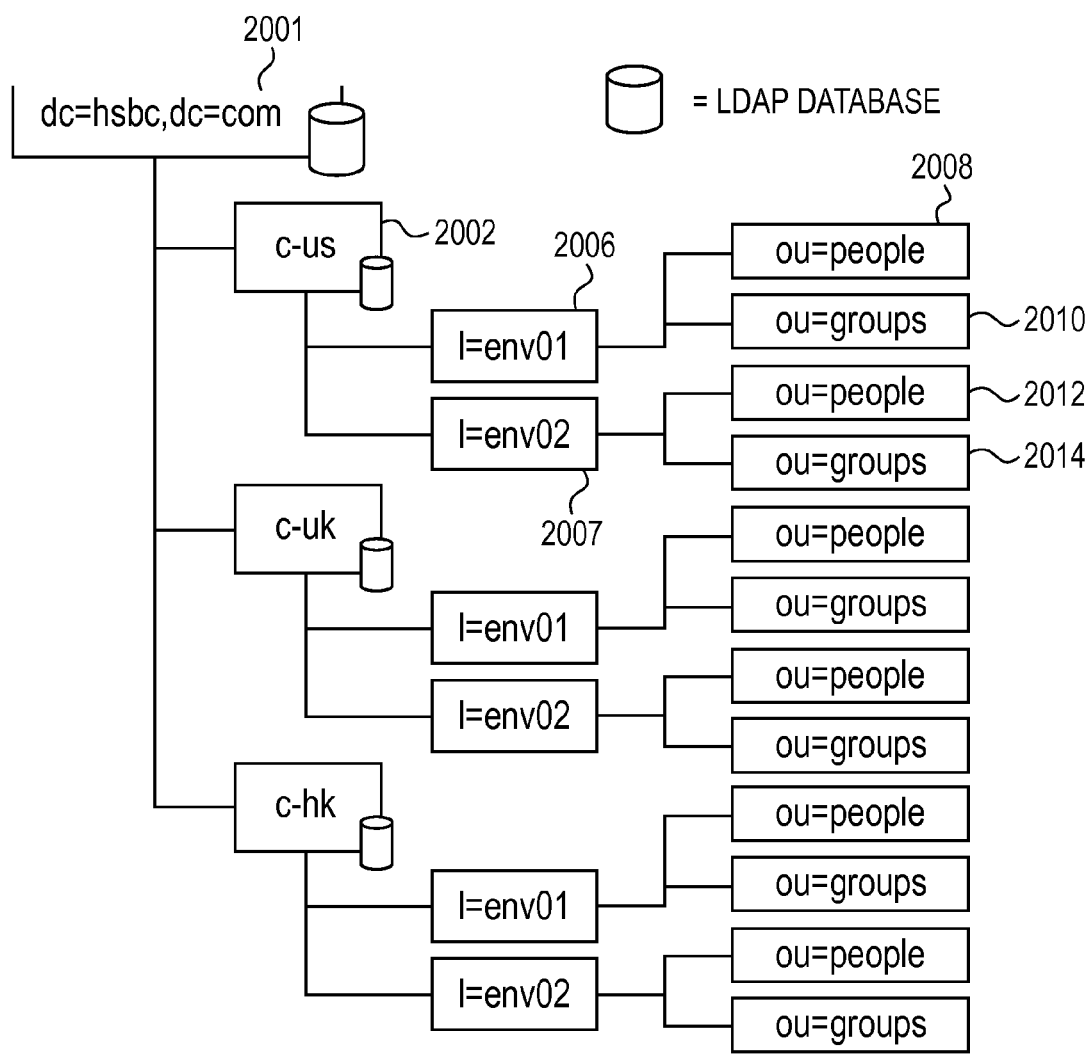
FIG. 20 is a system diagram showing details of a directory system capable of being used with the MPP.

FIG. 20 is a system diagram showing details of a directory system capable of being used with the MPP. The directory system 2001 is a hierarchical directory system that is used to manage user information. The directory system 2001 is divided into different regions (e.g. US region 2002), each of which can be further divided into multiple environments 2006 and 2007. Within this system there is the ability to move, copy, and re-produce user accounts between the production and parallel environments. There is also the ability to synchronize all the parallel streams and manage the entire directory from a single location and interface.

Figure 21:
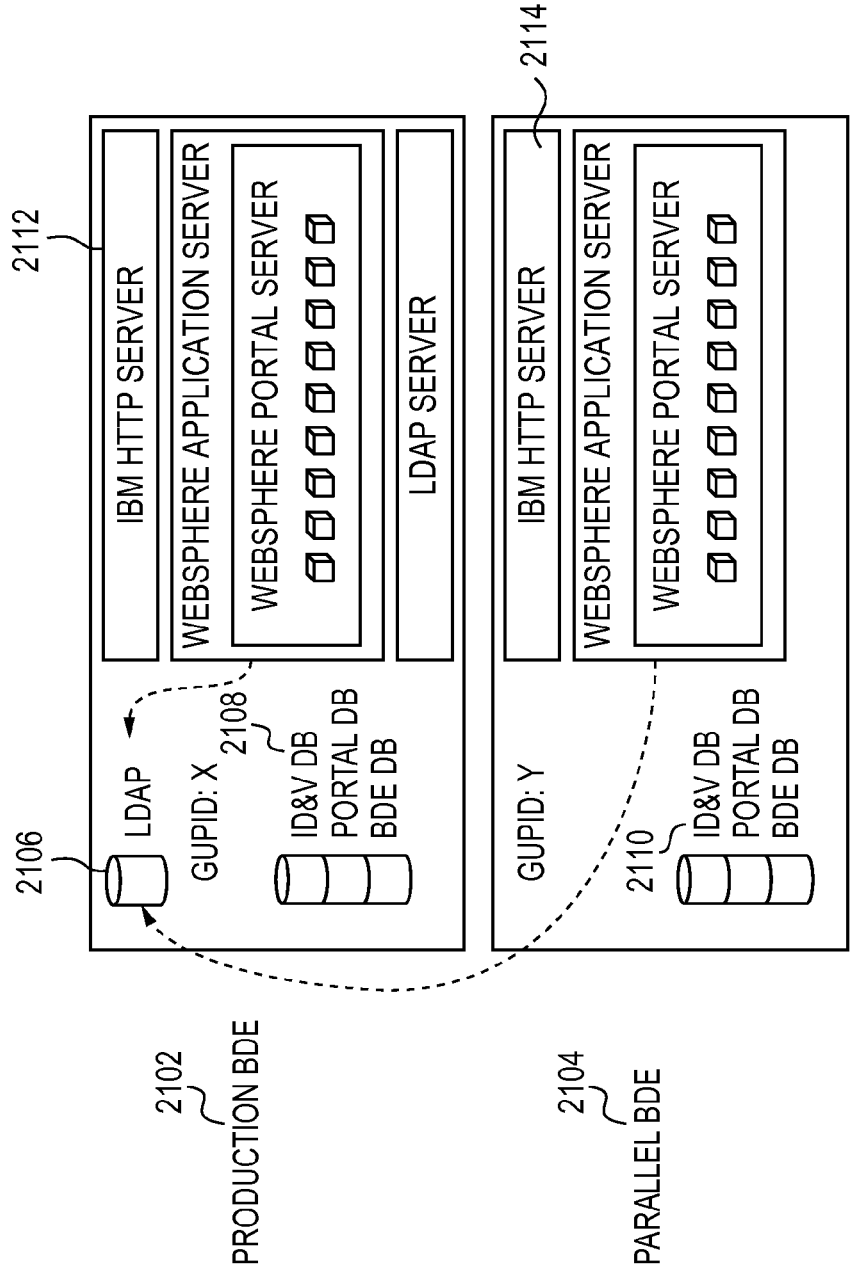
FIG. 21 is a system diagram showing the sharing of directory information between parallel BDE systems.

FIG. 21 is a system diagram showing sharing of directory information between parallel BDE systems. The diagram shows a production BDE 2102 and a parallel BDE 2104. The production BDE includes an application environment 2112 and supporting infrastructure 2108. It also includes directory server 2106 which can be used both by production BDE 2102 and parallel BDE 2104. Parallel BDE 2104 only includes an application environment 2114 and supporting infrastructure 2110.

Figure 22:
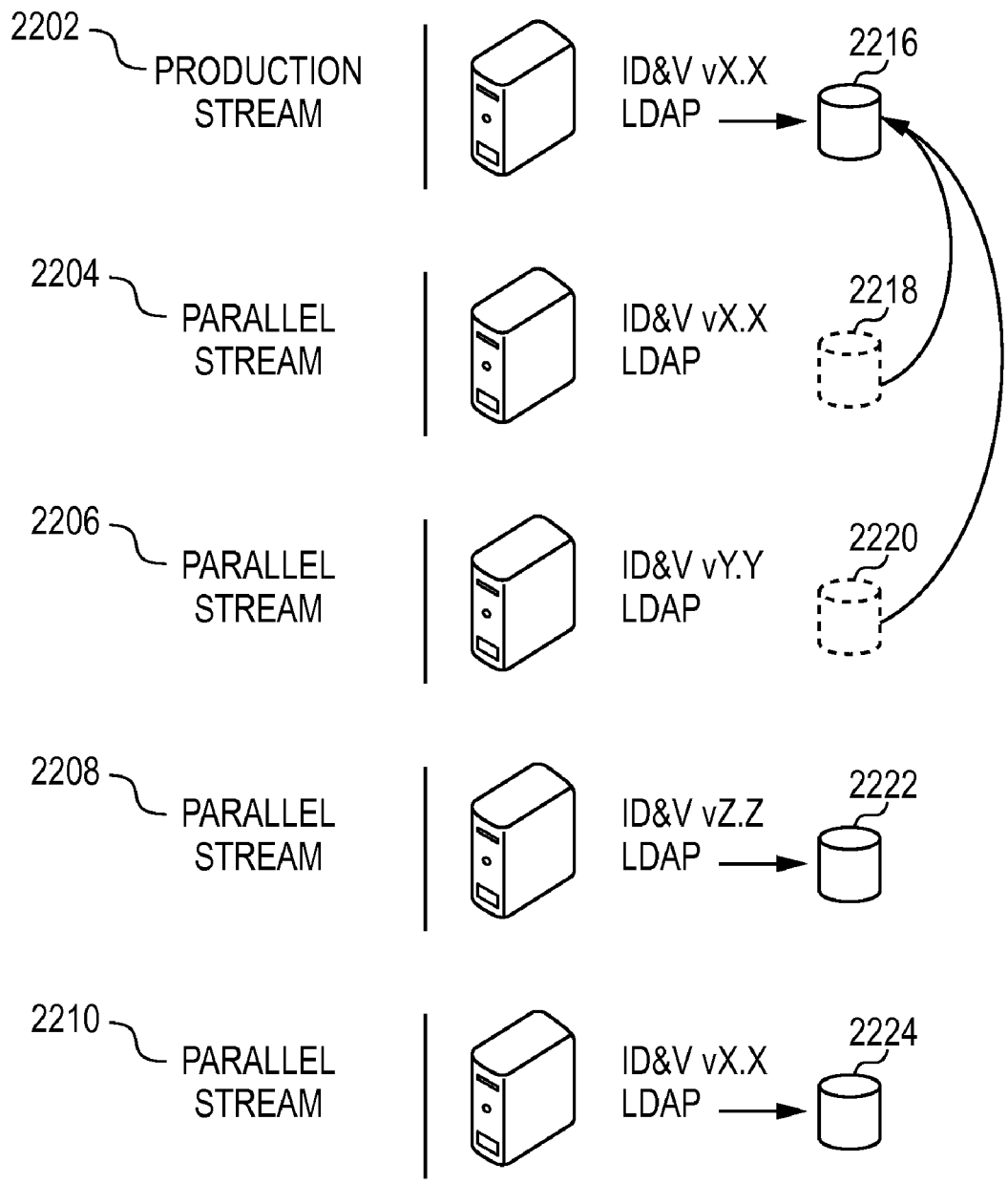
FIG. 22 is a system diagram showing communication of directory information between BDE environments.

FIG. 22 is a system diagram showing communication of directory information between BDE environments. The figure shows a production environment 2202 and multiple parallel streams (e.g. 2204, 2206, 2208, and 2210). The second stream 2204 and third stream 2206 have different versions of the ID&V component (e.g. 2218 and 2220) than the production stream 2204. However, because they are compatible they can share the production stream's directory server 2216. The fourth parallel stream 2208 is shown with an incompatible version of the ID&V component and therefore points to a local LDAP server 2222. The fifth parallel stream 2210 does have the same version of the ID&V component, but can still use a local directory server, for example, because it requires the use of separate data.

FIG. 23 is part of the user interface of the MPP, and shows a log of tasks completed along with other system messages. The MPP system is designed to log workflow messages. The log can have the date 2302 of the event, the task 2304 that created event, the user who executed the event 2306, and the details of the event 2308.

The log can include messages related to the deployment and merging processes. For example, it can be displayed alongside the comparison results to provide a comprehensive view of the decisions that were made during the comparison process. More detailed information about the execution of the MPP, for example those related to failed execution, those that quit prematurely, or workflow initialization, can be done by viewing log files directly. Alternatively, the information can also be included within the portlet based viewer.

Figure 24:
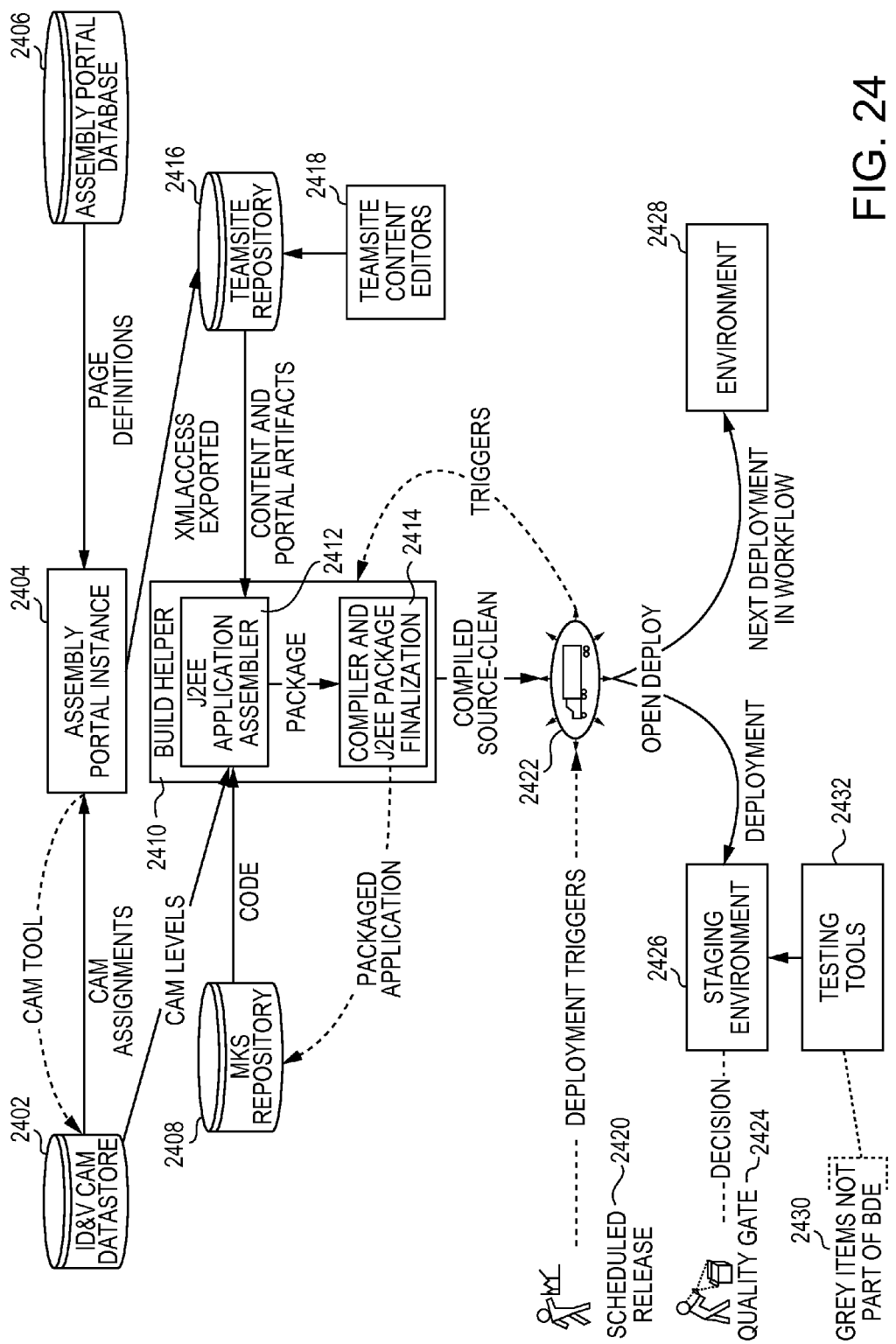
FIG. 24 is a system diagram showing details of the systems involved in developing and deploying multiple web applications in parallel.

FIG. 24 is a system diagram showing details of the systems involved in developing and deploying multiple web application in parallel. The diagram shows the systems making up the MPP platform. This includes ID&V CAM datastore 2402, an assembly portal instance 2404, and an assembly portal database 2406. The system also includes MKS Repository 2408, application platform 2410 (including J2EE application assembler 2412 and compiler 2414), and team site repository 2416. Executing on this platform is the open deploy process 2422, which deploys projects to staging environment 2426 and production environment 2428. Other individuals involved in the deployment process include those scheduling the release 2420, those helping with quality control 2424, and editors of content 2418.

The ID&V CAM is used to ensure customer accounts are allowed access to the portal application. The assembly portal instance 2404 that is executing accesses this account information to verify users. It also combines the data in assembly portal database 2406 related to content for the application. The application is executing on a J2EE platform 2410, that includes and application assembler 2412 for assembling applications, and a compiler 2414 for compiling the code of application.

The project is stored in MKS repository 2408. Other parts of the application, such as content and portal artifacts are stored in TeamSite repository 2416. The content is edited by TeamSite content editors 2418.

The compiled application is deployed by open deploy process 2422, which deploys the application to staging environment 2426 for quality control 2424. Deployment is done when triggered according to a scheduling system or project managers 2420. The application can be tested in the staging environment using testing tools 2432, or other tools 2430. After testing and deployment to a staging environment the application can be deployed to production environment 2428.

Figure 25:
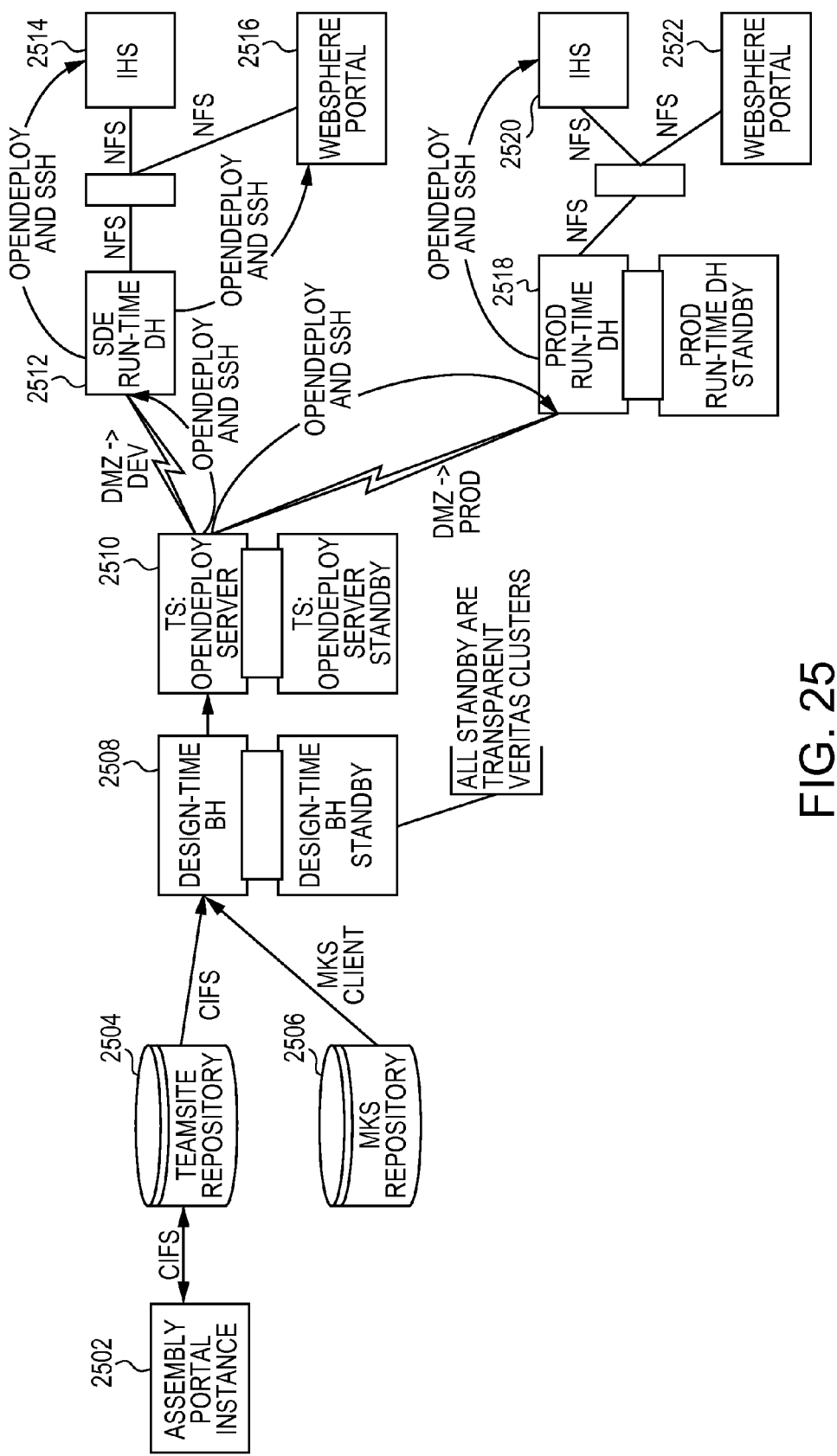
FIG. 25 is system diagram showing the links between systems involved in the deployment of a parallel stream.

FIG. 25 is system diagram showing links between systems involved in the deployment of a parallel stream. Information in the assembly portal instance 2502 is communicated to the TeamSite repository 2504 using CIFS. The team site repository content 2504 and MKS repository content are communicated to the design time build helper 2508 using CIFS and the MKS client, respectively. The design time build helper 2508 then sends its output to the opendeploy server 2510. From the open deploy server, the application is sent to the SDE run-time deploy helper 2512 using opendeploy and SSH. The application is also sent to the production runtime deploy helper 2518 using opendeploy and SSH. From the SDE 2512 and the production run-time DH 2518, the application is sent to IHS 2514 and 2520 and to Websphere platforms 2516 and 2522 using the opendeploy process and Network File System (NFS).

Figure 26:
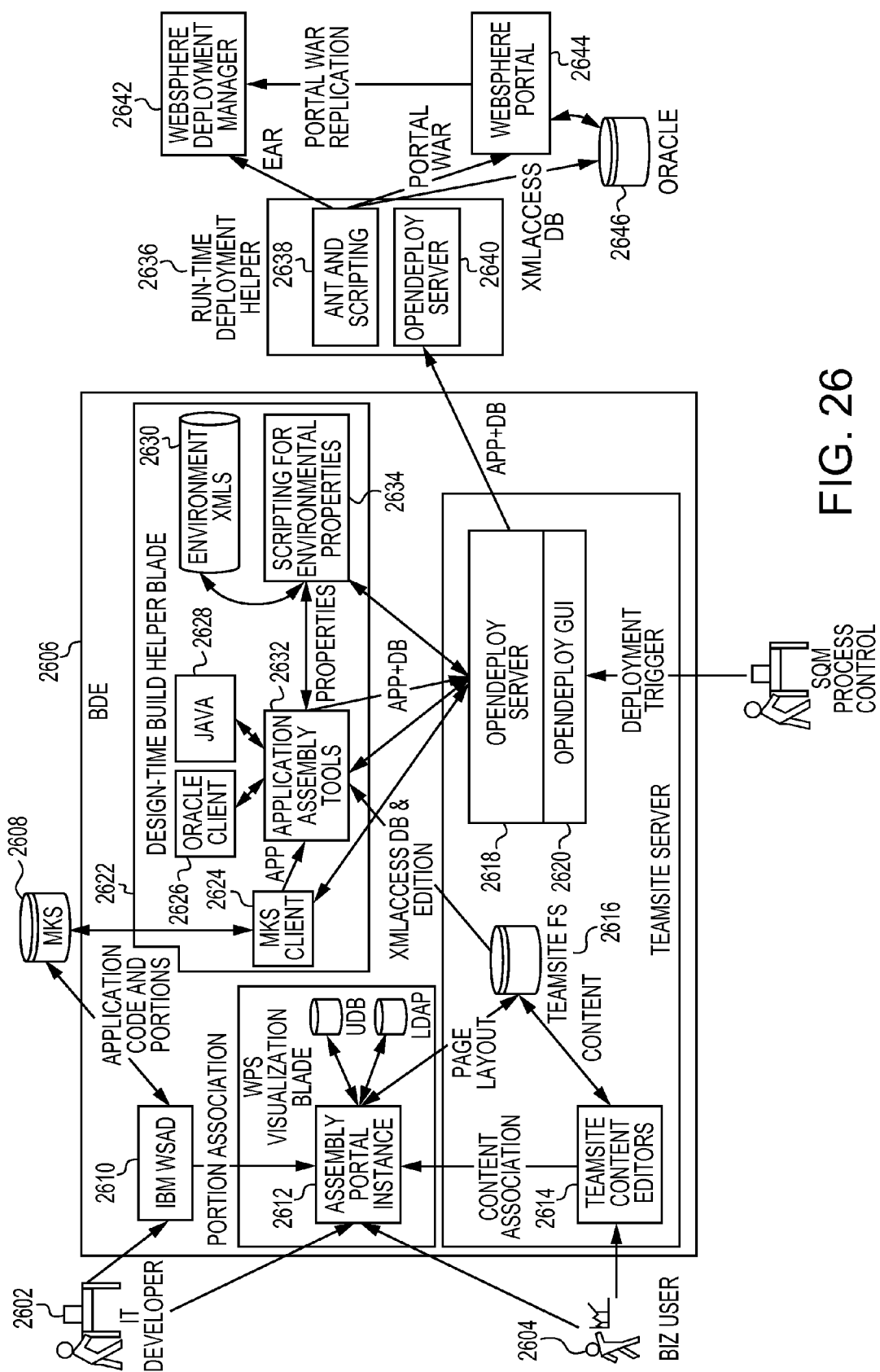
FIG. 26 is a system diagram showing the links between systems involved in the BDE environments and deployment systems.

FIG. 26 is a system diagram showing the flow of content through the BDE environments and the deployment systems. An IT developer 2602 creates content using Rational Application Developer (RAD) 2610. A business user 2604 can also enter content using TeamSite content editor 2614 and assembly portal instance 2612. IT artifacts are then stored in a MKS 2608 and Business managed content and page assembly/compositions are stored in the TeamSite file server 2616. From here the IT artifacts are transferred to the design time build helper 2622. The design time build helper includes MKS client 2624 for retrieving information about MKS repository 2608. It also includes application assembly tools 2632 for assembling information about TeamSite file server 2616.

From here the content is provided to opendeploy server 2618, which has open deploy GUI 2620. The content is then provided to run time deployment helper 2636 (which has scripting components 2638 and open deploy server 2640). From run-time deployment helper the content is provided to web deployment manager 2642, and Websphere portal 2644. Deployed content can be stored in Oracle database 2646.

Figure 27:
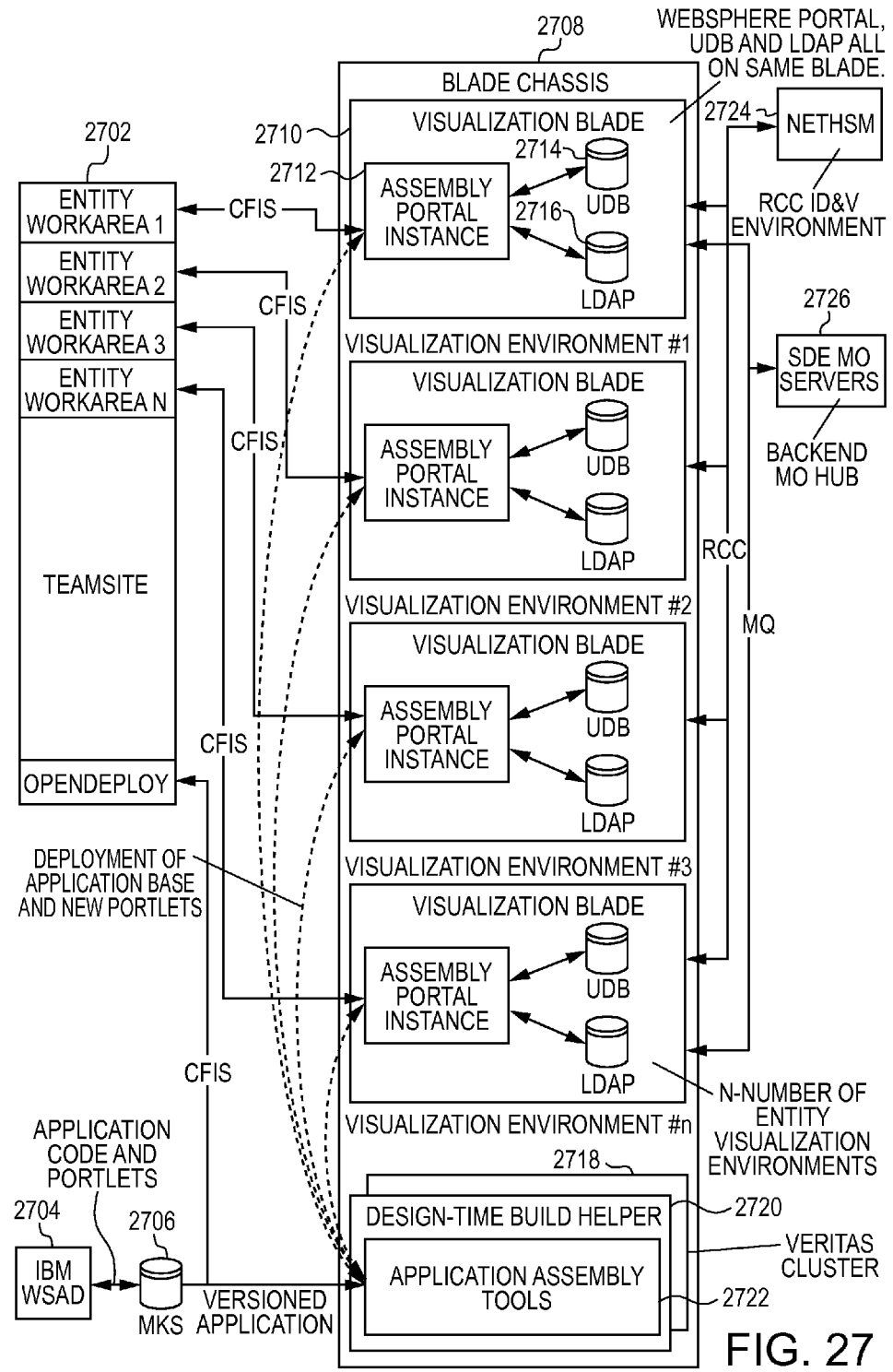
FIG. 27 is a system diagram showing details of an implementation of the MPP.

FIG. 27 is a system diagram showing details of an implementation of the MPP. The work areas 2702 and team site content are available through CIFS to assembly portal instance 2712 within a visualization blade 2714. This blade is included within a blade chassis 2710 which includes a number of other blades corresponding to other BDE instances. Applications are deployed to the blade chassis using IBM RAD2704, MKS 2706, design time build helper 2720, and application assembly tools 2722 as described previously. Net HSM 2724 and SDE 2726.

Figure 28:
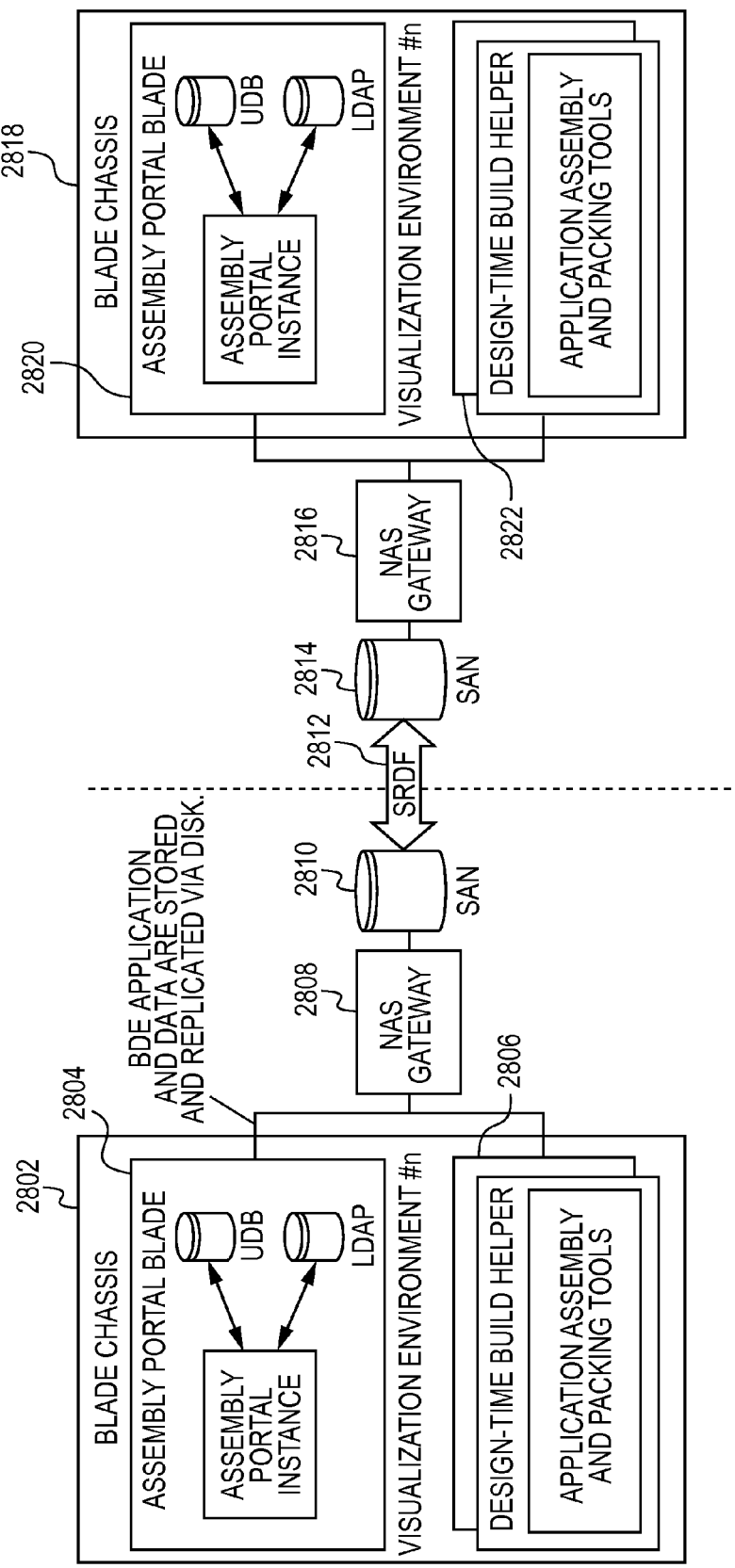
FIG. 28 is a system diagram showing the details of a disaster recovery feature for the MPP.

FIG. 28 is a system diagram showing the details of a disaster recovery feature for the MPP system. The diagram shows two deployed applications 2802 and 2818 developed using the MPP process on blade chassis 2804 and blade chassis 2820. The blade chassis 2802 includes an assembly portal blade 2804 as described previously and a design-time build helper 2806 also as described previously. Blade chassis 2802 is connected to blade chassis 2818 through NAS gateway 2808, SAN 2810, SRDF connection 2812, and the corresponding SAN 2814 and NAS Gateway 2816 of blade chassis 2818.

NAS gateway 2808 provides access to files stored on SAN 2810. This SAN 2810 is synchronized with SAN 2814 using the SRDF protocol, although other protocols can be used as is known in the art. The synchronized storage allows for failover between blade chassis 2802 and blade chassis 2818.

Figure 29:
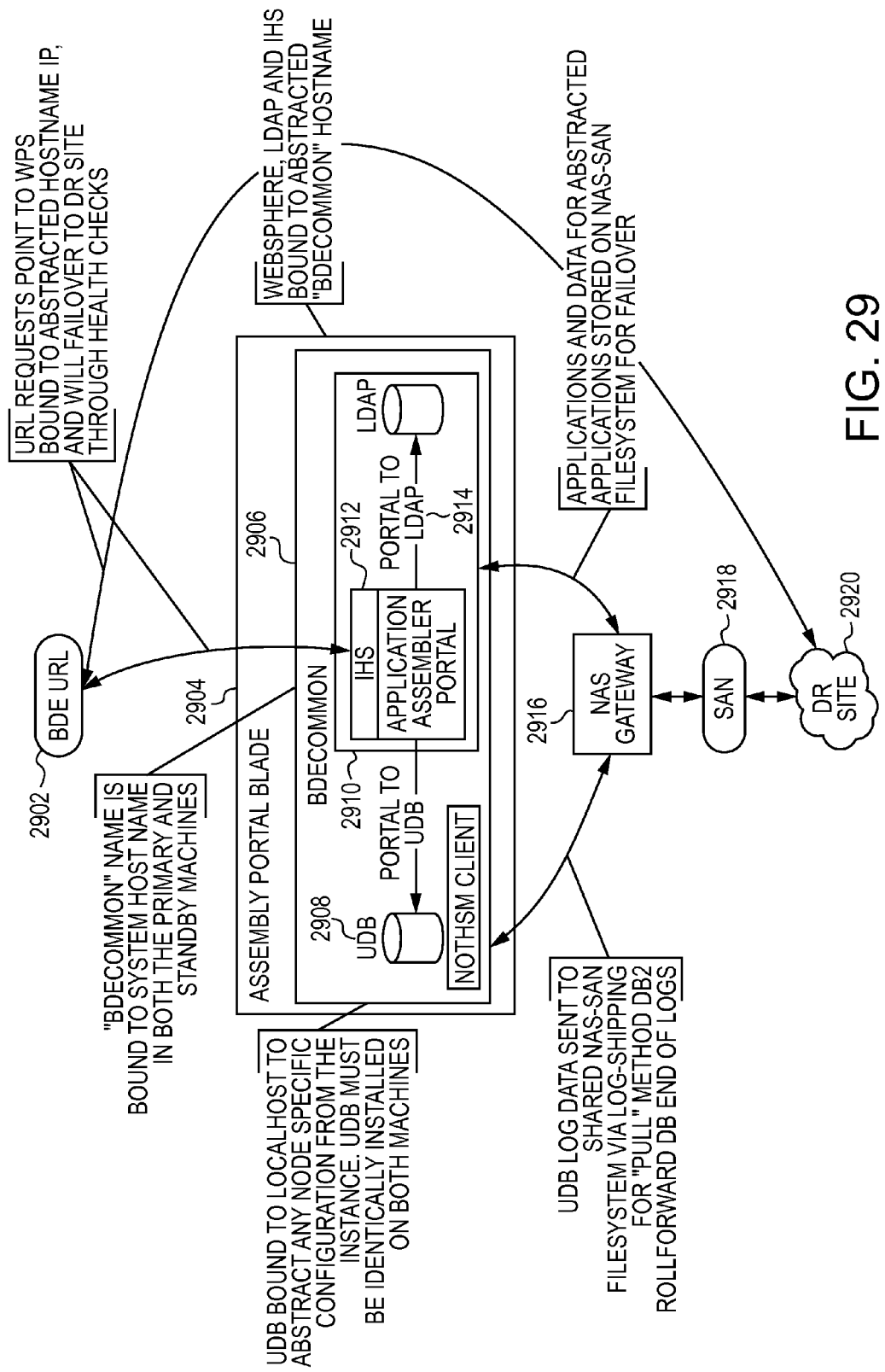
FIG. 29 is a system diagram showing further details of the disaster recovery feature of the MPP.

FIG. 29 is a system diagram showing further details of the disaster recovery feature of the MPP. Users are directed to a disaster recovery (DR) site 2920 by URLs that are modified to point to the hostname IP of the DR site. BDE Staff users will be taken to the appropriate site by using a common URL which will take them automatically to the site that is up. The assembly portal blade 2904 is installed in a common way (i.e. common BDE environment installation) 2906 on a NAS gateway 2916 and SAN 2918, which as described previously, is synchronized with DR sites 2920.

The common BDE environment includes user database 2908 and application assembly portal 2912. The application portal is in communication with LDAP 2914 for directory information.

Figure 30:
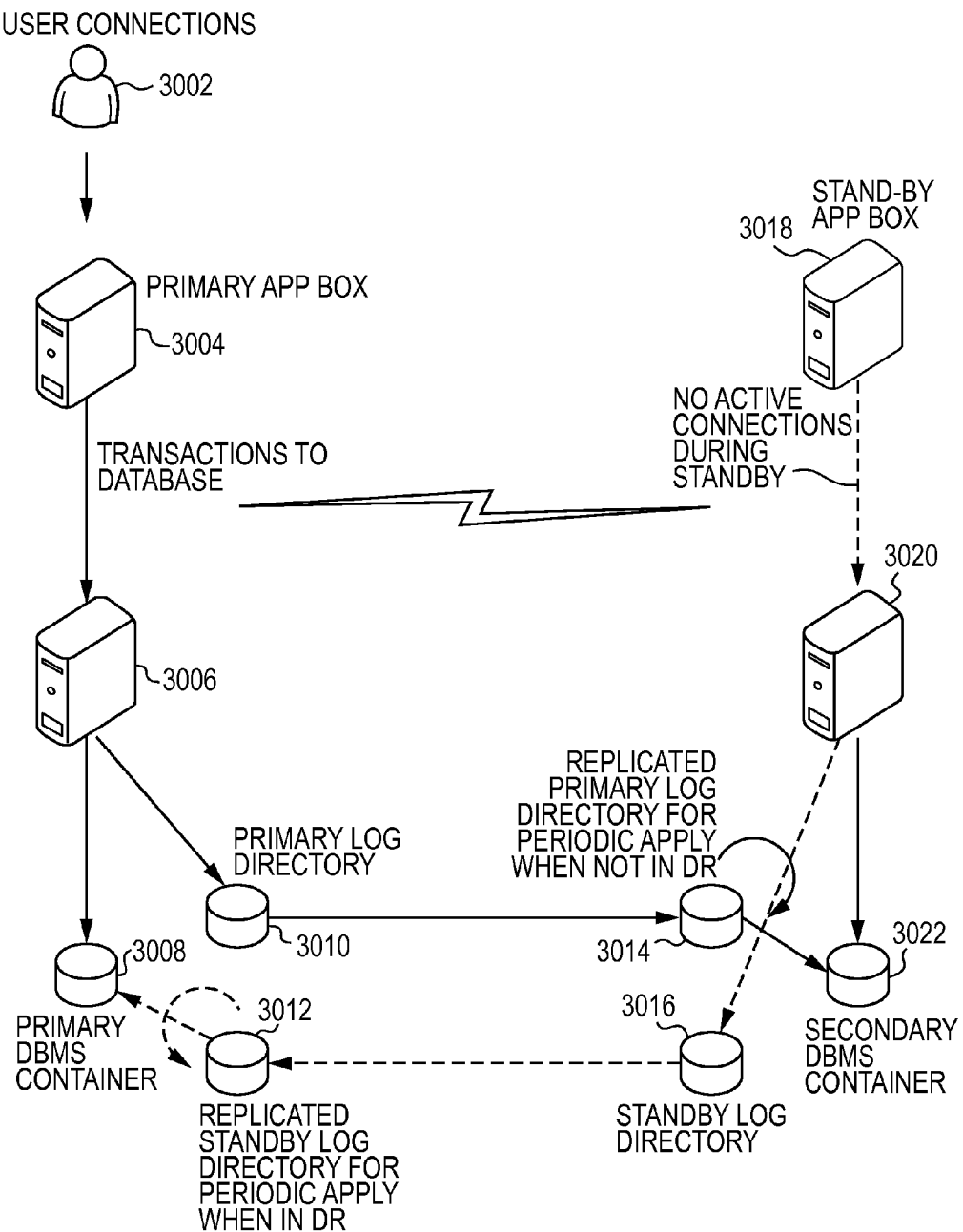
FIG. 30 is a system diagram showing further details of the disaster recovery feature of the MPP.

FIG. 30 is a system diagram showing further details of the disaster recovery feature of the MPP. Users 3002 connect to primary application system 3004, which is in communication with database system 3006. Database system 3006 includes primary database 3008, primary log directory 3010, and replicated standby log 3012. Similarly, the standby environment includes a standby application system 3018, and backup database system 3020. The backup database system 3020 includes a secondary database 3022, a standby log directory 3010, and a replicated primary log directory 3014. The replicated primary log directory 3014 and standby log directory are kept synchronized with the primary site.

Figure 31:
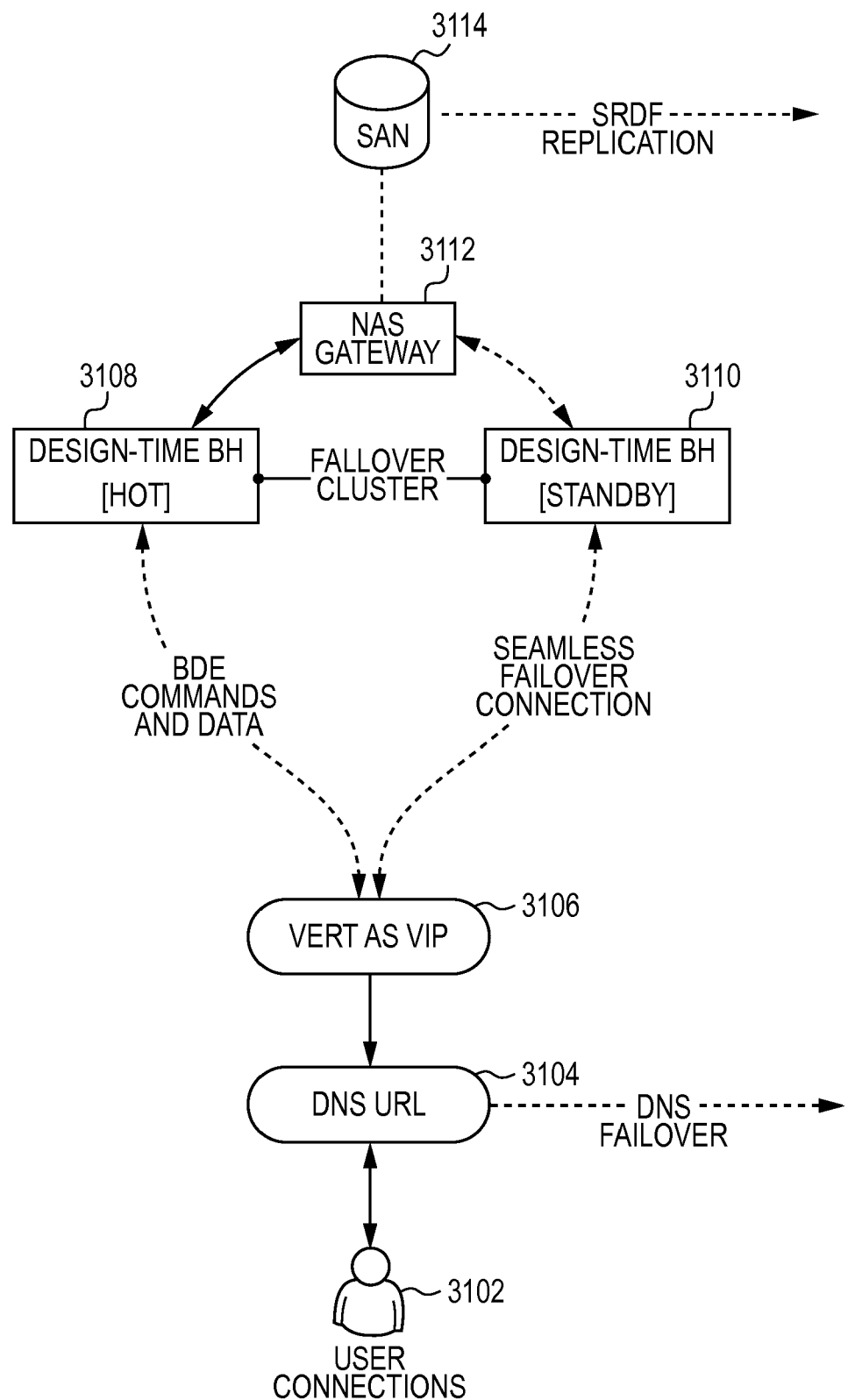
FIG. 31 is a system diagram showing the components involved in the failover feature of the MPP.

FIG. 31 is a system diagram showing the components involved in the failover feature of the MPP. Users 3102 connect to a DNS URL redirecting component 3104 that can point users to either a main or a failover site. The DNS URL component 3106 is connected to a Veritas VIP 3106. The main design time build helper 3108 and the standby design time build helper 3101 are both connected to the Veritas VIP 3106 for servicing requests. Alternatively, additional systems can be part of a failover cluster. Requests for services are made using data from SAN 3114 and are retrieved through NAS gateway 3112. SAN 3114 maintains synchronization using SRDF replication. Users are redirected to failover site using DNS failover.

Figure 32:
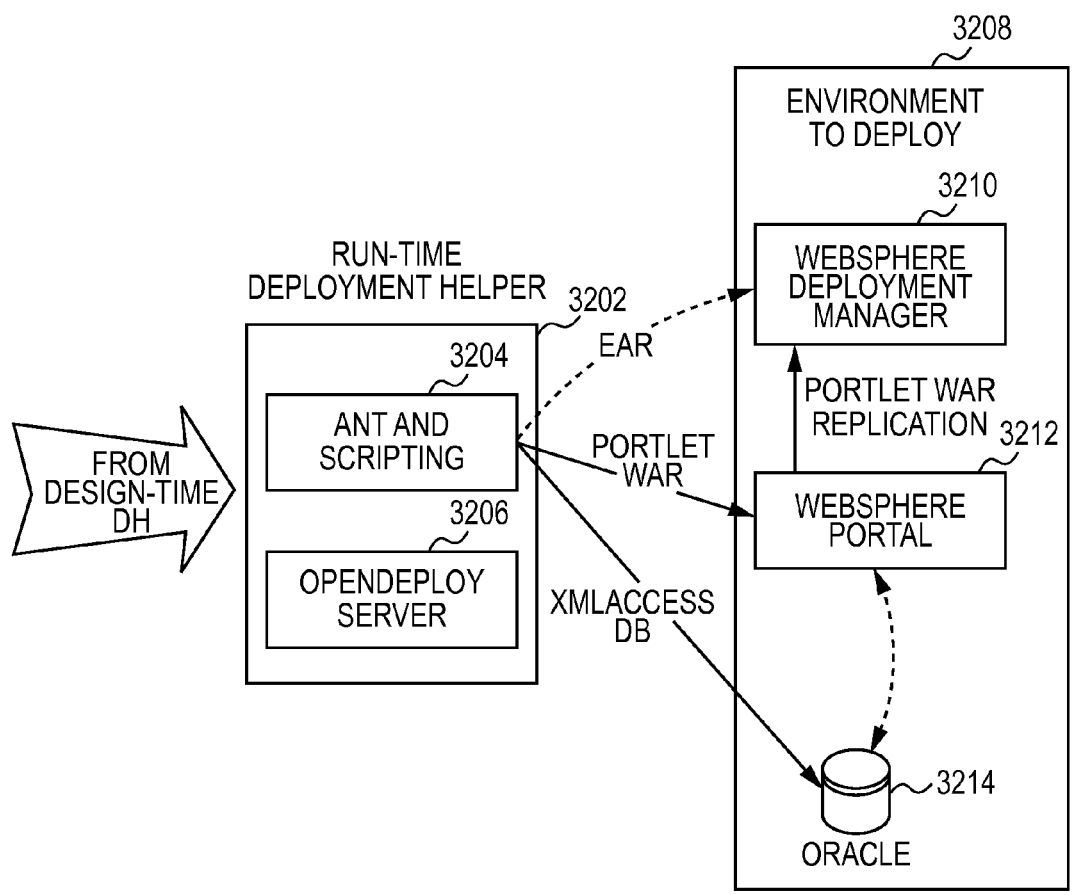
FIG. 32 is a system diagram showing components of the system involved in deploying a parallel stream.

FIG. 32 is a system diagram showing components of the system involved in deploying a parallel stream. The system includes run-time deployment helper 3202, which includes ANT and Scripting 3204 for deploying EAR packages to the Websphere deployment manager 3210, and for deploying WARs to the Websphere portal 3212. The deployed environment 3203 also includes Oracle database 3214 for supporting Websphere portal 3212. Objects are loaded into database 3214 by ANT and scripting components 3204 using WebSphere Portal scripting facilities such as XMLAccess.

Figure 33:
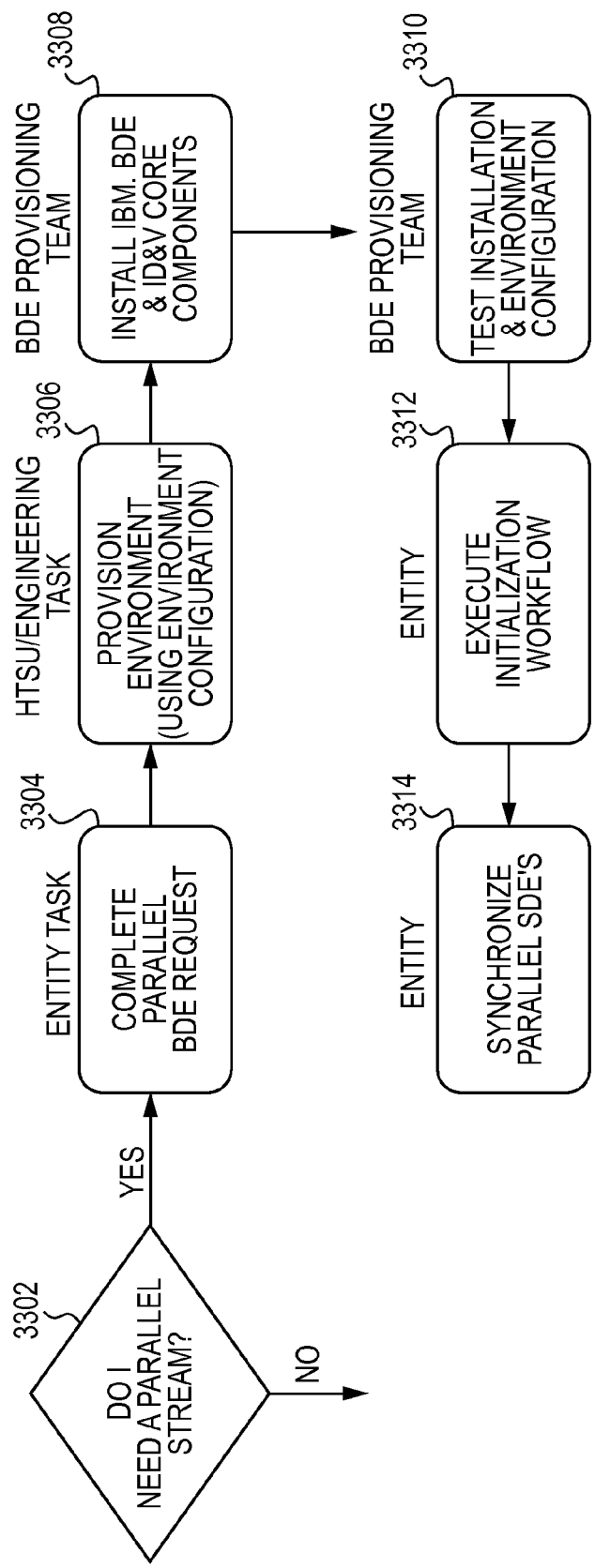
FIG. 33 is a flow diagram showing the overall process for creating a new parallel stream.

FIG. 33 is a flow diagram showing the overall process for creating a new parallel stream. The process starts at step 3302 with a user deciding whether a parallel stream is needed at all for the project being developed. At step 3304, the user completes a parallel BDE request. This is information provided by the user that is needed to create the parallel stream. It can contain a reference to the production stream (server name and information on users that are to have access to MKS and other environment components).

At step 3306, an environment is provisioned for the new parallel stream. At step 3308, to support this new stream, an environment is set up that includes installing software components such as the IBM, BDE, ID&V core components. At step 3310, the installation is tested and the environment and other components are configured in accordance with the parallel stream request. At step 3312, after the environment has been set up, the initialization workflow is executed. At step 3314, the newly tested and configured environment is synchronized.

Figure 34:
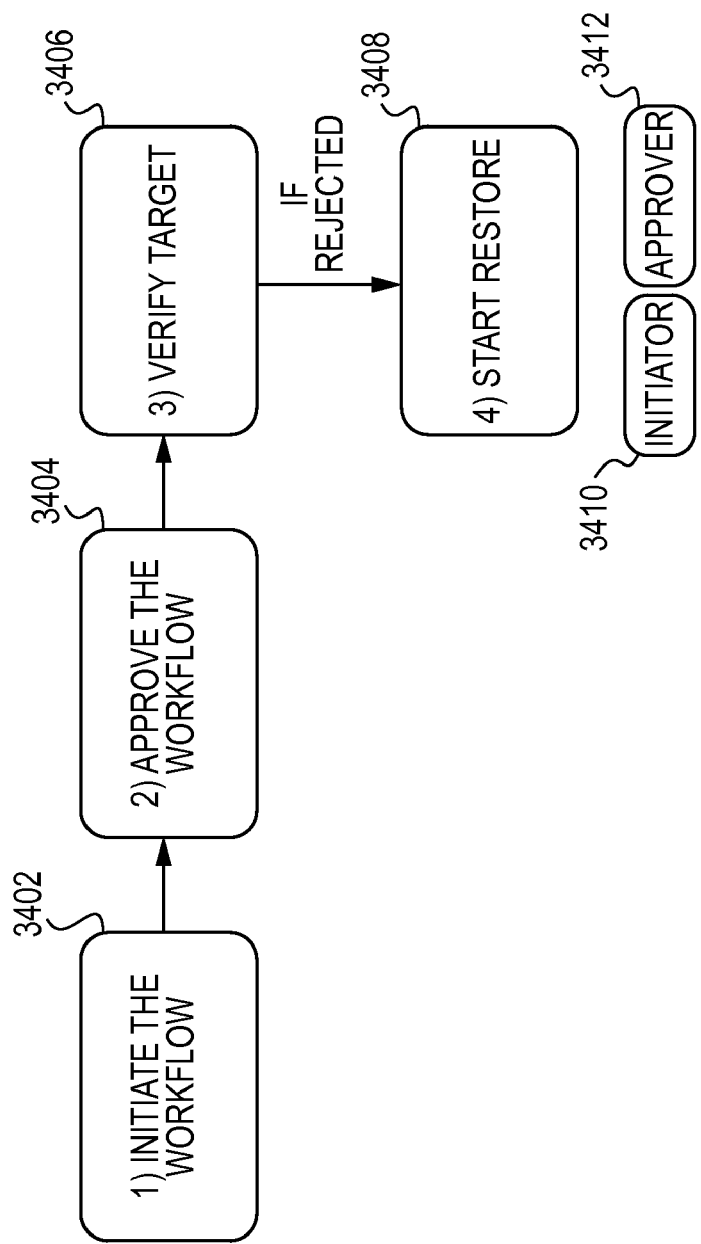
FIG. 34 is a flow diagram showing the process for initiating a new parallel stream.

FIG. 34 is a flow diagram showing the process for initiating a new parallel stream. The process starts at step 3402 by an initiator 3410 starting the process of creating a parallel stream. At step 3404, the initiating of a new parallel stream in the parallel environment is then approved by an approver 3412. The parallel stream is created in the environment that was created for the parallel stream as described with respect to FIG. 33 above. At step 3406, the target environment for the parallel stream is verified to make sure it is acceptable. At step 3408, the loading of the project is done to create a parallel stream.

Initializing a new parallel stream is the process whereby the BDE environment of the parallel stream is configured, set and installed with the content of the production stream BDE. Once a parallel stream BDE has been initialized, it is basically a complete clone of the production stream. This allows a user to advantageously manage the code, content and configuration moving forward in parallel. In order to manage portal resource in parallel they have to be identical, which means that the internal unique identifiers for the resources need to be the same. However, it is also important that when creating new resources within a parallel or production stream, they are given new unique identifiers that will not conflict with the resources that have been created on other streams.

Care must be taken when re-initializing a parallel stream, as the contents of the parallel stream are deleted. To mitigate the risk of an initialization workflow being run in error, the workflow can be disabled once it has been run properly, and can be re-enabled by issuing a work order. Before starting an initialization workflow, users log off the assembly WPS workbenches on the target, the files in the target workarea are saved and closed, no other approval workflows are in progress on the target environment, and the source edition used for the initialization workflow has been created. The initialization workflow can be started from the content pane of the target stream's workarea.

If the initialization workflow has been rejected, the user can be sent an email. The target is then unlocked which make resources on the target read/write again for further development. The workflow lock for the process is also removed. The log is then updated with the actions that took place.

The verify target task is to make sure the initialization workflow was properly performed. Using the tasks view of the workflow pane (described below), a user can select the verify target task in the task list. The user then selects start input task, and selects the verify target link. The user then verifies the target stream by viewing selected pages. A user can also view the publicly available website. To accept the deployment after verification, the user can select the accept deployment button.

In response the system performs the following tasks, disables the workflow, sends a completed email, unlocks the workbench, unlocks the workflow lock, and logs the actions that were performed.

The user can also restore a target stream, this put the stream back to its state before any changes were made as part of this workflow. This task starts when a user rejects the deployment of a target stream. The restore function is of the tasks in the workflow pane. To perform a restore the system unlocks the backup workarea, restores the target stream from the backup that was taken, sends email to the user, unlocks the workbench for further development, unlocks the workflow, and records the details of the workflow tasks that were performed.

Figure 35:
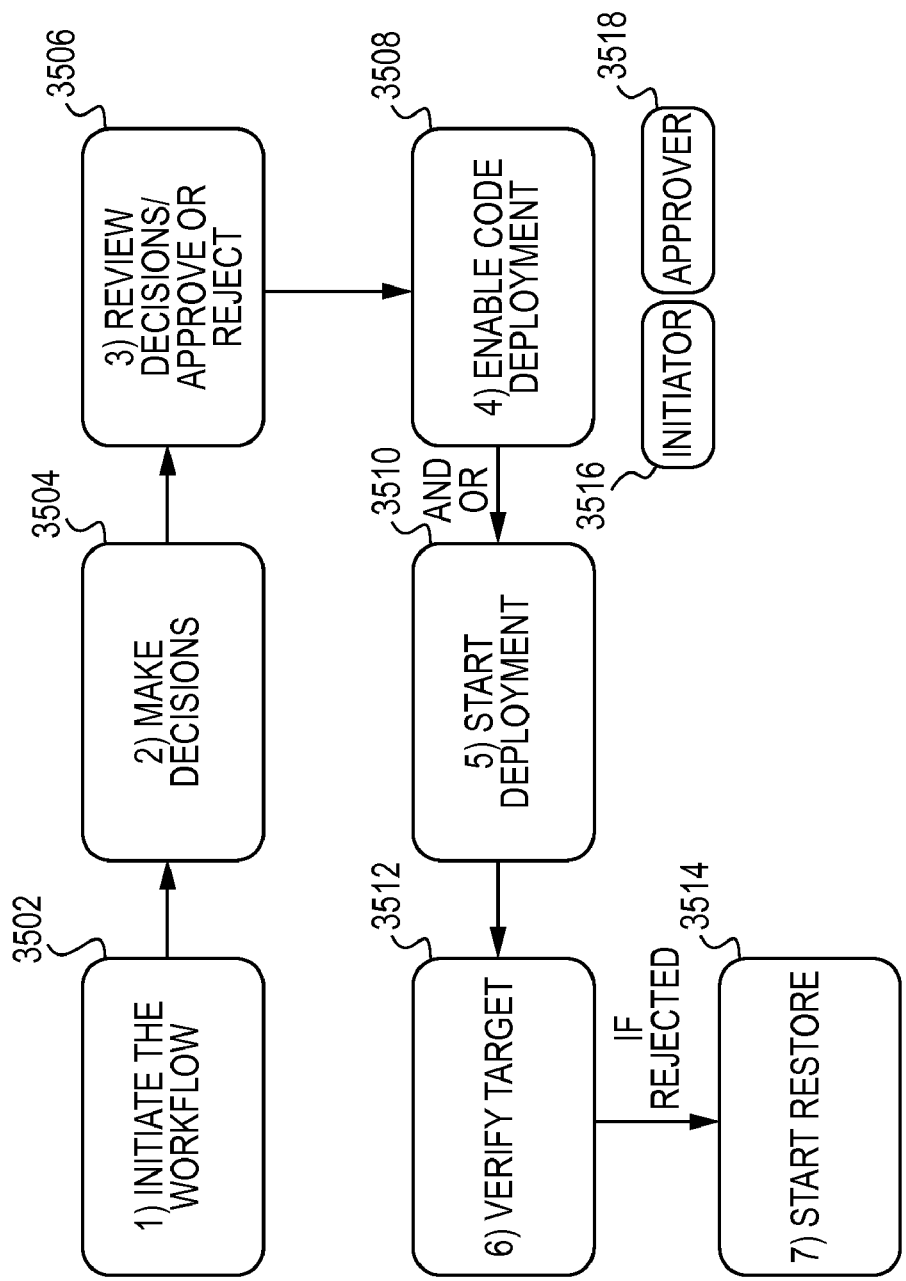
FIG. 35 is a flow diagram showing the process for the get latest process of the MPP.

FIG. 35 is a flow diagram showing the process for the get latest and promotion processes of the MPP that can be performed by users. The get latest workflow is designed to move resource from the production stream to parallel streams, or from a parallel stream to another parallel stream. As part of the get latest workflow, a detailed comparison is made of the target environment/parallel stream TeamSite workarea (which contains all of the content, including versioned portal resources) and a baseline or "MPP Edition." This is a special kind of TeamSite Edition that is made automatically by the internal processes. A baseline also includes a list of the installed applications in the environment and their associated versions.

Once a comparison has been performed, the results are displayed to the user (still within the context of the workflow), they can then make a decision of the resources that they wish to be synchronized. In some embodiments, only resources that are different can be displayed to the user. For each difference identified between the streams a user can decide to ignore, overwrite, add, or delete the resource. After the decisions have been made, the get latest will then execute each of the decisions. Once this operation has been performed, the streams are synchronized. Even though the content of the stream may not be exactly the same, the user has gone through a synchronization process and made informed decisions about merging the streams.

At step 3502, the workflow is initiated. This brings the signed off changes from the production stream into the parallel stream or brings tested changes from one parallel stream to another parallel stream. The initialization workflow is used when a parallel stream is first provisioned, and is responsible for moving the content from a baseline within the production stream, into the parallel stream, and creating a new baseline of resources within the parallel stream. A baseline is effectively a TeamSite edition that contains the content and resources at a given point in time. When performing the various comparison operations involved in parallel development, baselines (i.e. version or checkpoints) can be used a point of reference in the comparison operation.

At step 3504, an approver 4128 makes decisions on whether to create the parallel stream or not, and what files to include in the parallel stream. A code comparison can be done to decide what changes or files should be included. An email or other notification can automatically be sent to the approved when a new workflow is initiated. At step 3508, the system is prepared for the code deployment, for example, logging off users, creating lock files. At step 3510, the deployment is started and code and content is copied to the parallel stream in the new environment.

At step 3512, the target is verified. This step includes verifying that the deployment was properly executed, and it unlocks the system for access. At step 3514, if there were any errors in the process, a restore can be done to place the system back into its previous state so that the deployment can be retried.

To perform the get latest workflow through the graphical user interface, users are generally logged off the assembly WPS workbench on the target environment, files in the target workarea are generally saved and closed, no other approval workflows are generally in progress in the target workarea, no other code deployment workflows are generally in progress on the target workarea, and the source edition used for the process may already have been created. The user then uses the content pane of the target stream's workarea, and selects "new job". The user then selects the get latest button. The workflow then displays the user's ID and the source branch, which is a path to the target workarea. The user then completes the remaining mandatory fields and starts the job.

The system then updates the lock file, locks the workarea and the workbench, sends an email to the user, takes a backup of the target stream, and performs the comparison pre-process by creating a copy of the workarea and an initial comparison file. Along with the user, the content and code comparison is then performed by displaying the different files to the user.

Figure 36:
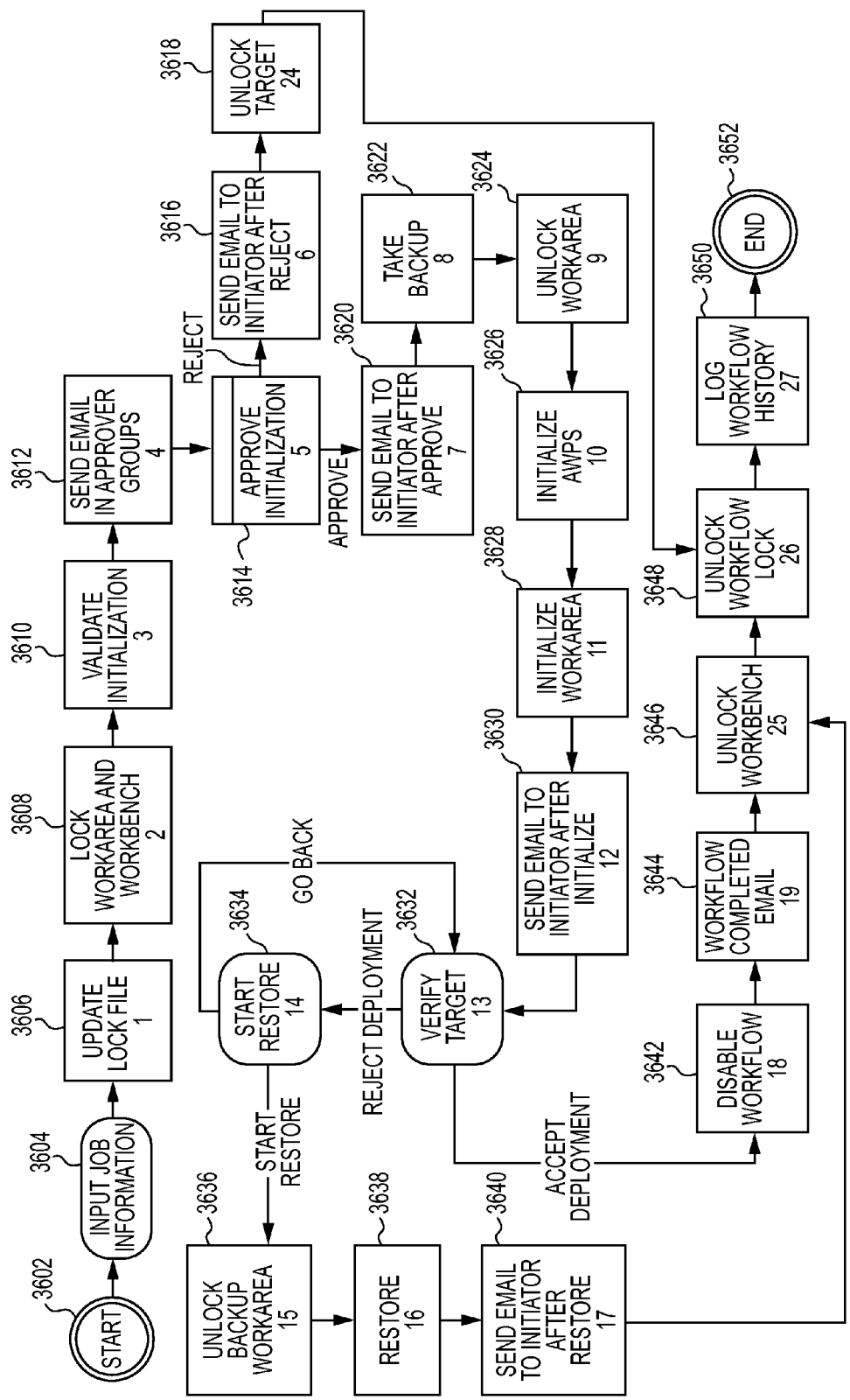
FIG. 36 is a flow diagram showing details of the initialization process.

FIG. 36 is a flow diagram showing details of the initialization process. The purpose of the initialization workflow is to enable an entity to synchronize the code and content from the production stream to a newly provisioned parallel stream. After the new parallel stream BDE environment has been delivered, it will contain the bare minimum software, environment components, and configuration that is required. This includes components such as, portal administrative portlets and pages. The initialization workflow will create a release package that contains the contents of the source production environment. This workflow only needs to be executed once, during the provisioning process of a new environment.

Once a parallel BDE has been provisioned, the environment has been initialized (using the initialization workflow), and code and content has been synchronized. The SDE environments associated with the BDE can then also be synchronized. A synchronized SDE that is associated with a parallel stream is no different from a SDE synchronized with production, or any other stream. When a parallel stream BDE is first delivered, the SDE's associated with it will not contain any code or content of applications.

An existing SDE that is already in use, either as a synchronized environment of a production stream, or an un-synchronized environment used for system testing or IT purposes, can be moved into the parallel stream and be used. This would potentially reduce overall environment costs, however in order to be associated with the parallel stream, the environment can be re-provisioned. There is no general way in which an SDE can simply be moved or re-associated with another source BDE simply by changing the environment's configuration.

By re-provisioning the environment all data will be lost on that environment, and effectively, the environment delivered will be the same as requesting a new environment.

The process starts at step 3604 where the information for the initialization process is entered. At step 3606, the lock file on the system is updated, so that no other updates or changes are done at the same time. At step 3608, the workareas and workbench is locked for the same reason. At step 3610, the initialization process is validated to make sure it can be properly performed.

At step 3612, an email or other notification is sent to the approver of new parallel stream initializations, if the initialization is approved (step 3614), then at step 3620 the initiator is notified that the initialization can continue.

If the initialization is not approved, then at step 3616 an email or other notification is sent to the initiator letting them know their request has not been approved. At step 3618, the locks are undone on the target. The process then moves to step 3648, where the workflow lock is also undone, and at step 3650, the workflow log is updated.

If the initialization is approved, then at step 3622 a backup is made in case errors occur during the initialization process. At step 3624, the workarea is unlocked so that changes can be made. At step 3626, the AWPS is initialized, and at step 3628 the workarea is initialized. The initiator is then notified at step 3630 that the workarea has been initialized.

At step 3632, the target is verified to ensure that the initialization was properly performed, if not, the process goes to step 3634 to perform a restore back to the previous system configuration. At step 3636, the backup workarea is unlocked, and the system is restored at step 3638. At step 3640, an email is sent to the initiator notifying them that the restore is complete. The process then moves to step 3646 and performs the steps described above after step 3618 when initialization of a workflow is not approved.

At step 3642, if the target is verified, the deployment is accepted and the workflow lock is disabled. At step 3644, a notification is sent to the initiator notifying them that the initialization is complete. The process then moves to step 3646, performing the steps described above after step 3618, when initialization of a workflow is not approved.

Figure 37:
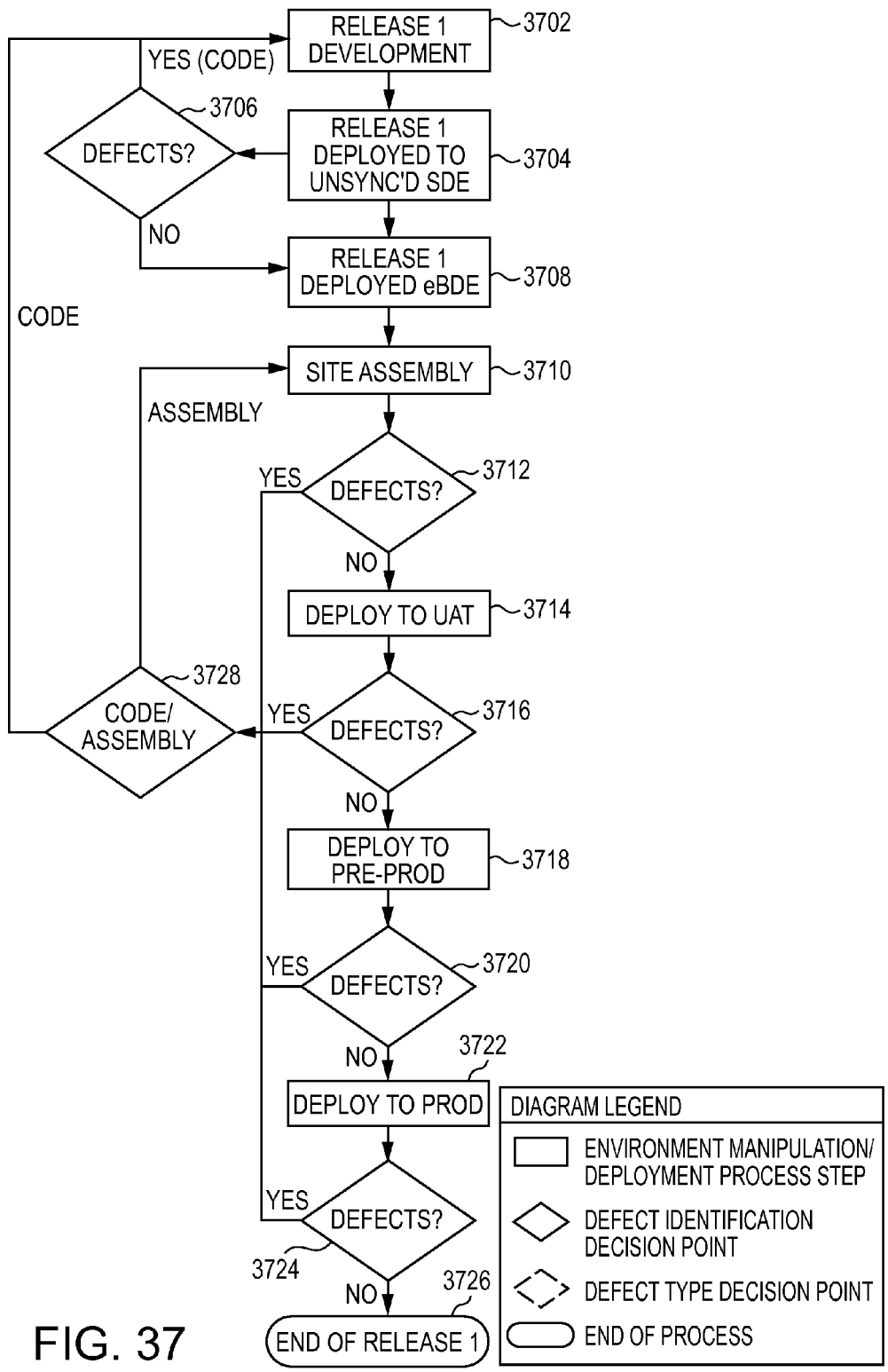
FIG. 37 is a flow diagram showing details of the deployment process.

FIG. 37 is a flow diagram showing details of the overall deployment process. At step 3702, the first release is developed. At step 3704, the release is deployed to an unsynchronized SDE. At step 3706, the code is tested for defects. If there are no defects, then at step 3708 the release is deployed to the eBDE. Otherwise, the process moves back to step 3702 and a new release is developed. At step 3710, site assembly is performed, and the site is checked for defects at step 3712. If no defects are found, then at step 3714, the release is deployed to an environment for further testing. Again, if no defects are found, the release is moved to a pre-production environment at step 3718. Finally, if not defects are found at step 3720, the release is deployed to production at step 3722 for use by users. Testing for defects continues at step 3724.

At any of the steps where testing for defects is performed (steps 3712, 3716, 3720, and 3724), upon detection of one more defects, the process moves back to step 3728, where the code can be fixed and a new release developed for deployment.

Figure 38:
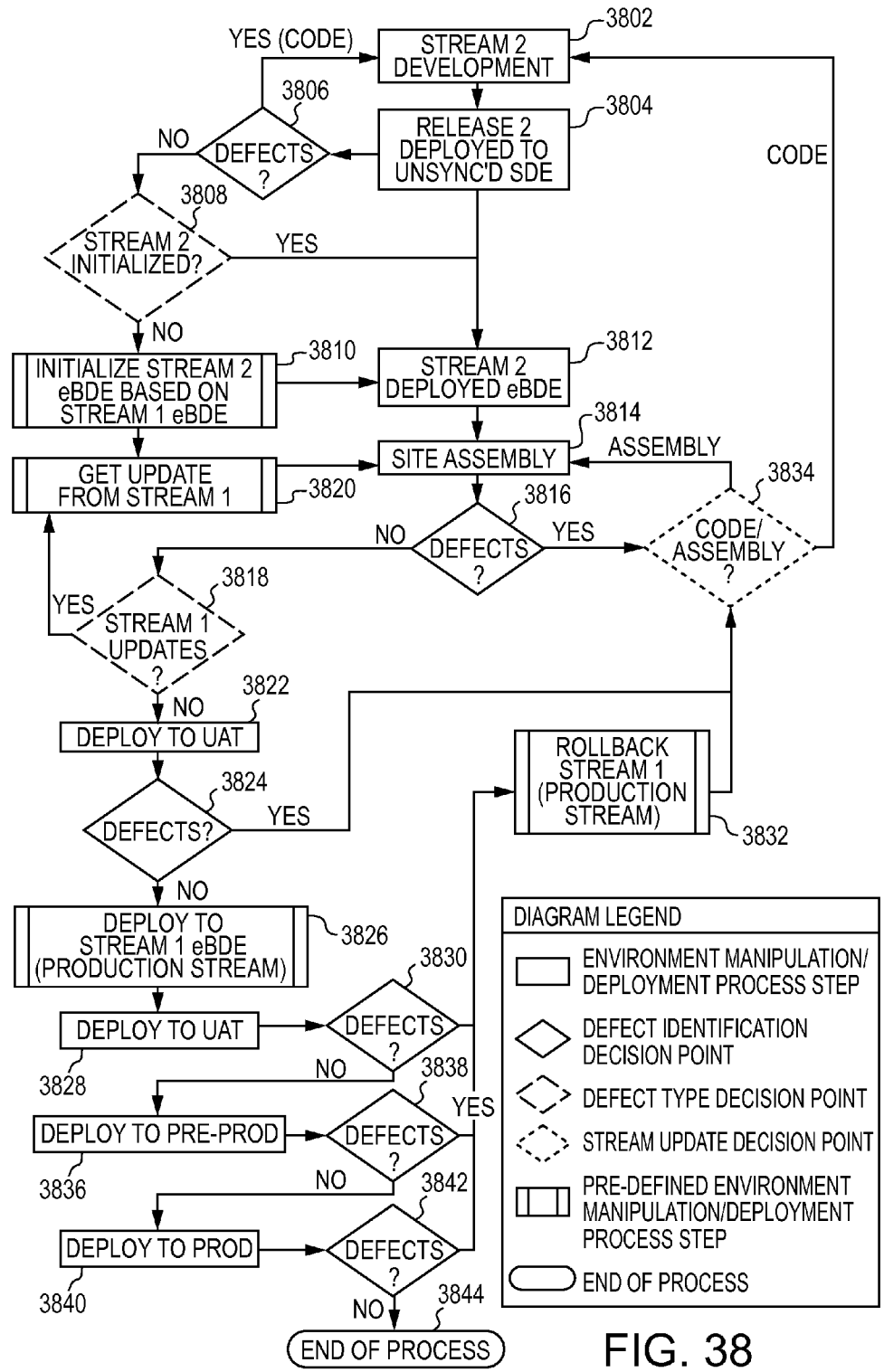
FIG. 38 is a flow diagram showing details of the promotion process.

FIG. 38 is a flow diagram showing details of the promotion process. The promotion process is effectively the same as the get latest workflow, however it is specially designed to move resources from parallel streams into the production stream. As the production stream is the only environment that is used to deploy resource into the pre-production and production environments, there is a potentially higher risk with merging resources into the production stream. For example, if a rollback is required, then the production stream will be unavailable during the rollback period, and the user will not be able to perform any releases into the production environment.

The rollback process for the promotion process is similar to that for the get latest workflow. However, the backup and restore processes within the promotion workflow differs slightly due to the architectural significance of the production stream, as the production stream is the environment that can be promoted to a pre-production or production environment, importance needs to be placed on ensuring the integrity of the content of that production stream. The production stream can also have a disaster recovery environment. This is a synchronized environment that resides in a different data center, and which allows a seamless failover if there is a critical error to the main production environment. This requires real-time synchronization between the production stream and disaster recovery environments.

When performing a backup of the production environment, the process can be the same as when performing a get latest operation, however, the disaster recovery environment needs to be synchronized when performing a restoration of the previous backup.

The process starts at step 3802, where a second stream is being developed. At step 3804, the second release is deployed to an unsynchronized SDE. If defects are detected at step 3806, then the process moves back to step 3802 for development of a fixed release. If defects are not found, then at step 3808 the second stream is initialized. At step 3810, the second stream is initialized based on the first stream. At step 3812, the second stream is deployed. At step 3814, site assembly is performed. At step 3816, the second stream is tested for defects. If no defects are found, then at step 3818, the first stream is tested updates, and if updates are found, they are incorporated into the second stream at step 3820, after which site assembly is again performed.

If no updates are found at step 3822, then the second stream is release to UAT for testing. At step 3824, the second stream is tested, and then deployed to an eBDE at step 3826 if no defects are found. At step 3828, the release is deployed to UAT, and it is again tested for defects at step 3830. If no defects are found, then the second stream is released to be deployed to a pre-production environment. At step 3838, the second stream is again tested for defects, and if no defects are found, the release is deployed to a production environment at step 3840. At step 3842, additional testing on the released version can be performed.

If defects are detected at any of steps 3830, 3838, or 3842, the process moves to step 3832, where there is a rollback to the first stream. At step 3830, the code can be fixed. At step 3824, when a defect is detected the process moves directly to step 3834, without performing a rollback. There is an inherent risk when performing an operation, like a get latest, that the decision made during the merge of the parallel streams will cause one or all of the parallel streams to fail. For example, it could cause conflicts with other code or content. This is more likely to occur if dependencies or pre-requisites do not exist within the environment. If this does occur, then a rollback of the environment back to the state it was before the operation was performed can be done. A rollback can be done because each time an operation is performed, for example a get latest workflow, a complete backup of the parallel stream can be taken. The last stage of an operation allows a user to verify that the environment behaves as expected. If not, the user can perform a rollback.

Figure 39:
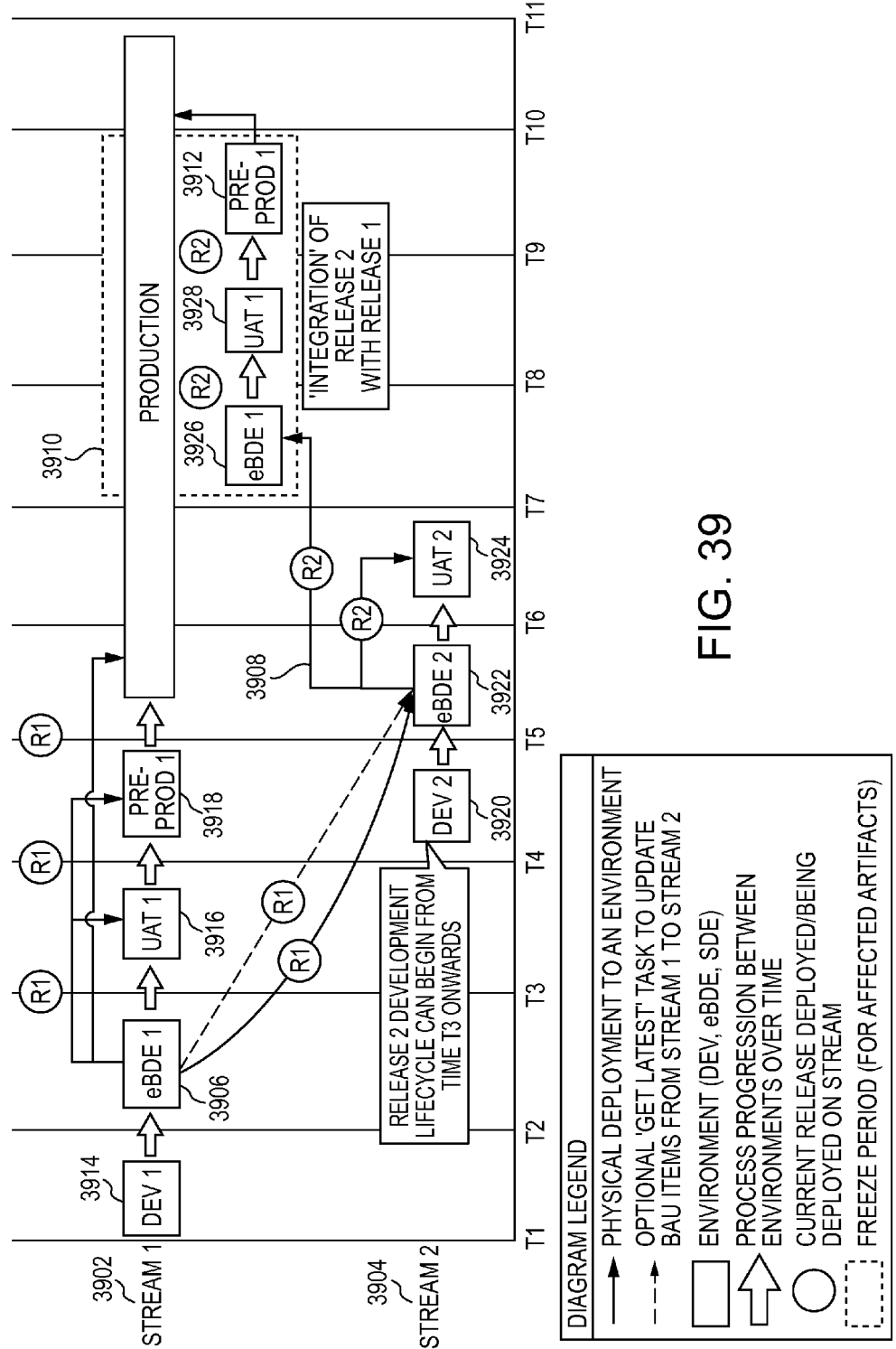
FIG. 39 is a system diagram showing the deployment process and flow of information over time.

FIG. 39 is a system diagram showing the deployment process and flow of information over time. The steps in developing a first stream 3902 are shown. The steps include moving from a development environment 3914 to an eBDE 3906 environment, to a testing environment 3916, and then to a preproduction environment 3918. Finally, the first stream 3902 moves from the pre-production environment to a production environment 3910.

When developing a parallel stream, after the first stream is developed and moves to an eBDE environment 3906, it can be used to form a second stream 4064. As shown in this figure, a second stream 3904 is developed in a development environment 3920, after which it can be combined with the first stream 3902 in the eBDE environment 3922. The new combined second stream can then be moved to a testing environment 3924, after which it can be moved to a second eBDE environment 3926 that is on the path to the production environment 3910. From the eBDE environment 3926, the second stream can be further tested in testing environment 3928 and pre-production environment 3912, before moving to production environment 3910.

Figure 40:
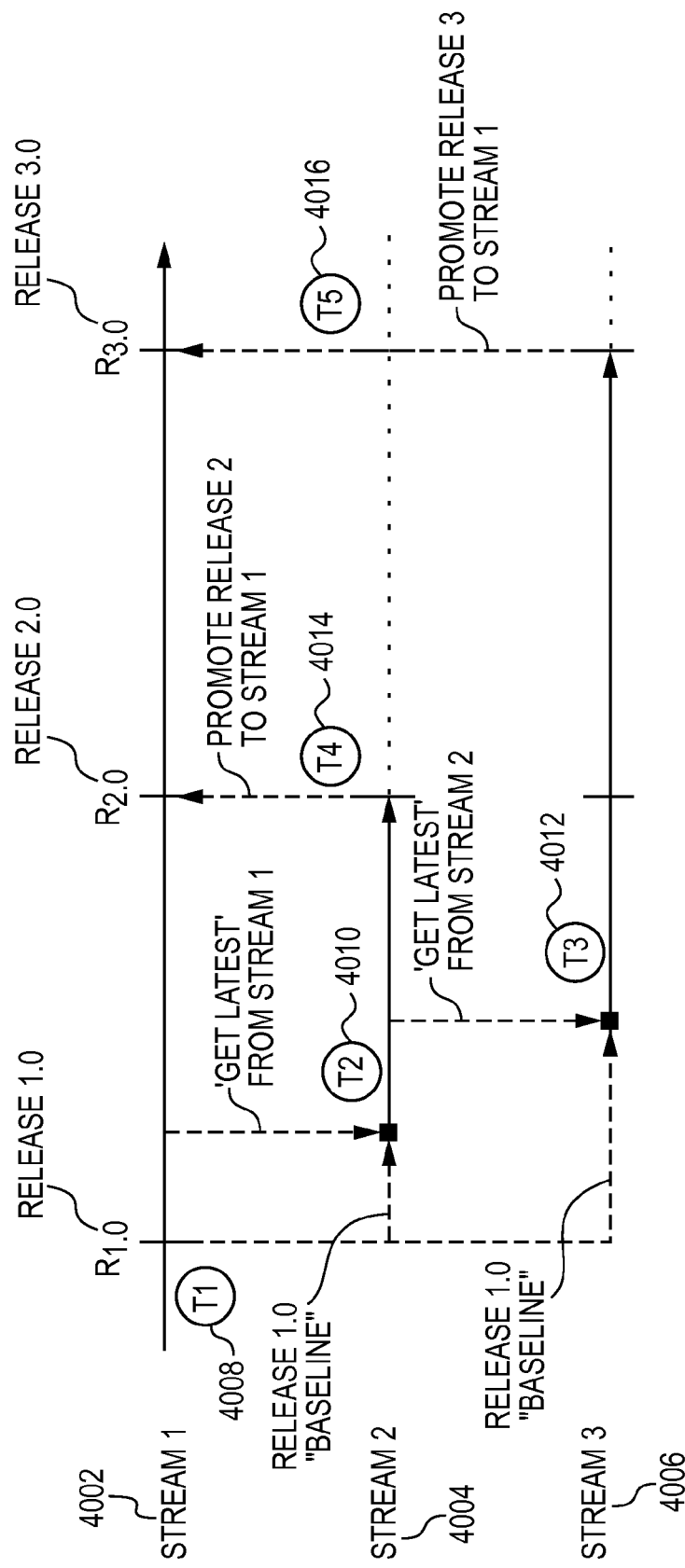
FIG. 40 is a system diagram showing the get latest process and flow of information over time.

FIG. 40 is a system diagram showing the get latest process and flow of information over time between three parallel streams. Stream1 4002 is released at T1 4208. At time T2 4010, a get latest can be performed to create a second stream 4004. From this second stream a yet third stream 4006 can be created in the same way at T3 4012.

These parallel streams can then be merged before being released to production. FIG. 40 shows at T4 4014 the second stream 4004 being merged into the first stream 4002. At T5 4014 parallel stream 3 4006 is merged into the merged stream1 and stream2, creating a single merged stream.

Figure 41:
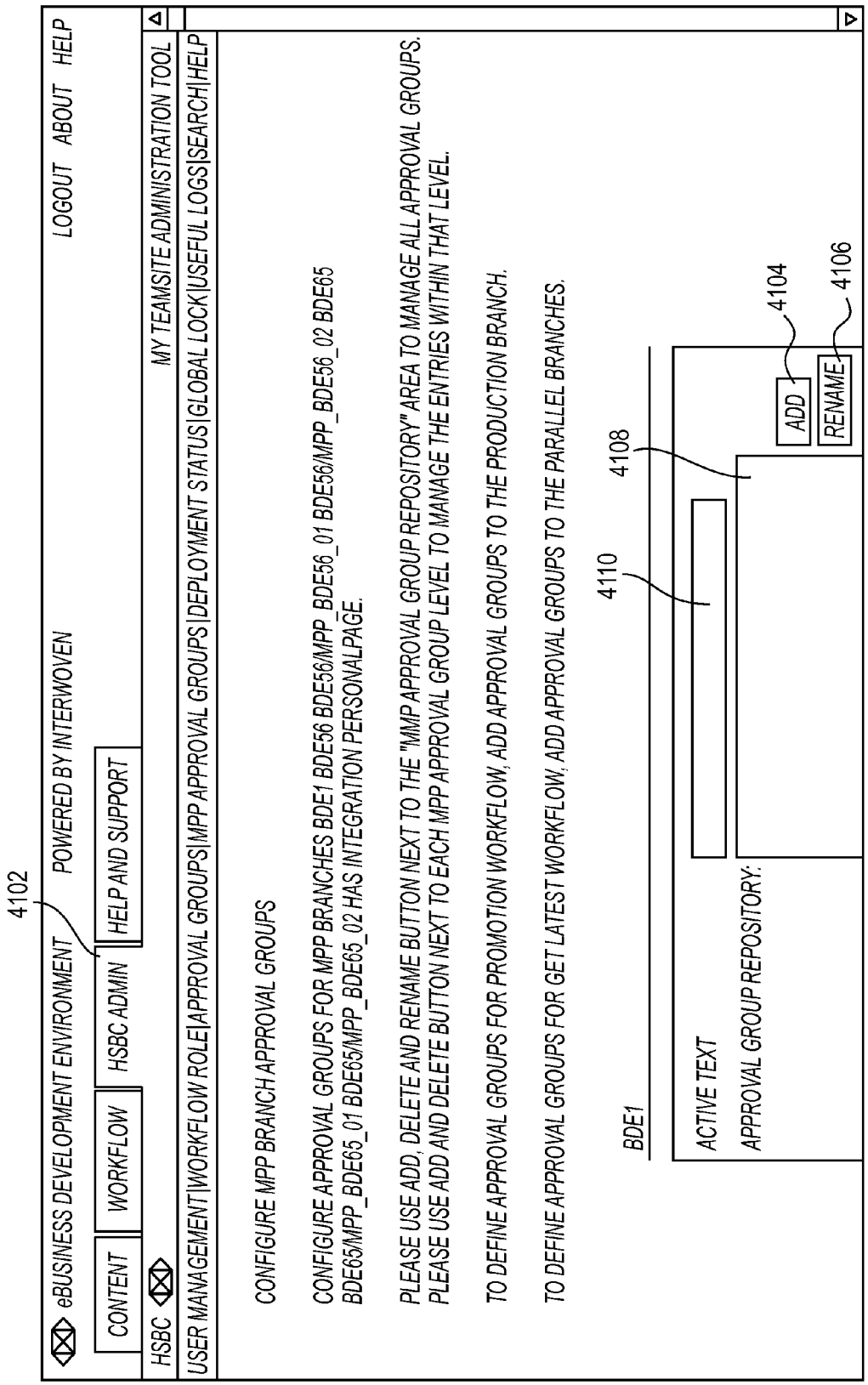
FIG. 41 is a user interface of the MPP showing how different security groups can be configured.

FIG. 41 is a user interface of the MPP showing how different security groups can be configured. The MPP interface includes an admin component 4102 that includes various administrative functions. This figure shows how approval groups can be created. The interface includes an active text field 4110, and a test field 4108, where information can be entered. The interface includes an "add" button 4104 for adding approval groups, and a "rename" button 4106 for renaming approval groups.

There are three different types of user access. For TeamSite users, they are controlled by UNIX groups and the user administration console within TeamSite, these users are only able to access the TeamSite 6.5 Content Center. Creation of a user account in TeamSite does not provide access to the entire BDE. For portal server users, these users are created in the LDAP directory and are used by BDE users to perform administrative tasks such as managing the site i.e. using the BDE features. For ID&V Portal users, these users are basic portal registered user accounts that have additional attributes configured in the LDAP entry that identify them as "customers." These are generally used by local entities for testing purposes, to see how the environment behaves with a simulated front-end "customer." Alternative user access types can also be provided.

Figure 42:
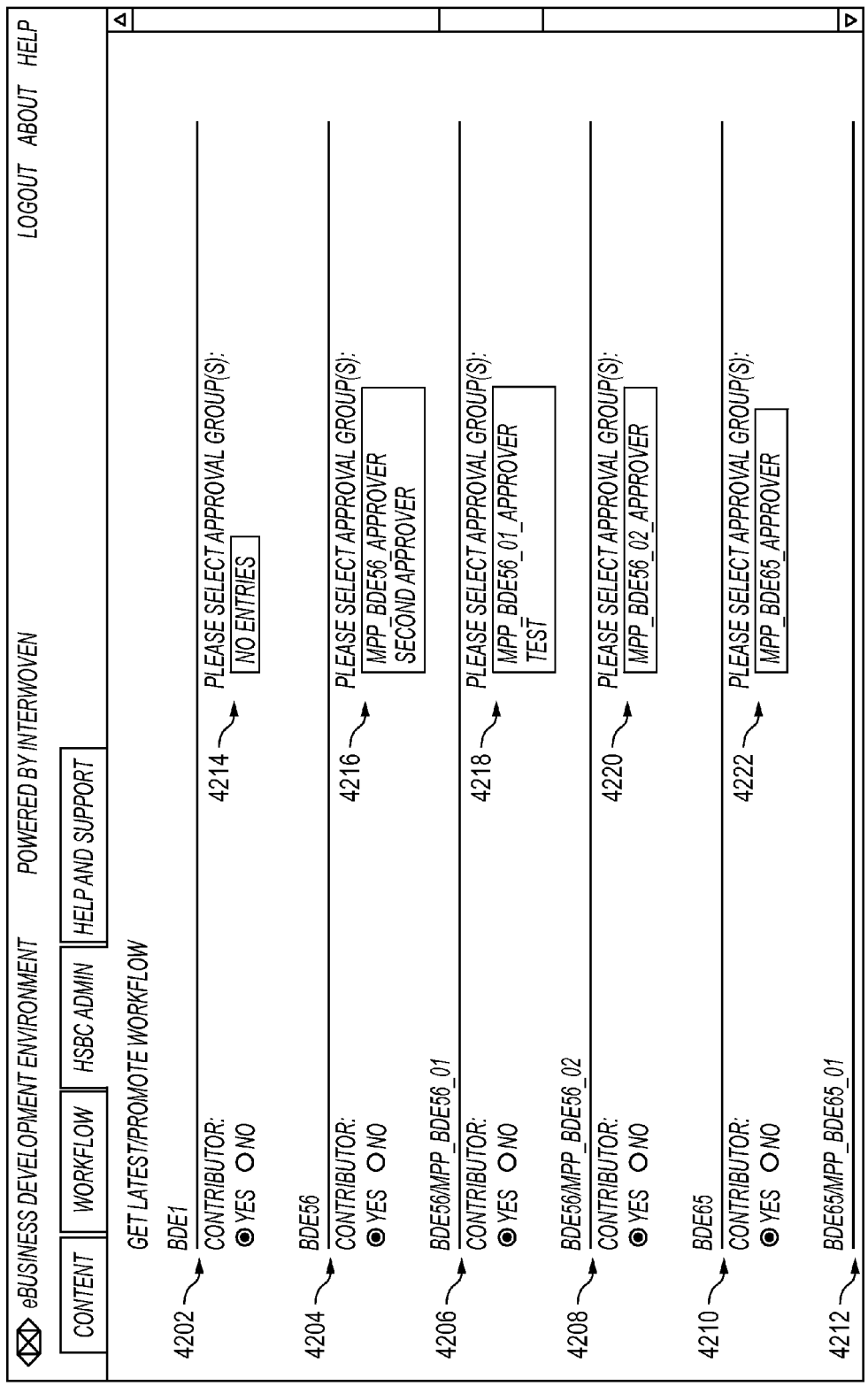
FIG. 42 is a user interface of the MPP showing configuration of the get latest process.

FIG. 42 is a user interface of the MPP showing configuration of the get latest process. The admin interface shows various users 4202-4212, along with their status of whether they are a contributor, and with each user having corresponding approval groups to which they belong.

Figure 43:
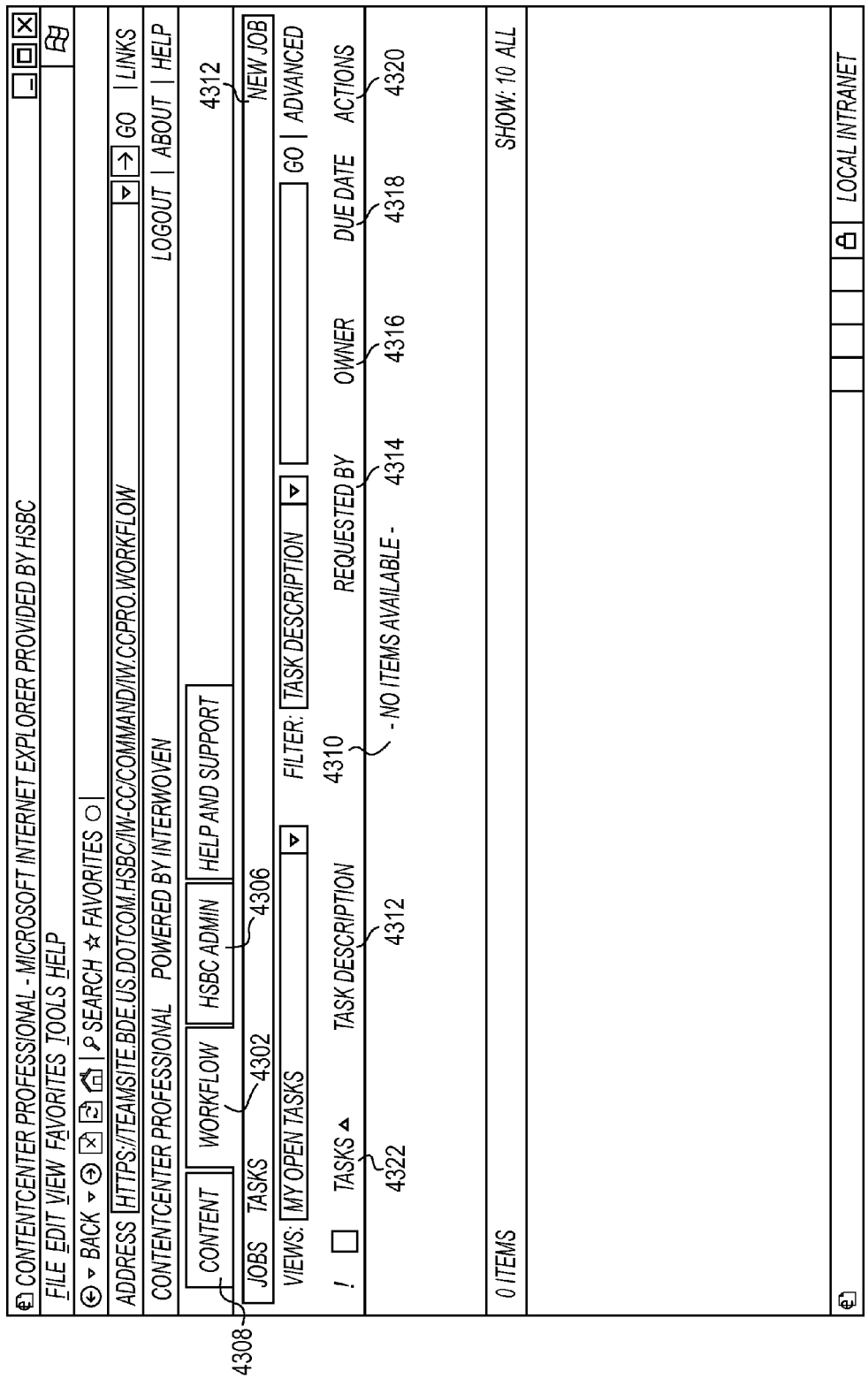
FIG. 43 is a user interface of the MPP showing the overall design of the system.

FIG. 43 is a user interface of the MPP showing the overall design of the system. The system is shown with a web interface, although other interfaces can be used. The interface includes a workflow task pane 4302 and an admin task pane 4306. The workflow task includes a new job button 4312, as well as window 4310 showing the tasks in process. The display includes a task name 4322, a description 4312, a requestor 4314, an owner 4316, a due date 4318, and actions that need to be done 4320. From this interface a user can control the overall workflow of creating and deploying a parallel stream.

Figure 44:
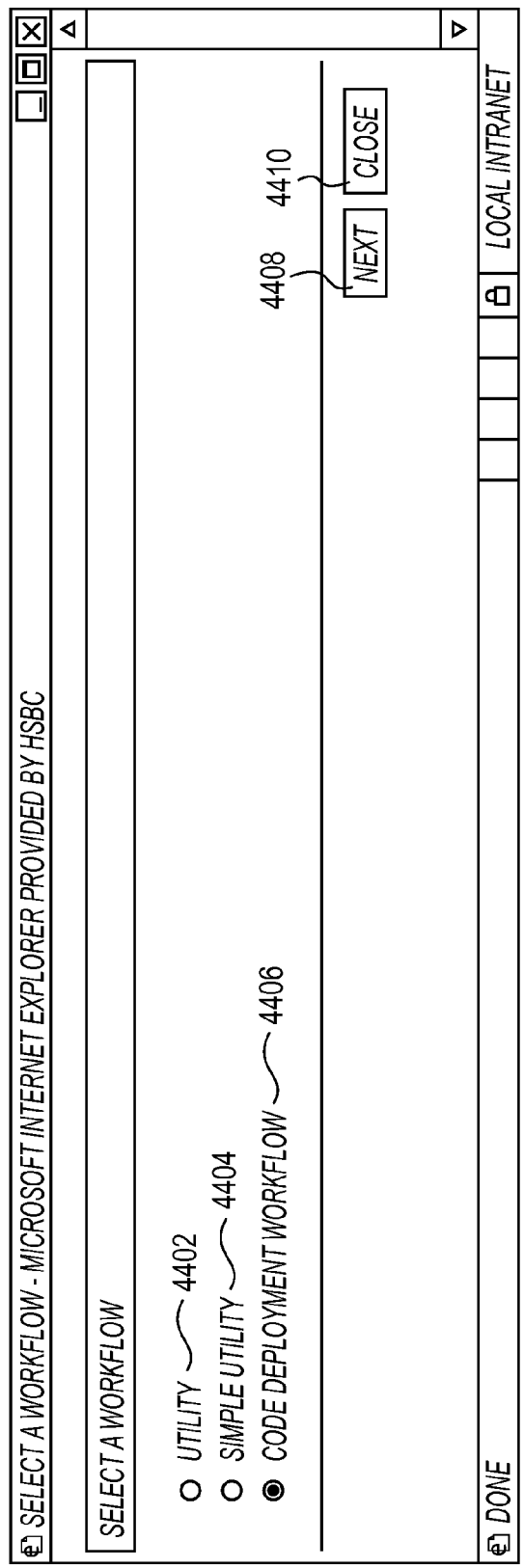
FIG. 44 is a user interface of the MPP showing the beginning of the code deployment workflow.

FIG. 44 is a user interface of the MPP showing the beginning of the code deployment workflow. Through this interface a user creating a new task can choose a utility task 4402, a simple utility task 4404, or a code deployment workflow 4406. After selecting the type of task, the user can select next 4408, or close the process using button 4410.

Figure 45:
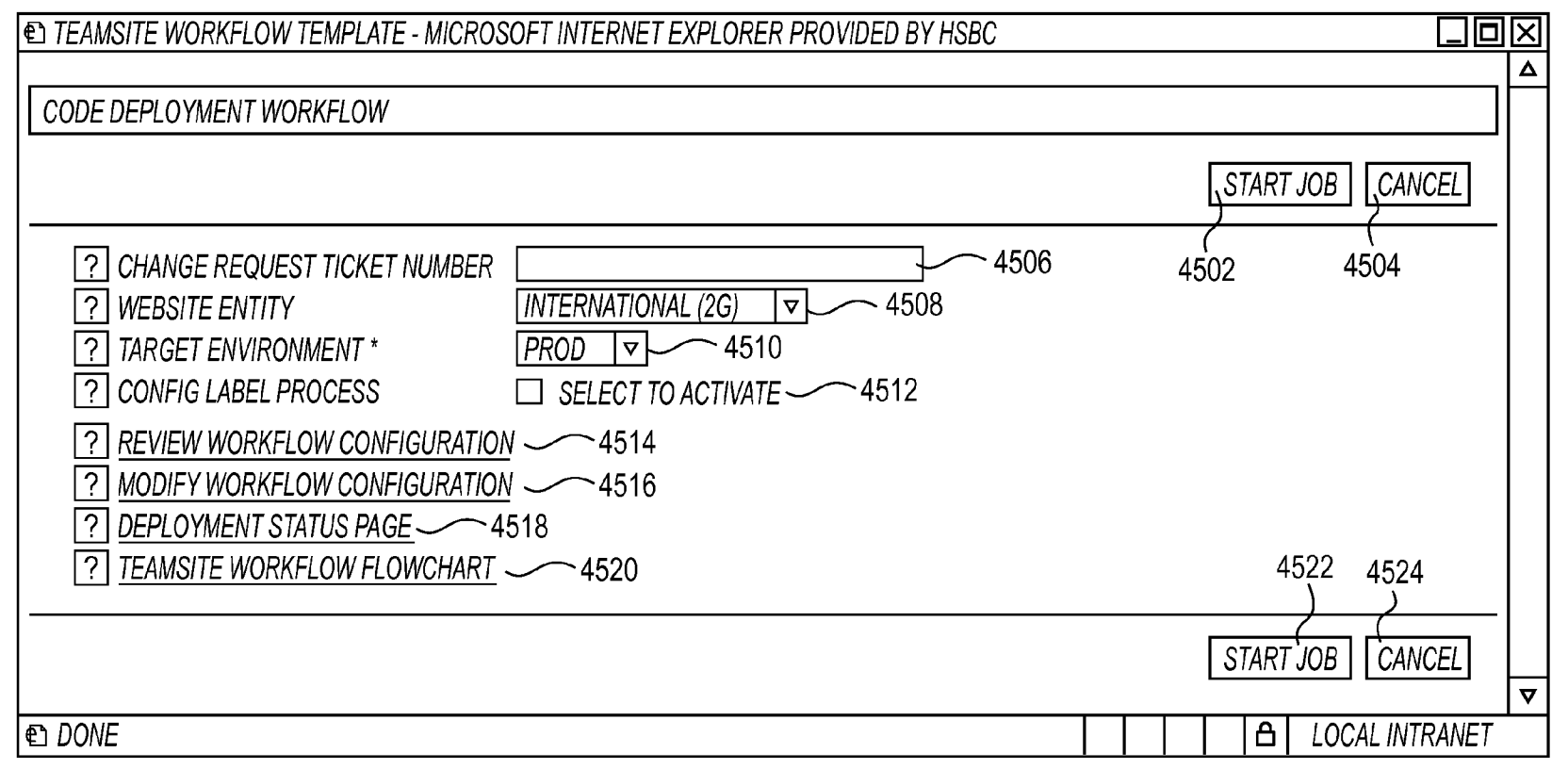

FIG. 45 is a user interface of the MPP showing configuration settings for the deployment process. The user can enter a change request ticket number 4506 (when deploying to a production environment), the type of website entity 4508, the type of target environment 4510 (e.g. production, preproduction, testing), and whether they wish to configure the label process 4512. The interface also allows user to review a workflow configuration 4514, to modify a workflow configuration 4516, to view a deployment status page 4518, and to view a TeamSite workflow flowchart 4520. Buttons 4502 and 4522 can be used to start the job, while button 4504 and 4524 can be used to cancel the creation process. By selecting start job, a code deployment workflow task will be created with the configuration entered.

FIG. 46 is a user interface of the MPP showing part of the get latest process. This interface shows two tasks 4602 and 4604 where the get latest process has been completed, as shown by actions column 4606. Window 4608 shows details of the result of the get latest process, for example, from the workflow log. This interface also shows that the user can start the next part of the process, which is the code deployment process, using the start input task button 4610.

Figure 47:
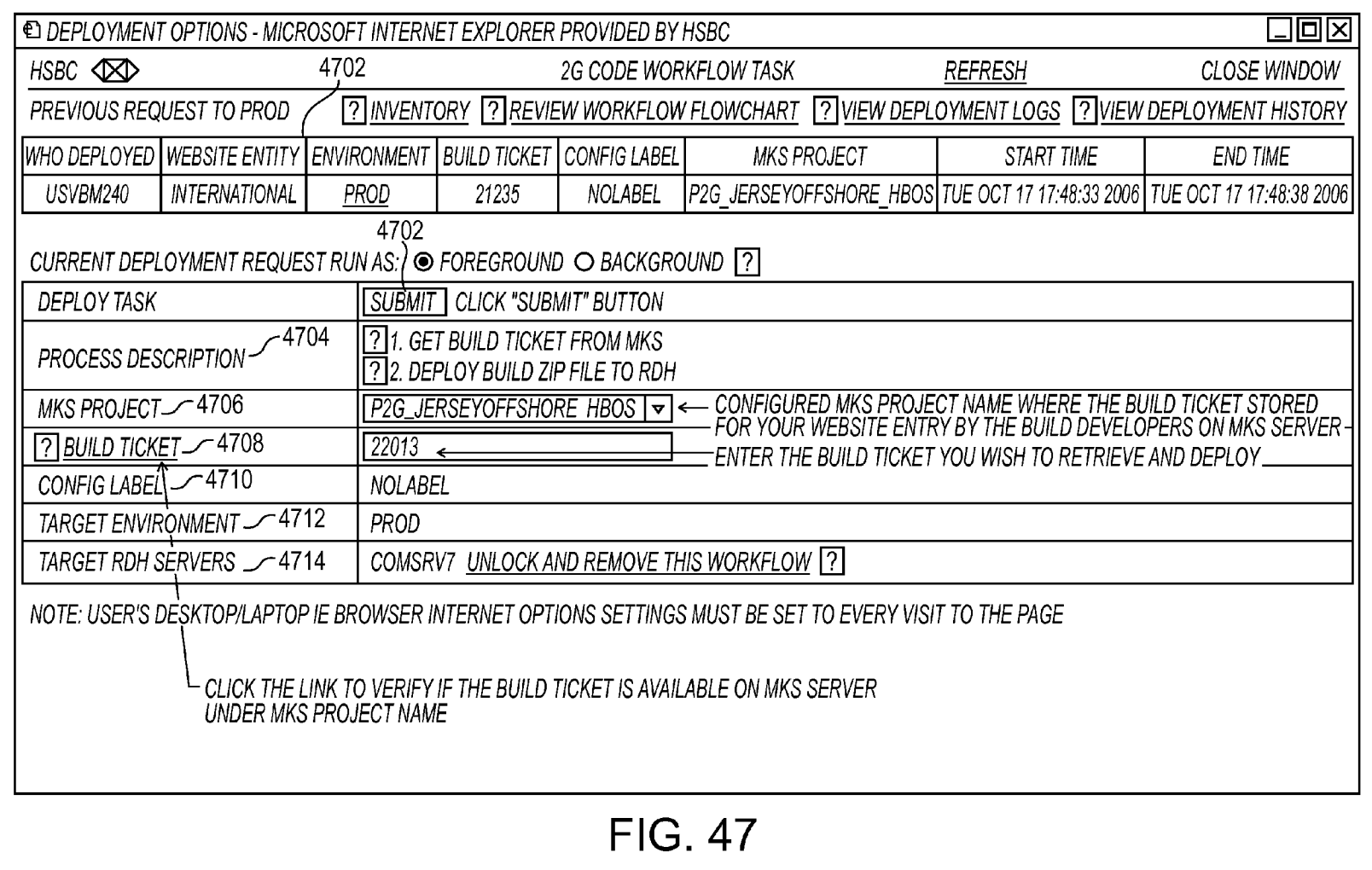

FIG. 47 is a user interface of the MPP showing part of the deployment process. The interface is used to deploy code to a target environment. The interface includes information about the current parallel stream 4702. It also includes a process description 4704 describing the next processes to be performed. The interface allows a user to select the MKS project 4706, the build ticket number 4708, and a config label 4710. It also displays the target environment 4712 (e.g. production) and target deployment servers 4714. The interface includes a submit button 4716 for submitting the deployment task.

Figure 48:
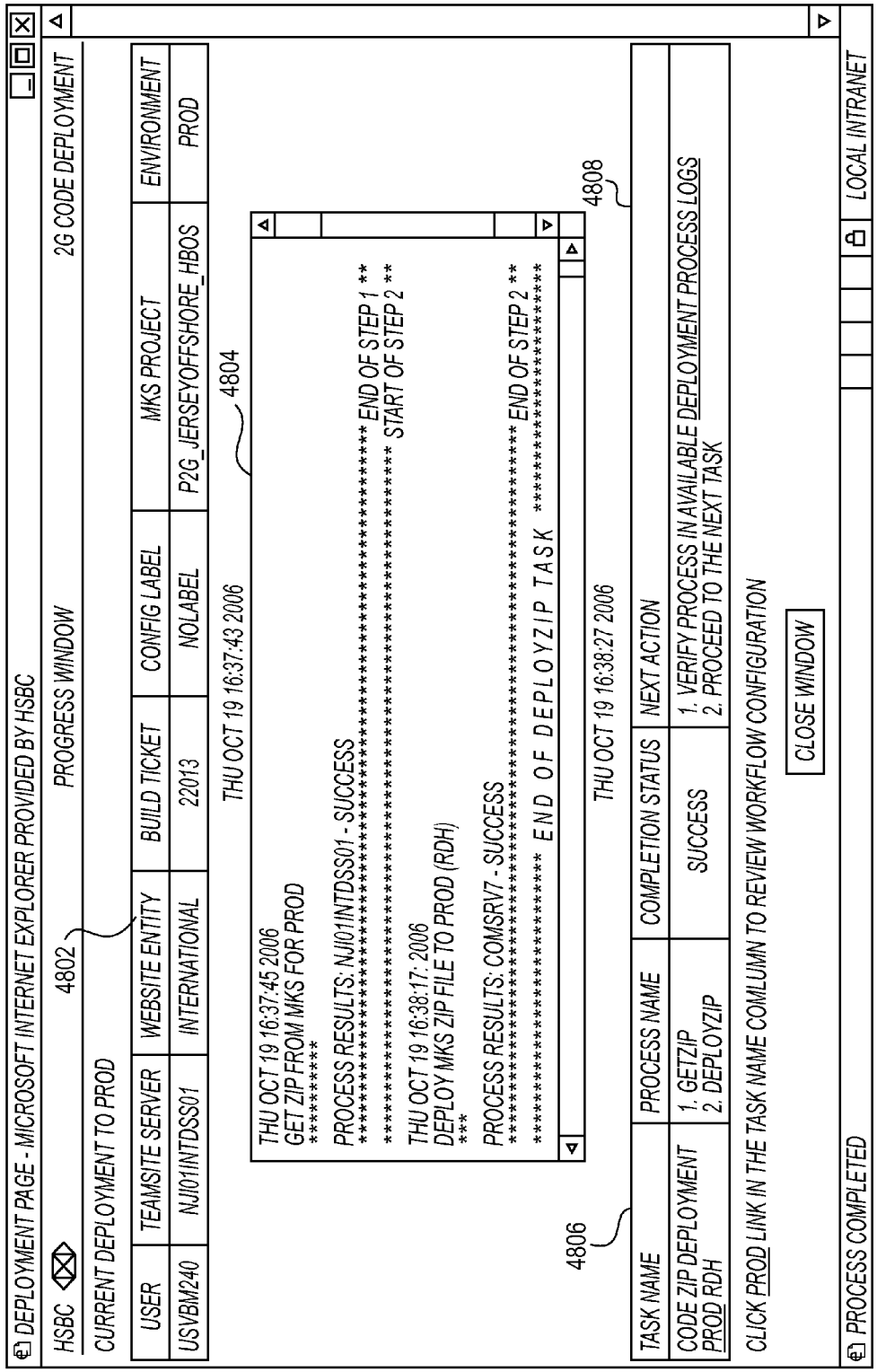
FIG. 48 is a user interface of the MPP showing the results of the deployment process.

FIG. 48 is a user interface of the MPP showing results of the deployment process. This interface shows information about the current parallel stream 4802, as well as information 4804 about the result of the code deployment process. For example, this can include information from the log such as whether the process was successful or not. The interface also shows summary information about the task 4806, including, the task name, the process name, the completion status, and the next action 4808.

Figure 49:
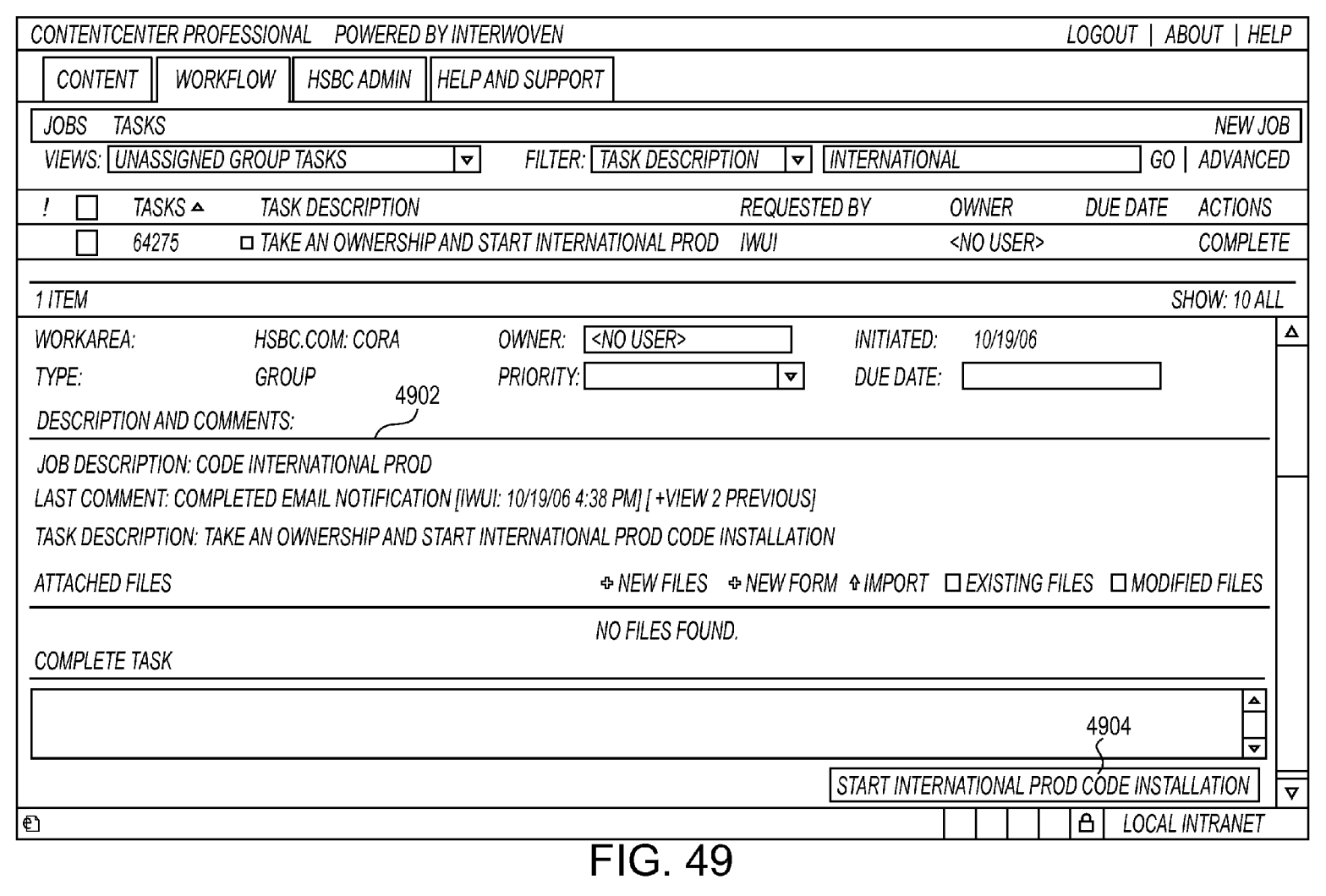

FIG. 49 is a user interface of the MPP showing deploying code to production. The interface shows an output 4902 stating that notification has been sent about code deployment. It also provides a button 4904, so that the user can deploy the code to a production environment after testing.

Figure 50:
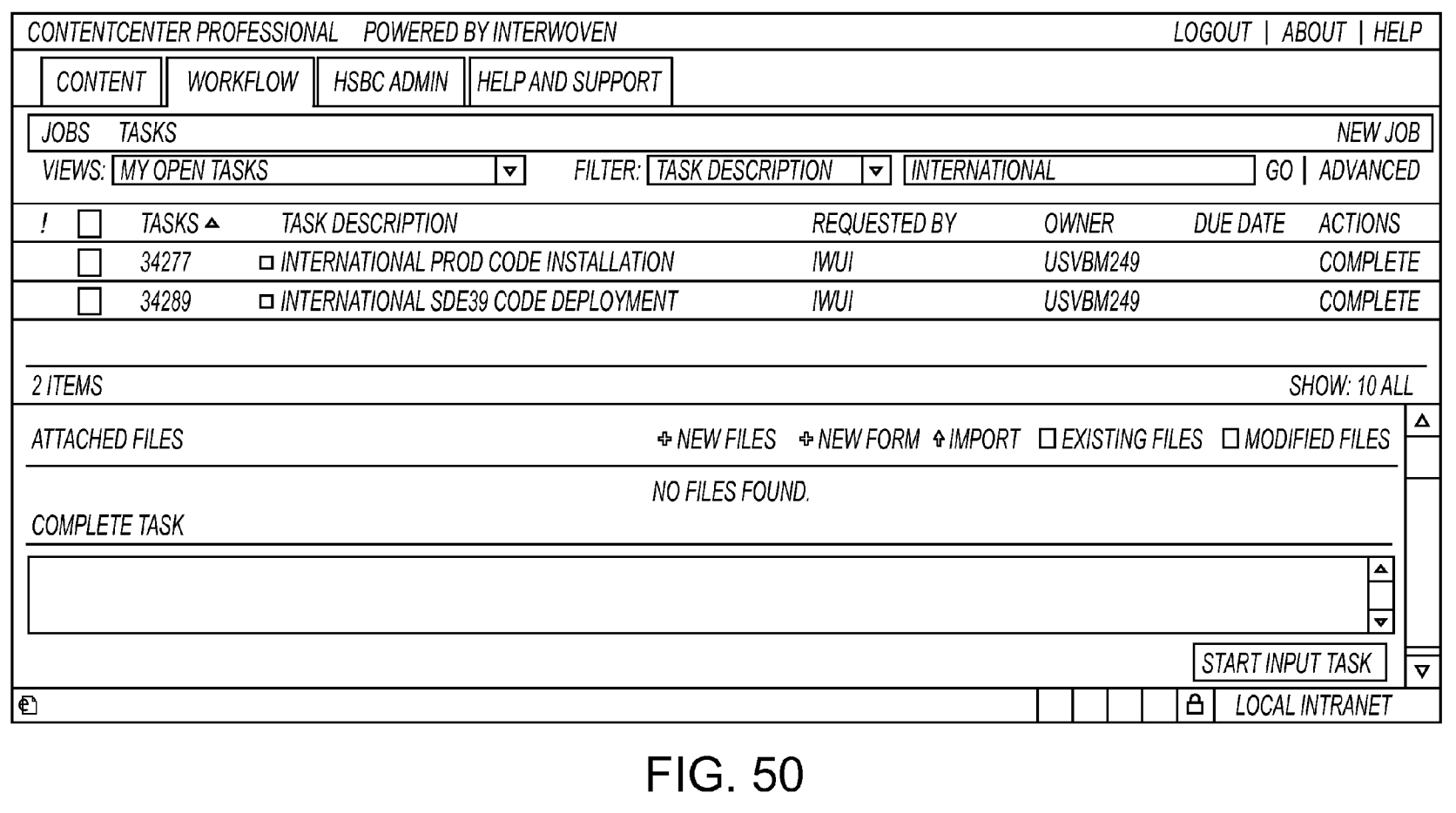

FIG. 50 is a user interface of the MPP showing deploying code to production. This interface allows a user to deploy code to a production environment in a similar manner to the other interfaces.

FIG. 51 is a user interface of the MPP showing the results of the deployment process. This interface is similar to FIG. 47 and allows a user to enter the necessary configuration information for deploying a parallel stream to a production environment. It also shows information about the current deployment process and the next tasks. It includes an option 5102 start and stop the production webservers during the deployment.

Figure 52:
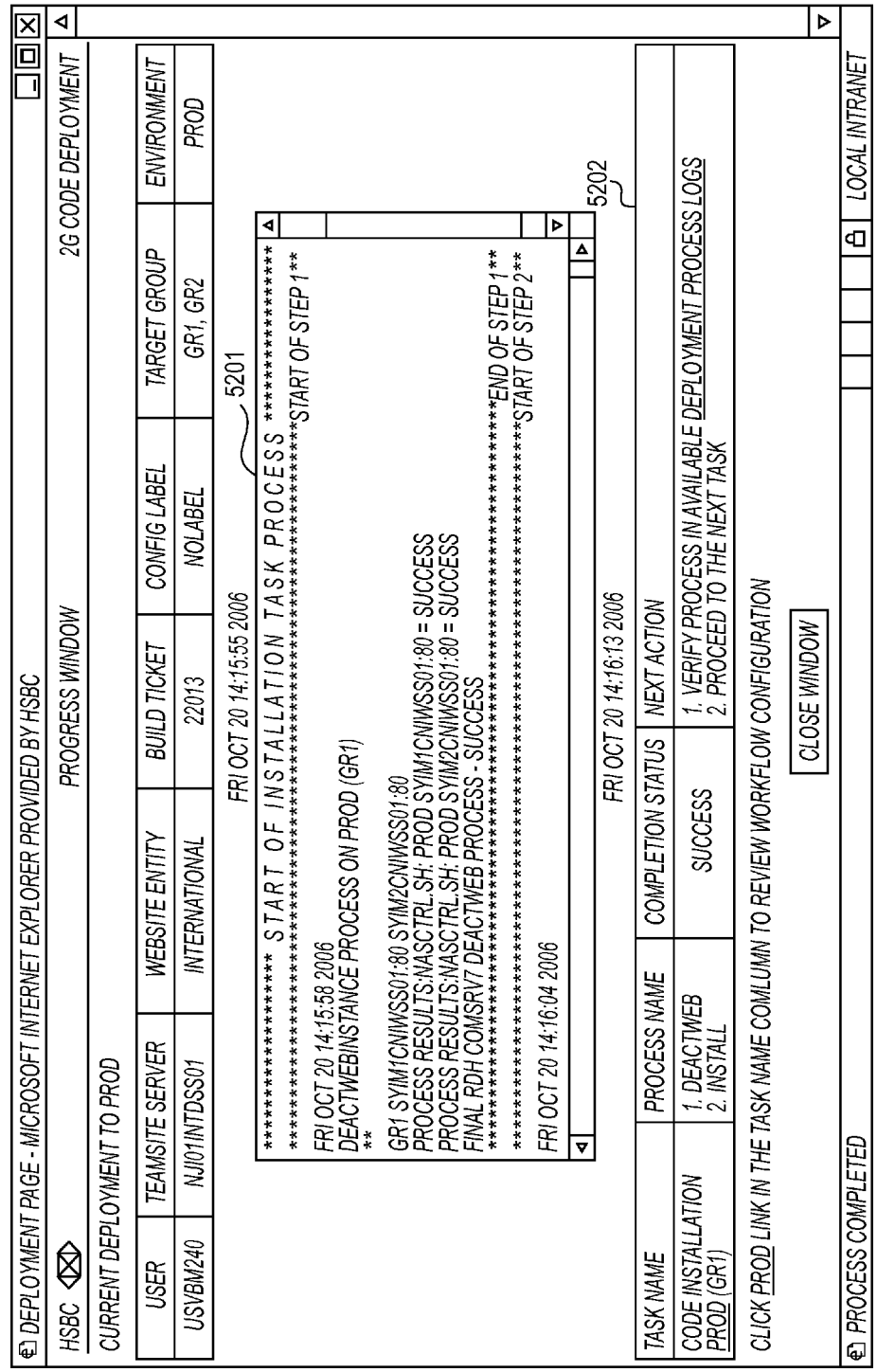
FIG. 52 is a user interface of the MPP showing the results of the deployment process.

FIG. 52 is a user interface of the MPP showing a log of the results. This interface is similar that shown in FIG. 48, and shows the result of the deployment to production process 5201. It also shows summary information about the deployment to production and the next steps 5202.

Reporting of the operations of the MPP system can also be done. For example, generating an audit history that the user can view. This way a user can review the decisions that we made during any get latest or promotion operation performed in the past. The user can determine the current baseline of an environment, which includes a list of all the current applications deployed to an environment, the associated project revisions, and the current baseline of content.

TeamSite can be set to automatically log workflows that submit resources to it. Important information to log includes the tasks executed during a workflow, who executed them, who approved the tasks, and when they executed. A common workflow logging component can be used to log information from the MPP tasks and operations, regardless of whether an operation is successful or not. The log can also contain information such as, history file location, task name, task id, and date/time.

FIG. 53 is a user interface of the MPP showing how a production and a parallel version of a project are compared. The interface shows a production version 5302 and a parallel version 5304 that have been developed. The pages 5306, content 5322, and applications 5310 of the production version 5302 are shown. The corresponding new versions of the parallel stream 5304 are also shown.

The workflows used to manage releases between streams are inherently complex processes, the user helps by analyzing the differences between streams and making the decision to continue with the workflow. At anytime during the comparison process, a user can save their decisions and/or close the compare difference page. This is useful when working with large sets of differences. The user can select the tab for the type of artifacts they want to review. This displays a list of artifact differences since the last comparison took place. The table identifies the artifact type and number of decisions currently made (out of the total number of differences listed). The radio buttons (Add, Delete, Ignore, Overwrite) are only active for an artifact if that value is a valid selection.

The differences are color coded identifying difference actions that have occurred to the artifacts since the last comparison took place. The user can place their cursor on a color to get a tip regarding what each color represents. The user selects an artifact to bring up the comparison details page for that artifact. The user can also select the view the file source differences, to view the code differences between two artifacts, side by side.

The user then makes their selection for each item. This can be done using set action values, which apply to a group of artifacts, or to individual selections. It is important make URL mapping decisions in tandem with the decision for their corresponding components. For CAM levels and code tabs, the user can click either yes or no. Code deployments are not recommended if the only differences between environments are CAM level differences. A user can updated the CAM level manually in this situation. After finishing reviewing the items on one tab, the user can simply click another tab to select it. Finally, once the user is done with their review, they can click the submit choices button.

There user can go through this same process for deleted compositions. The user can review the deleted files and make a decision on what to do with it. The user can group files together for the same action. When the user is done with their review, they can click the submit choices button.

Using the columns of buttons, including add 5312, delete 5314, ignore 5316, merge 5318, and over-write buttons 5320, a user can merge the production and parallel stream into a new version. In some cases, a user may want to add a file in, while in other cases they may wish to ignore changes in the parallel stream and stay with the production version.

Figure 54:
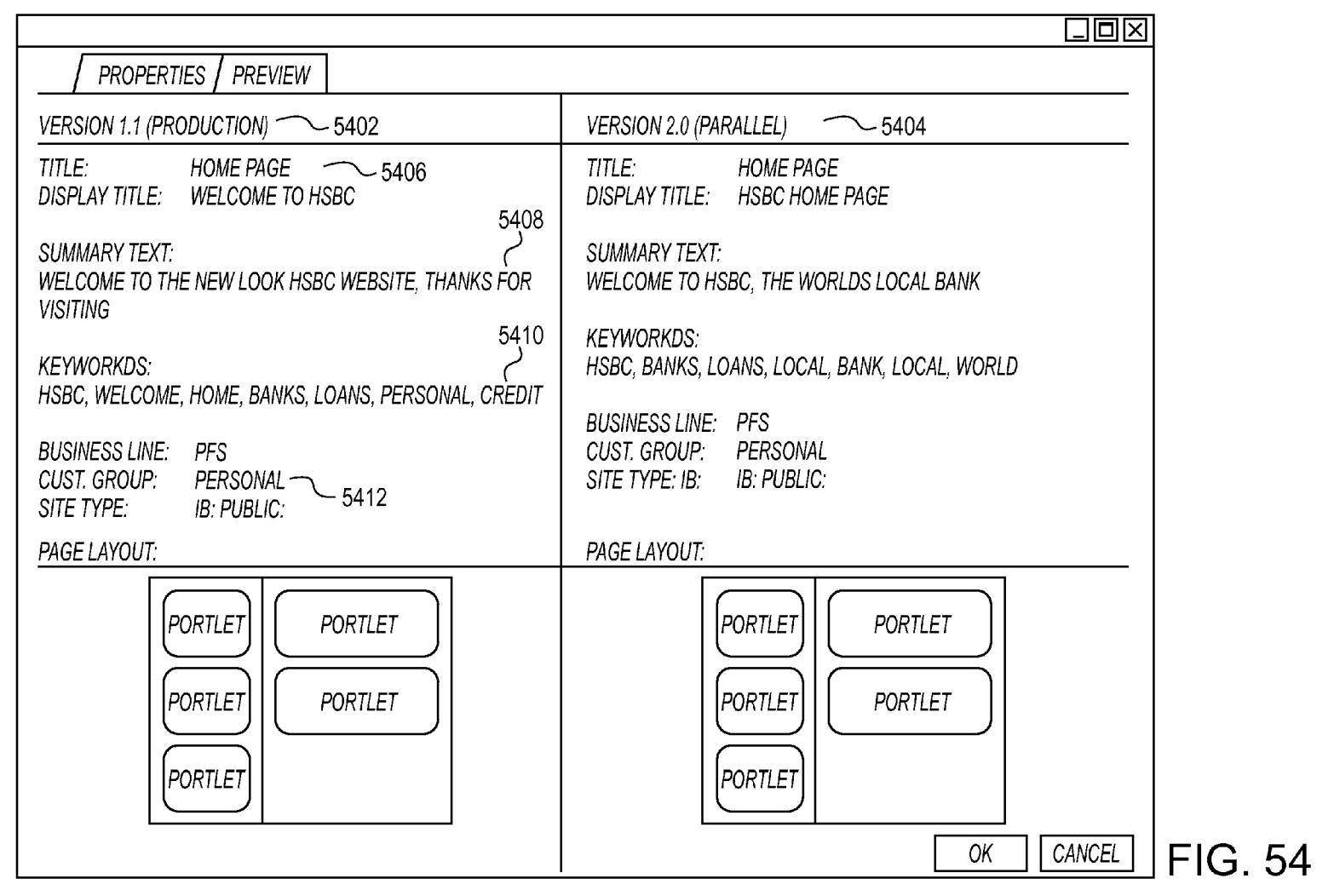

FIG. 54 is a user interface of the MPP showing how a production and a parallel version of a web page layout are compared. This interface assists a user in comparing the page layout of content between a production version 5402 and a parallel version 5404. The interface shows the differences between page titles 5406, summary text 5408, keywords 5410, and business lines 5412.

Figure 55:
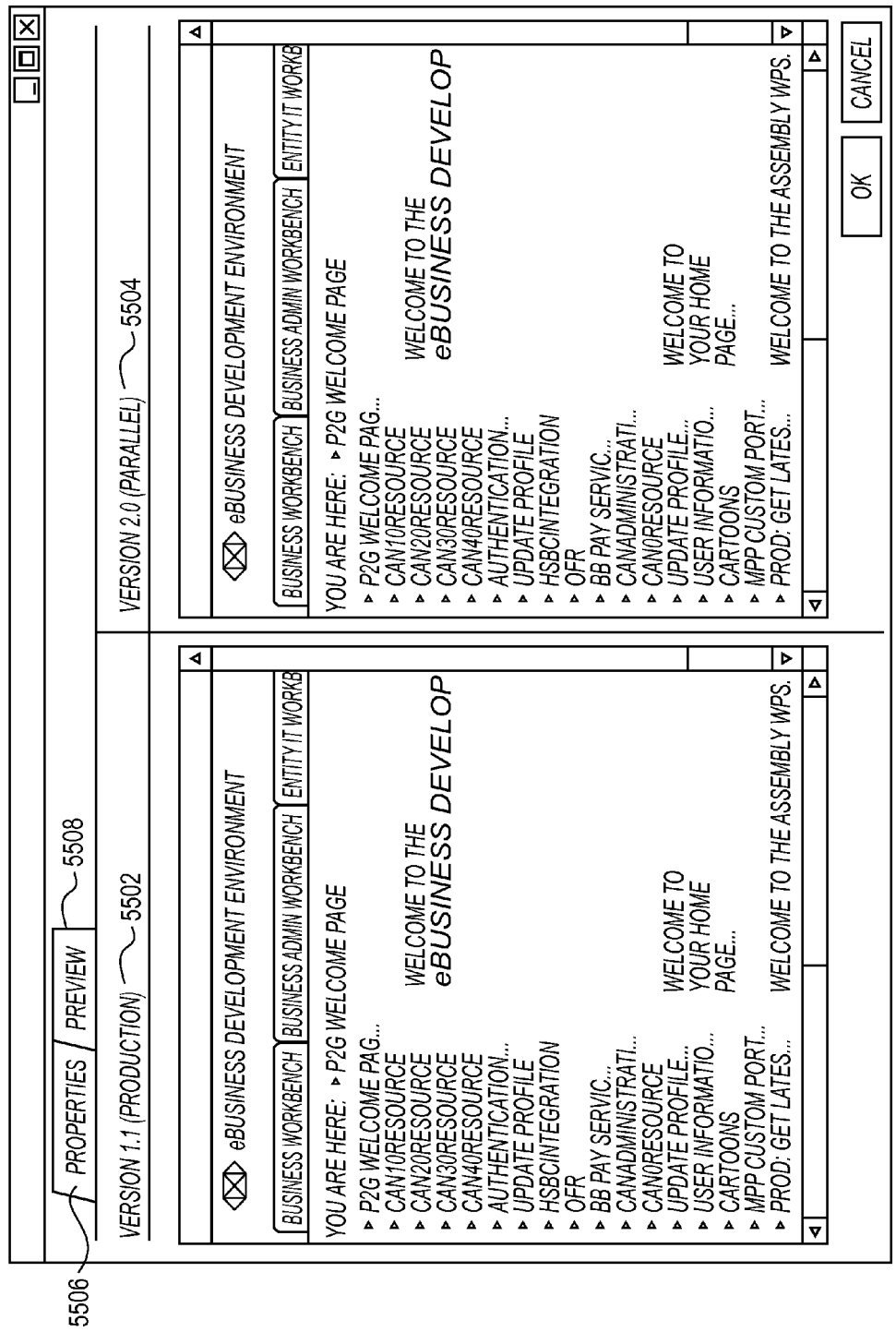
FIG. 55 is a user interface of the MPP showing how a production and a parallel version of a web page are compared.

FIG. 55 is a user interface of the MPP showing how a production and a parallel version of a web page are compared. The interface shows a production version of a page (e.g. home.html) and a version of the page in the parallel stream 5504 (e.g. the updated version of home.html). The preview can also show other content included within the page. This preview allows a user to more easily compare content files when merging a parallel stream. The user can easily switch between this preview view and a merge view using tabs 5506 and 5508.

FIG. 56 is a user interface of the MPP showing a summary of the comparison and merge process. The interface shows a production version of the stream 5602, a parallel version of the stream, and a summary 5606 of how each of the files was merged and to which version. This way a user can easily review the merging process and make changes if desired. This summary includes pages 4980, content 5610, and applications 5612.

Figure 57:
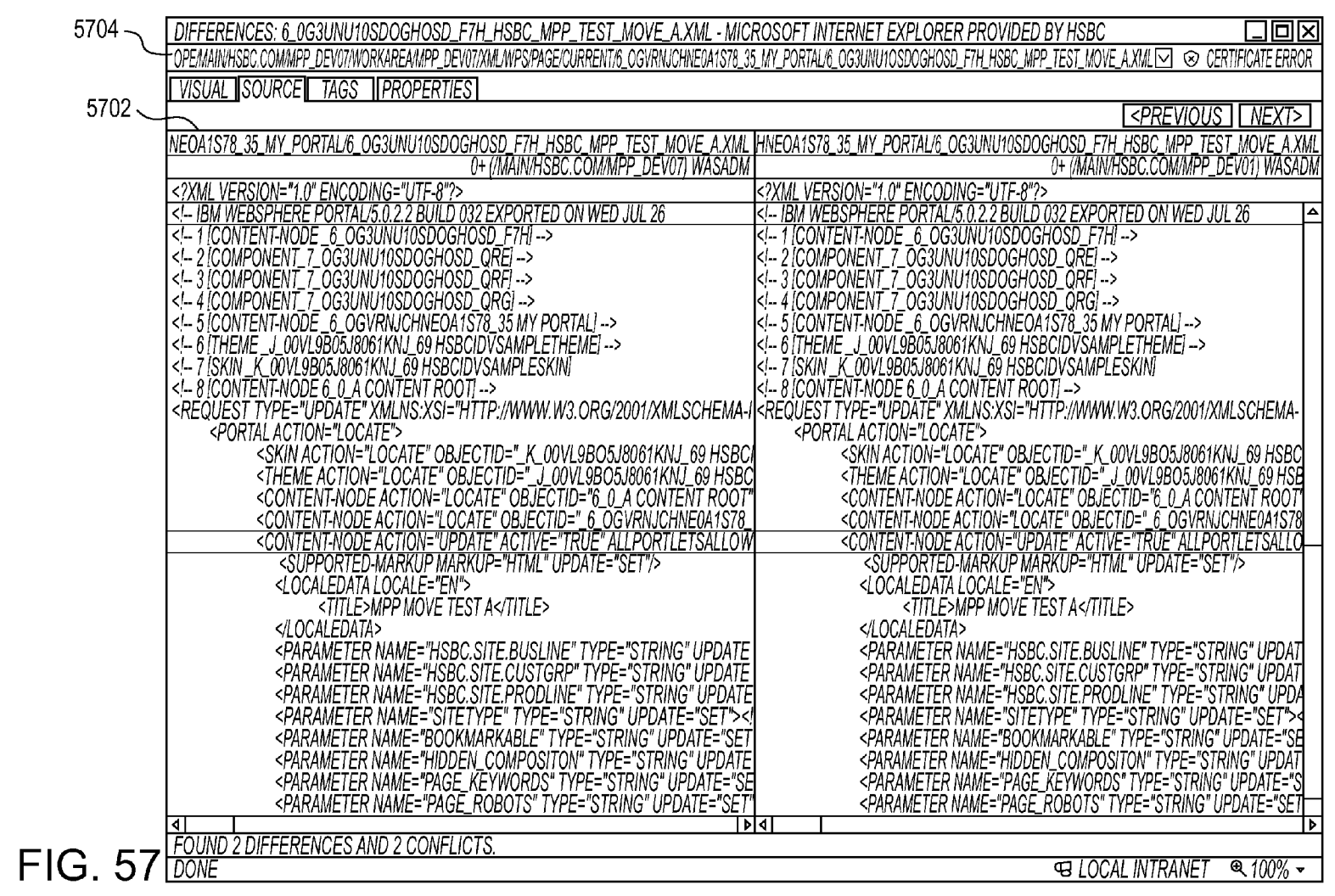

FIG. 57 is a user interface of the MPP showing how a production and a parallel version of the code are compared. This interface shows a production version of a source code file 5702, and a version of the source code file 5704 in a parallel stream. This allows a user to easily compare the two versions of the source code when making a decision as to how the files should be merged. Highlighting and other visual indications can be used to make the difference more apparent.

Embodiments of the invention can be implemented using standard web technologies such as HTML, Java, and JavaScript, as well as, scripting languages for deploying and managing files and provisioning systems for use during development. For example, the Kickstart program from RedHat may optionally be used. In addition, known standard database systems can be using for the storage of content and files, for example, DB2.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A computer implemented method of automatically managing processes in the parallel development of an application through a graphical user interface on a client computer system, the graphical user interface being used to managing automated processes executing on servers, wherein the automated processes complete their tasks without further user interaction, the automated processes comprising:

provisioning a first development environment, including at least a first server executing an application platform, a first source code control system, and a first content management system, wherein said provisioning the first development environment comprises automatically configuring the at least first server to run a first predetermined application to support the first development environment;

generating, from a first release of the application having first source code and first content using the first development environment, a second release of the application, wherein the second release of the application includes second source code stored within the first source code control system and second content stored within the first content management system;

provisioning a second development environment, including at least a second server executing an application platform, a second source code control system, and a second content management system wherein said provisioning the second development environment comprises automatically configuring the at least second server to run a second predetermined application to support the second development environment;

generating unique identifications for at least one source code file and one content file of the second release before deploying the second release to the second development environment;

deploying the second release to the second development environment;

merging modifications to the second source code, stored within the second source code control system, and the second content, stored within the second content management system, of the second release into the first source code and the first content of the first release using the unique identifications to generate a third release of the application including third source code and third content; and deploying the third release of the application to at least one production environment server for use by users of the application, wherein the deployment includes, for (a) installing executable versions of the third source code on a production environment server executing a production application platform and (b) installing the third content, to a production environment content management system.

2. The method of claim 1, wherein the first release of the application is a production stream.

3. The method of claim 1, wherein merging the modifications to the second source code and the second content of the second release into the first source code and the first content of the first release to generate a third release of the application including third source code and third content is performed by a non-technical business user through the graphical user interface that includes interfaces for managing tasks and for reviewing the result of completed tasks.

4. The method of claim 1, wherein at least one of the first and the second source code control system and at least one of the first and the second content management system have internal branching mechanisms.

5. The method of claim 4, wherein the first release, second release, and third release of the application are each separate versions in at least one of the first and the second source code control system and at least one of the first and the second content management system.

6. The method of claim 1, wherein provisioning the second application platform comprises:
running one or more scripts to install source code and content on the second application platform.

7. The method of claim 6, further comprising:
locking the second application platform before running the one or more scripts; and
unlocking the second application platform after running the one or more scripts.

8. The method of claim 7, wherein provisioning further comprises:
logging the tasks performed by the one or more scripts and logging the results of the tasks performed by the one or more scripts to a central logging component.

9. The method of claim 1, further comprising:
generating a backup of the first release before merging the modifications to the second source code and the second content of the second release into the first release.

10. The method of claim 9, further comprising:
rolling back the merging of modifications using the generated backup.

11. The method of claim 1, further comprising:
deploying the third release of the application to a pre-production environment; and
testing the third release in the pre-production environment, before deploying the third release to a production environment.

12. The method of claim 11, further comprising:
generating a baseline based on the second development environment, wherein the baseline includes the status of source code and content files within the second development environment;
comparing the second release of the application to the baseline; and
deploying the second release of the application to the second development environment responsive to the comparison.

13. The method of claim 12, wherein deploying the second release of the application to the second development environment responsive to the comparison comprises:
deploying source code files that are modified.

14. The method of claim 1, further comprising:
reviewing, by a user, a log of the merging of the modifications to the second source code
and the second content of the second release into the first source code and the first content of the first release to determine if any errors occurred during the merging process.

15. The method of claim 1, further comprising:
forwarding users of the production environment to a backup production environment in the event of a failure, and synchronizing the production environment and the backup production environment using a storage area network.

16. The method of claim 1, wherein merging the modifications to the second source code and the second content of the second release into the first source code and the first content of the first release to generate a third release comprises: at least one of, adding in a source code file, deleting a source code file, ignoring changes to a source code file, overwriting a source code file, and including only parts of a source code file.

17. The method of claim 1, further comprising: comparing changes to the source code and content between the first release and the second release.

18. The method of claim 17, wherein comparing changes to the source code and content between the first release and the second release comprises comparing source code listings and comparing rendered displays of content files.

19. The method of claim 18, wherein the rendered displays of the content files are selectively highlighted for visual comparison.

20. The method of claim 1, wherein deploying the third release of the application to a production environment comprises:
automatically stopping execution of at least one application on the production environment before deploying the third release; and
and automatically starting execution of the third release of the application after deployment of the third release to the production environment.

21. The method of claim 1, wherein each of the servers executing the application platform, at least one of the first and the second source code control system, and at least one of the first and the second content management system, are separate and distinct servers.

22. The method of claim 1, wherein deploying the second release to the second development environment comprises installing executable versions of the second source code to an application platform of the second development environment and installing the second content to a content management server of the second development environment.

23. The method of claim 1, wherein the graphical user interface on the client computer system sends commands to a corresponding management application executing on a deployment and build server, and wherein the deployment and build server is coupled to the production environment through an electronic network, and builds executable versions of the third source code for deployment on the production environment application platform server, and wherein the deployment build server installs the third content to the content management server of the production environment.

24. A computer system for automatically managing processes in the parallel development of an application through a graphical user interface adapted to implement a plurality of components, the graphical user interface being used to manage components for performing automated processes, wherein the components complete their tasks without further user interaction, the components comprising:
a provisioning component provisioning a first development environment including at least a first application platform, a first source code control system, and a first content management system, wherein said provisioning the first development environment comprises automatically configuring at least a first server to run a first predetermined application to support the first development environment,
wherein the provisioning component, executed by at least one computer processor,
(i) generates, by the at least one computer processor, from a first release of the application having first source code and first content using the first development environment, a second release of the application, wherein the second release of the application includes second source code stored within the first source code control system and second content stored within the first content management system;

(ii) provisions, by the at least one computer processor, a second development environment, including at least a second application platform, a source code control system, and a content management system, wherein said provision of the second development environment comprises automatically configuring at least a second server to run a second predetermined application to support the second development environment;

a deployment component deploying the second release to the second development environment;

a merging component merging modifications to the second source code, stored within the second source code control system, and the second content, stored within the second content management system of the second release into the first source code and the first content of the first release using unique identifications for at least one source code file and one content file of the second release before the second release is deployed to the second development environment to generate a third release of the application including third source code and third content; and the deployment component deploying the third release of the application to a production environment for use by users of the application, wherein the deployment includes installing (a) executable versions of the third source code and (b) the third content, to another application platform for the production environment.

25. The system of claim 24, wherein the first release of the application is a production stream.

26. The system of claim 24, wherein merging the modifications to the second source code and the second content of the second release into the first source code and the first content of the first release to generate a third release of the application including third source code and third content is performed by a non-technical business user through the graphical user interface.

27. The system of claim 24, wherein at least one of the first and the second source code control system and at least one of the first and the second content management system have internal branching mechanisms.

28. The system of claim 27, wherein the first release, second release, and third release of the application are each separate versions in at least one of the first and the second source code control system and at least one of the first and the second content management system.

29. The system of claim 24, wherein provisioning the second application platform comprises:
running one or more scripts to install source code and content on the second application platform.

30. The system of claim 24, further comprising:
generating a backup of the first release before merging the modifications to the second source code and the second content of the second release into the first release.

31. The system of claim 24, further comprising:
deploying the third release of the application to a pre-production environment; and
testing the third release in the pre-production environment, before deploying the third release to a production environment.

32. The system of claim 31, further comprising:
generating a baseline based on the second development environment, wherein the baseline includes the status of source code and content files within the second development environment;
comparing the second release of the application to the baseline; and
deploying the second release of the application to the second development environment responsive to the comparison.

33. The system of claim 25, further comprising:
reviewing, by a user, a log of the merging of the modifications to the second source code and the second content of the second release into the first source code and the first content of the first release to determine if any errors occurred during the merging process.

34. The system of claim 25, further comprising:
forwarding users of the production environment to a backup production environment in the event of a failure, and synchronizing the production environment and the backup production environment using a storage area network.

35. The system of claim 25, wherein merging the modifications to the second source code and the second content of the second release into the first source code and the first content of the first release to generate a third release comprises: at least one of, adding in a source code file, deleting a source code file, ignoring changes to a source code file, overwriting a source code file, and including only parts of a source code file.

36. The system of claim 25, further comprising: comparing changes to the source code and content between the first release and the second release.

37. The system of claim 36, wherein comparing changes to the source code and content between the first release and the second release comprises comparing source code listings and comparing rendered displays of content files.

38. An application development computer system managing and coordinating parallel development of a computer application by separate computer system production environments, the application development computer system comprising:
a first development environment, implemented by at least one computer processor, and comprising a first provisioning system provisioning at least a first application platform, a first source code control system, and a first content management system, wherein the first provisioning system generates, by the at least one computer processor, from a first release of the application having first source code and first content using the first development environment, a second release of the application, wherein the second release includes second source code and second content of the application;
a second development environment comprising a second provisioning system provisioning at least a second application platform, a second source code control system, and a second content management system;
a merging system component for merging modifications to the second source code, stored in the second source code control system, and the second content, stored in the second content management system, of the second release into the first source code and the first content of the first release using unique identifications for at least one source code file and one content file of the second release before the second release is deployed to the second development environment to generate a third release of the application including third source code and third content; and
a deployment system component deploying the second release to the second development environment, and deploying the third release of the application to a production environment for use by users of the application, wherein the deployment of the third release includes installing (a) executable versions of the third source code and (b) the third content, to another application platform for the production environment.

39. The method of claim 38 wherein the first and second development environments are geographically distinct.

40. The method of claim 38, wherein the first development environment is used to develop the first release and the second development environment is used to develop the second release, wherein the first and second release represent distinct versions of an application, and wherein the first release is the main release of the application into which modification to the second release are merged.

41. A computer-readable medium of instructions for automatically managing processes in the parallel development of an application through a graphical user interface, the graphical user interface being used to managing automated processes, wherein the automated processes complete their tasks without further user interaction, the instructions of the automated processes executed by at least one computer processor and comprising:
provisioning a first development environment including at least a first application platform, a first source code control system, and a first content management system;
generating, from a first release of the application having first source code and first content using the first development environment, a second release of the application, wherein the second release includes second source code and second content of the application;
provisioning a second development environment, including at least a second application platform, a second source code control system, and a second content management system;
generating unique identifications for at least one source code file and one content file of the second release before deploying the second release to the second development environment;
deploying the second release to the second development environment;
merging modifications to the second source code, stored in the second source code control system, and the second content, stored in the second content management system, of the second release into the first source code and the first content of the first release using the unique identifications to generate a third release of the application including third source code and third content; and
deploying the third release of the application to a production environment for use by users of the application, wherein the deployment includes installing (a) executable versions of the third source code and (b) the third content, to another application platform for the production environment.

42. The method of claim 41, wherein merging the modifications to the second source code and the second content of the second release into the first source code and the first content of the first release to generate a third release of the application including third source code and third content is performed by a non-technical business user through the graphical user interface that includes interfaces for managing tasks and for reviewing the result of completed tasks.

43. The method of claim 41, wherein the first release, second release, and third release of the application are each separate versions in at least one of the first and the second source code control system and at least one of the first and the second content management system.

44. The method of claim 41, wherein provisioning the second application platform comprises:
running one or more scripts to install source code and content on the second application platform.

45. The method of claim 41, further comprising:
deploying the third release of the application to a pre-production environment; and
testing the third release in the pre-production environment, before deploying the third release to a production environment.

46. The method of claim 41, further comprising:
generating a baseline based on the second development environment, wherein the baseline includes the status of source code and content files within the second development environment;
comparing the second release of the application to the baseline; and
deploying the second release of the application to the second development environment responsive to the comparison.

47. The method of claim 1, further comprising executing the first and the second source code control systems and the first and the second content management systems within different logical areas of the same work area.

48. The method of claim 1, further comprising executing the first and the second source code control systems and the first and the second content management systems within a separate work area.

49. The method of claim 1, further comprising synchronizing the first development environment with the second development environment.

50. The method of claim 1, further comprising synchronizing the first development environment with the second development environment utilizing at least a first artifact resulting from a comparison between the first development environment and the second development environment.

51. The method of claim 49, further comprising synchronizing the second development environment with the first development environment.

52. The method of claim 50, further comprising synchronizing the second development environment with the first development environment utilizing at least a second artifact resulting from a comparison between the second development environment and the first development environment.

53. The method of claim 1, further comprising:
receiving a first instruction from a non-technical business user to perform a comparison between the first source code and the first content of the first release with the second source code and the second content of the second release;
executing the first instruction and displaying the results of the comparison in a graphical user interface; and
controlling, responsive to a second instruction from a non-technical business user, at least one of merging, overwriting, adding, ignoring and deleting of the first or the second source code and the first or the second content to synchronize the first source code and the first content of the first release with the second source code and the second content of the second release.

* * * * *